United States Patent [19]

Prohs et al.

[11] Patent Number: 4,837,799
[45] Date of Patent: Jun. 6, 1989

[54] TELEPHONE LINE COMMUNICATIONS CONTROL SYSTEM

[75] Inventors: John R. Prohs, Pasadena, Calif.; Charles G. Akins; Nicholas Efthyvoulos, both of Big Sandy, Tex.; Phillip E. Sandilands; Michael R. Scheid, both of Pasadena, Calif.

[73] Assignee: Ambassador College, Pasadena, Calif.

[21] Appl. No.: 249,220

[22] Filed: Sep. 19, 1988

Related U.S. Application Data

[63] Continuation of Ser. No. 106,726, Oct. 5, 1987, abandoned.

[51] Int. Cl.⁴ ............................................. H04M 3/00
[52] U.S. Cl. .................................. 379/224; 379/269; 379/207; 379/266
[58] Field of Search ................... 379/34, 67, 88, 92, 379/94, 201, 207, 208, 210, 214, 218, 219, 220, 221, 223, 224, 225, 265, 266, 269, 309

[56] References Cited

U.S. PATENT DOCUMENTS

| | | | |
|---|---|---|---|
| 3,859,473 | 1/1975 | Brown et al. | 379/266 X |
| 3,881,060 | 4/1975 | Connell et al. | 379/134 X |
| 4,400,587 | 8/1983 | Taylor et al. | 379/266 X |
| 4,737,983 | 4/1988 | Frauenthal et al. | 379/265 X |

Primary Examiner—James L. Dwyer
Attorney, Agent, or Firm—Christie, Parker & Hale

[57] ABSTRACT

The present invention is a telecommunications control system for accepting a plurality of multi-purpose stations for use as attendant stations in an attendant service complex to service calls directed to the system from originating stations. This system comprises a first plurality of connection controllers. Each connection controller in this first plurality of connection controllers provides for cooperating with a respective one of a plurality of multi-purpose stations in defining opposite ends of a call connection path. Each of these connection controllers has controllable switching means for opening the call connection path and releasing the respective multi-purpose station. The system provides for security against use of any of the multi-purpose stations within the attendant service complex by an unauthorized person. This system further includes a second plurality of connection controllers. Each connection controller is this second plurality of connection controllers provides for cooperating with a respective one of a plurality of originating stations in defining opposite ends of a call connection path. This system further includes controllable inter-connection arranged between the first and second plurality of connection controllers, and includes a system for controlling the inter-connection system such that incoming calls from originating stations are extended to multi-purpose stations that have been accepted as attendant stations.

81 Claims, 66 Drawing Sheets

```
Change   Info   Shifts                  Symbols    Numbers    Monitor
Feb 26, ┌─────────────────────────────────────┐     Thu  12:13:12  am
Shift:  │ Name:   John Smith                  │   Start:  --:--:--  am
Disk:   │ Phone:        1-789-555-1234 │Normal││
        │ Status: Absent                      │▲
        │ Active: Yes                         │
        │ Calls:   16   (ringthrough)         │
        │ Drops:    3   (ringthrough)         │
        └─────────────────────────────────────┘
```

| ▓Dialing | ▯Not Ready | ▤Ready | ▧WATS Call | ▭Made Busy | ▨Forward |

```
Change   Info   Shifts                  Symbols    Numbers    Monitor
Feb 26, ┌────────────────────────────────────┐     Thu  12:14:19  am
Shift:  │ Name:   ┌──────────────────────┐   │   Start:  --:--:--  am
Disk:   │ Phone:  │ Change Shift Phone No:│  │
        │ Status: ├──────────────────────┤──┐│
        │ Active: │      - -             ││Change Number?│
        │ Calls:   16   (ringthrough)   │   No   ▲ Yes  │
        │ Drops:    3   (ringthrough)   └──────────────┘
        └────────────────────────────────────┘
```

| ▓Dialing | ▯Not Ready | ▤Ready | ▧WATS Call | ▭Made Busy | ▨Forward |

Fig. 27

```
Change   Info   Shifts        ▲        Symbols    Numbers    Monitor
Feb 26, 1987                                        Thu  12:54:13  pm
Shift:  EZ   ┌─────────────────────┐              Start:  --:--:--  am
Disk:  2-28-87│ Load Shift Disk    │
              │ Cancel Operator    │ : 22,193
              │ Cancel Aux Operator│ :    561
              └─────────────────────┘
```

| ▓Dialing | ▯Not Ready | ▤Ready | ▧WATS Call | ▭Made Busy | ▨Forward |

Fig. 28

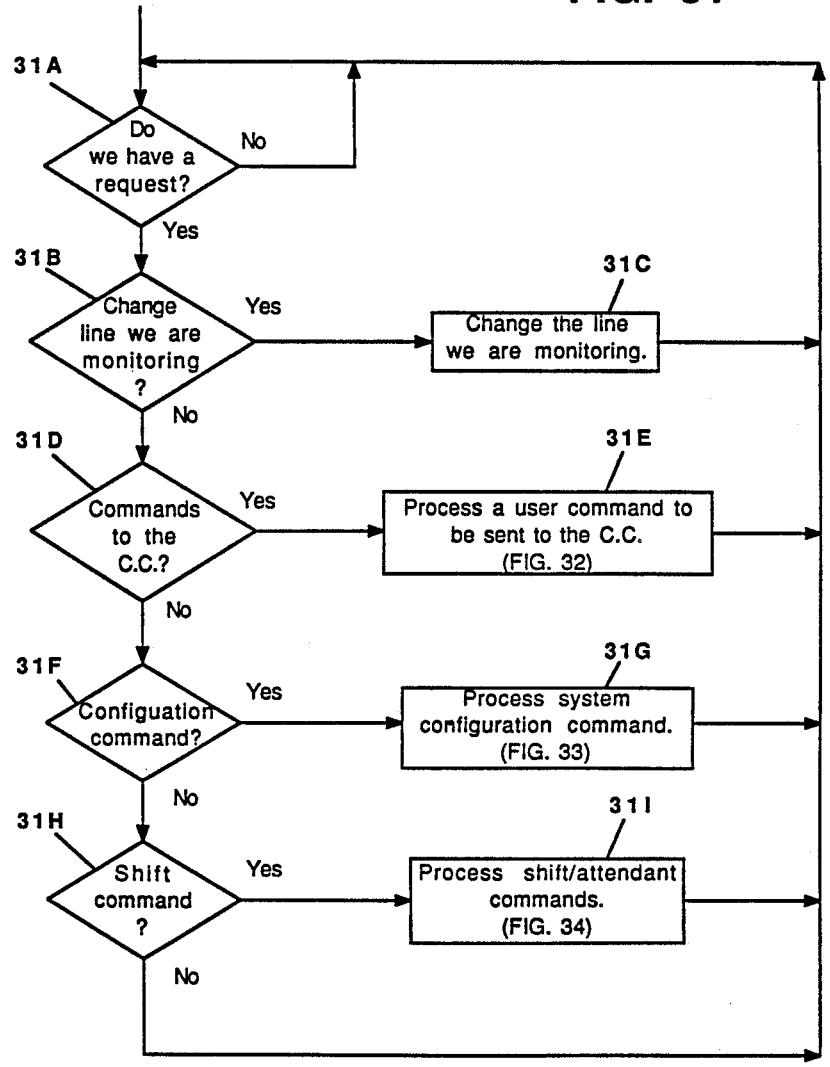

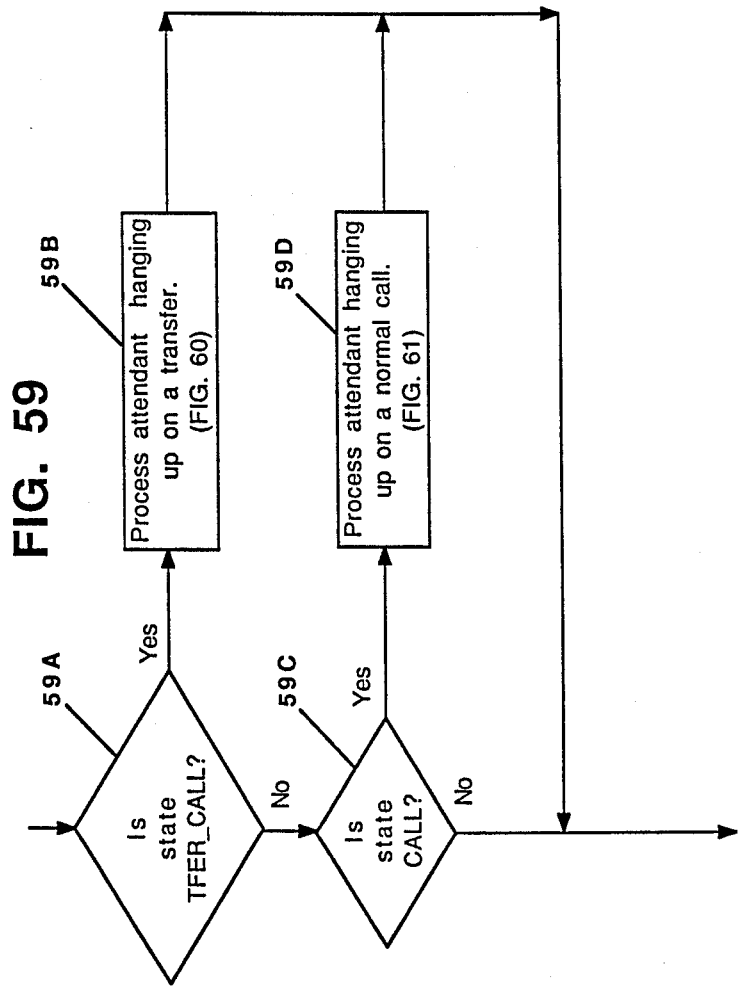

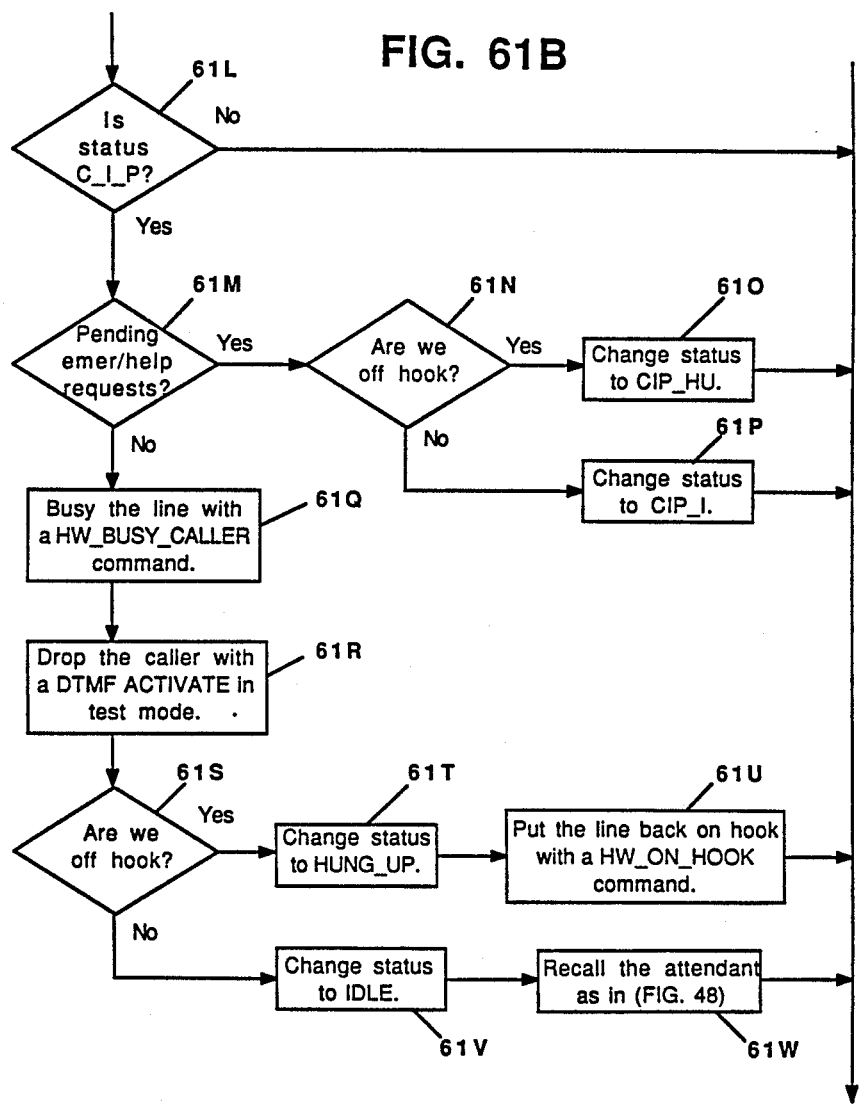

TELEPHONE LINE COMMUNICATIONS CONTROL SYSTEM

CROSS-REFERENCE TO RELATED APPLICATIONS

This is a continuation of application Ser. No. 07/106,726, filed 10/5/87 now abandoned.

BACKGROUND OF THE INVENTION

This invention relates to telephone communications control systems.

Many organizations gather and distribute information in the course of telephone calls serviced at least in part by members of a staff of attendants. Such organizations include major corporations which conduct television or other media advertising campaigns to encourage customers and potential customers to call the organization via a telephone number that is toll-free to the caller. The area code "800" is used in the United States for such toll-free telephone numbers. As for gathering and distributing information, this typically entails having a service attendant elicit the caller's name and address and some kind of ordering information for goods or services and then provide information such as price and delivery information. In some of the many varied situations, the organization is providing "help" to a customer concerning use of the organization's goods or services, including goods such as retail computer programs and services such as repair or maintenance services under a warranty.

Other such organizations include non-commercial public broadcasting stations which solicit contributions from the viewing public to defray the cost of providing the broadcast services. Typically, such stations receive volunteer help from a large group of people who serve as an attendant staff to service incoming calls. Often during such fund raising telecasts, the public broadcasting station shows not only the persons who encourage viewers to call, but also the staff of service attendants who occupy desks on a stage and use telephone station sets specifically dedicated for use by the attendants in servicing incoming calls.

As to commercial television stations, they often broadcast telethons to raise money for charity and likewise need a large group of people to service incoming calls. Religious and other non-commercial organizations also use telecasts to encourage viewers to call the organization to receive pamphlets and other materials of interest.

In each of the above-described situations, there is a need to provide, in a systematic and orderly way, for prompt and efficient servicing of the calls.

Providing attendant service for multiple incoming calls at the same time requires multiple incoming lines. Unless a sufficient number of incoming lines are provided to meet the needs of peak volume traffic, incoming callers will have to wait for service, and the longer the wait, the higher the percentage of callers who will hang up before receiving service. A tariff charge must be paid by the subscriber for every incoming line. Further, if the incoming line is one which provides for toll-free dialing, the subscriber must pay usage charges for the line. Thus, a substantial expense can be incurred in subscribing to and using many lines.

It is highly desirable to minimize the percentage of time that is spent on what can be categorized as overhead time, such as time spent in completing a connection between an incoming line allocated to a call request and a line to an attendant station.

As a result of advances in technology, particularly in digital data processing and digital switching techniques, and as a result of substantial efforts in research and development, various electronic systems have been developed to perform complex functions in controlling telephone communications lines. These electronic systems include very powerful PABXs (private automatic branch exchanges), ACDs (automatic call distributors), and the like. An ACD system is designed to perform functions to provide for uniformly distributing incoming calls among members of an attendant service staff.

Another type of electronic system that is of interest as background is disclosed in U.S. Pat. No. 3,859,473 to Brown et al., titled "Centralized Attendant Service Arrangement for PABX Complex." An object of the system Brown et al. disclose is to provide a centralized attendant service (CAS) arrangement which permits all incoming calls to a complex of PABXs to be handled at a single attendant position location. Another type of electronic system that is of interest as background is disclosed in U.S. Pat. No. 3,881,060 to Connell et al., titled "Emergency Reporting System." The system Connell et al. disclose is directed to providing features to facilitate routing of incoming calls originated by dialing a universal emergency number, such as "911," to a selected community emergency service center. The incoming calls are routed on the basis of where the originating station is located so that each such emergency call is answered at the community emergency center that serves that location.

Despite these advances in technology and despite the substantial effort in research and development, there has continued to be a need for a system to facilitate handling multiple incoming calls, in an efficient way.

SUMMARY OF THE INVENTION

This invention provides a novel and advantageous system for meeting the need to facilitate handling multiple calls entering the system in an efficient way.

The invention may be defined in various terms. According to one definition of the present invention, it resides in a telecommunications control system for accepting a plurality of multi-purpose stations for use as attendant stations in an attendant service complex to service calls directed to the system from originating stations. This system comprises a first plurality of connection controllers. Each connection controller in this first plurality of connection controllers provides for cooperating with a respective one of a plurality of multi-purpose stations in defining opposite ends of a call connection path. Each of these connection controllers has controllable switching means for opening the call connection path and releasing the respective multi-purpose station.

The system includes means for providing security against use of any of the multi-purpose stations within the attendant service complex by an unauthorized person. The security-providing means includes means for controlling the switching means to open the call connection path and release the multi-purpose station. This system further includes a second plurality of connection controllers. Each connection controller in this second plurality of connection controllers provides for cooperating with a respective one of a plurality of originating stations in defining opposite ends of a call connection path. This system further includes controllable interconnection means arranged between the first and second plurality of connection controllers, and includes means for controlling the inter-connection means such that incoming calls from originating stations are extended to multi-purpose stations that have been accepted as attendant stations.

Numerous advantages of the above-described system flow from those features adapting it to cooperate with multi-purpose stations. For example, there is no need to make an extra investment to acquire stations to be dedicated solely to this system. Such an extra investment is particularly substantial in the case of an order-entry system or the like in which the multi-purpose stations involve more cost than an ordinary telephone set as is the case for multi-purpose stations that include video display terminals or the like and related equipment such as modems for telecommunication of data via the system. Further, the system does not place any constraint on where the multi-purpose stations are to be located. To the contrary, according to a particularly preferred feature, the first plurality of connection controllers are connected to outgoing lines connected to the public switched network, whereby the multi-purpose stations can be located in homes.

Taken in combination with the feature as to multi-purpose stations, the security-providing feature of the above-described system is particularly advantageous. Preferably, the security-providing means includes means for receiving a security clearance signal via the call connection path to a multi-purpose station. In the presently preferred embodiment of the system, as described in detail below, the system has automatic dialing circuitry used to originate calls to multi-purpose stations. When the call originated by the system to the multi-purpose station results in the multi-purpose station going on line, as for example when an authorized person takes the handset of a multi-purpose telephone station off hook, the authorized person uses the station keypad to input a code defining the security clearance signal which is transmitted in DTMF (dual tone multi frequency) signal form to the system. The preferred embodiment includes means for receiving the security clearance signal and converting it to a logic signal. The logic signal cooperates with a timing means in the system. If such logic signal is not defined within a predetermined timing interval, the system automatically releases the multi-purpose station so that it will not be accepted for use as an attendant station in the attendant service complex.

According to another definition of the invention, it resides in a system for networking such a plurality of multi-purpose stations in an attendant service complex. To provide for such networking, the system includes connection controllers arranged into a first plurality and a second plurality, with the first plurality providing for cooperating with multi-purpose stations and with the second plurality cooperating with originating stations. Controllable inter-connection means are arranged between the first and second plurality of connection controllers. In accord with a highly advantageous feature, the system for networking includes means for controlling the inter-connection means such that incoming calls from originating stations are extended to multi-purpose stations that have been networked for use as attendant stations with such controlling means including means for causing a plurality of incoming calls to be extended to the same multi-purpose station during an interval throughout which the multi-purpose station remains networked as an attendant station.

This highly advantageous feature significantly reduces overhead time. Particularly when incoming traffic is high, it is highly desirable to extend one incoming call after another to an attendant station with minimum interruption. In a system such as the preferred embodiment of this invention where the networked multi-purpose stations can be at any location serviced by the public switching network, a relatively large amount of time is required to carry out a call connection operation. An amount of time in the order of 10 seconds or more is quite significant in this context, particularly when considered in light of high volume traffic where it is desirable to completely service the calls within an average time span in the order of a couple of minutes.

To minimize line usage charges even further, the presently preferred embodiment of this invention is operable in traffic volume dependent modes, and includes means operative during one such mode to release a multi-purpose station, then respond to a request to establish a call connection path for an incoming call by originating a call to, and re-establishing the previously released multi-purpose station as an attendant station, and then substantially simultaneously complying with the request in extending the incoming call to the re-established attendant station. Usage charges for both outgoing and incoming lines are reduced because of this feature. As to outgoing lines, the reduction in usage charges is a function of the average duration of a call compared to the average duration between calls. As to incoming lines, because in this sequence the multi-purpose station is re-established as a network station before responding to the request, usage charges for the expensive incoming lines such as "800" lines are reduced.

According to another definition of the present invention, it resides in an interactively-supervised, computer-controlled system for allocating tasks in a network for servicing incoming calls. The system comprises computer processing means and call extending means. The computer processing means includes means providing digitally coded commands to the call extending means and the call extending means includes means providing status data to the computer processing means so that the call extending means provides for extending incoming calls for answer and service by a group of service attendants in accord with an allocation of tasks determined by the digitally coded commands. The system further includes display means and manual input means for use by a supervisor in interactively controlling the computer processing means. The computer processing means is continually responsive to status data provided by the call extending means to generate on the display means a human-readable, continually updated status report by which the supervisor may be prompted to use the manual input means to enter supervisory commands. The computer processing means is responsive to such manually entered supervisory commands to provide digitally coded commands to cause a reallocation of tasks.

The foregoing and other novel and advantageous features of this invention are described in detail below and are recited in the appended claims.

BRIEF DESCRIPTION OF THE DRAWINGS

FIG. 26 shows another representative displayed status report, in which a pull-down menu appears as a result of the selection of "Info";

FIG. 27 is related to FIG. 26, and shows a portion of the displayed status report in which the supervisor is being prompted to confirm a change in a phone number;

FIG. 28 shows a top portion of a displayed status report, in which a pull-down menu appears as a result of the selection of "Shifts";

FIG. 31 is a general flow chart of overall operations involved in the third of the three processes carried out by the supervisory computer, the process of FIG. 31 being for the user interface;

FIG. 59 is a more detailed flow chart of certain operations generally referred to in FIG. 47B, in particular operations carried out if an attendant has hung up;

DETAILED DESCRIPTION

Figure 1:
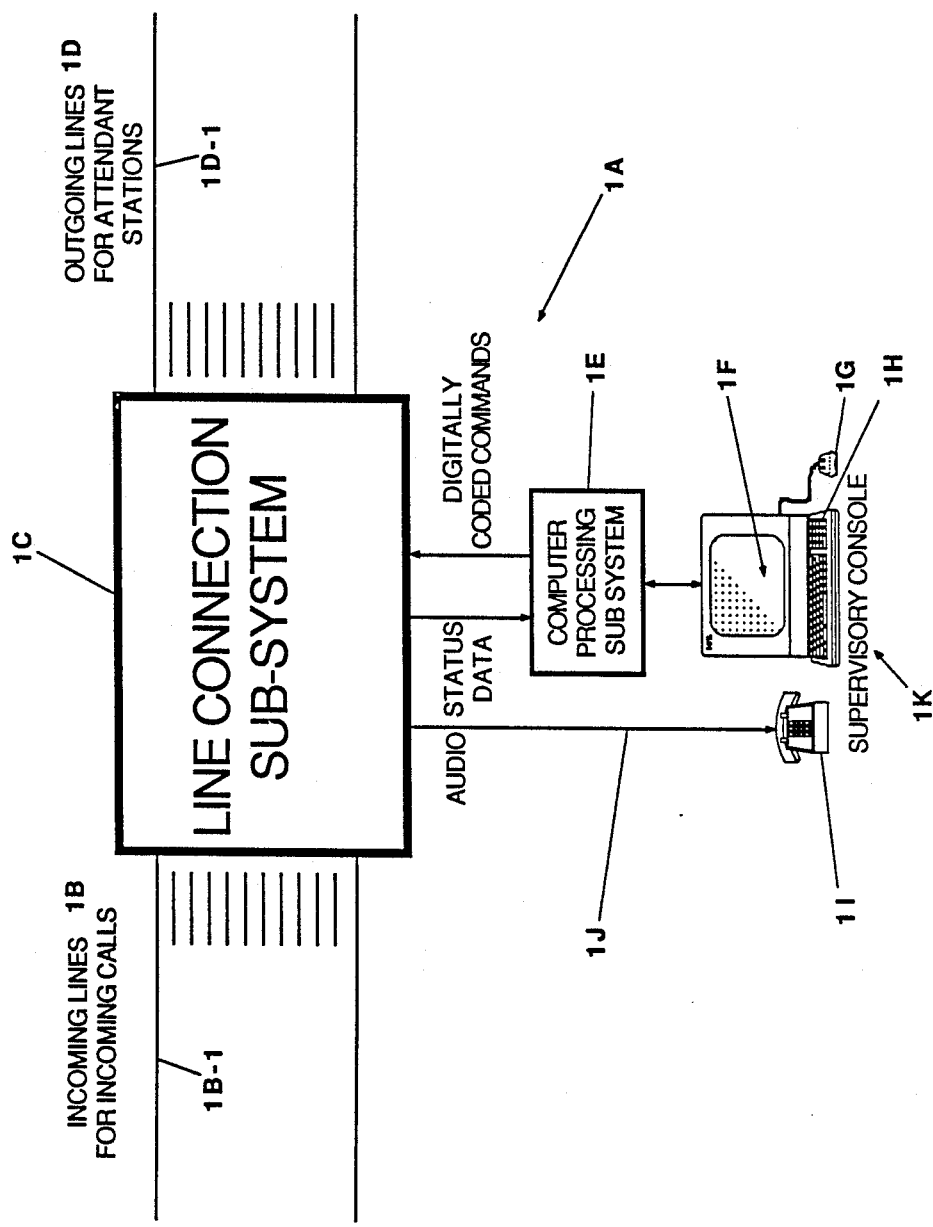
FIG. 1 is an overall general functional block diagram of a system embodying preferred features of the invention to provide for interactively supervising a computer-controlled sub-system to allocate tasks in a network for servicing incoming calls.

FIG. 1 shows, in general block diagram form, major functional elements of an interactively-supervised, computer controlled system 1A organized in accord with the presently preferred embodiment of this invention. System 1A provides for allocating tasks in a network for servicing incoming calls arriving on a plurality of incoming telephone lines 1B such as incoming line 1B-1.

System 1A comprises a line connection sub-system 1C arranged between incoming telephone lines 1B and a plurality of outgoing telephone lines 1D such as line 1D-1. System 1A further comprises a computer processing sub-system 1E which digitally communicates with line connection subsystem 1C. In digitally communicating with line connection sub-system 1C, computer processing sub-system 1E provides digitally coded commands and receives status data. Through such digital communication, line connection sub-system 1C cooperates with computer processing sub-system 1E and operates under its control to provide a call extending controller 2A (FIG. 2) capable of operating on an autonomous basis to extend incoming calls for answer and service by a group of people working as service attendants in accord with an allocation of tasks determined by the digitally coded commands.

System 1A further includes a display means such as a video display terminal 1F and manual input means such as a mouse 1G for use by a person designated as a supervisor in interactively controlling computer processing sub-system 1E. A keyboard 1H is part of video display terminal 1F, and may also be used by a supervisor who prefers to enter supervisory commands by keyboard entry rather than through mouse IG.

A supervisory station 1I is connected via a monitor phone line 1J to line connection sub-system 1C to provide an audio link that the supervisor uses to confer with an incoming caller, with one or more service attendants, or with an incoming caller and a service attendant simultaneously. In system 1A, supervisory station 1I is a conventional touch-tone dial telephone instrument with a microphone and speaker for optional hands-free talking and listening; one of numerous alternatives involves using a headset as supervisory station 1I. In combination, supervisory station 1I, video display terminal 1F, and mouse 1G provide a supervisory console generally indicated as 1K.

Computer processing sub-system 1E is continually responsive to status data provided by line connection sub-system 1C to generate on video display terminal 1F a human-readable, continually updated status report by which the supervisor may be prompted to use mouse 1G to enter supervisory commands. Computer processing sub-system 1E is responsive to such manually entered supervisory commands to provide digitally coded commands to cause a re-allocation of tasks, as explained more fully below with reference to more detailed drawings concerning the construction and operation of system 1A.

One of the advantages of the present invention is that the above-described major functional elements and the manner in which they cooperate are such that system 1A can be set up in any of a variety of configurations to suit the needs of any particular organization and facilitate the handling of multiple incoming calls in an efficient way. With respect to computer processing sub-system 1E, the functions it performs divide in a general way into functions relating to communicating with and controlling line connection sub-system 1C whereby incoming calls can be autonomously extended, and into functions relating to communicating with and controlling video display terminal 1F whereby human readable status reports can be displayed and the supervisor can interactively exercise human control over system functions. A suitable, and presently preferred, configuration of computer processing sub-system 1E entails two physically separate microprocessor-controlled computers of the kind commonly described as personal computers, and a data communication link between the two personal computers. Herein, one of these personal computers is referred to as a controlling computer, and the other as a supervisory computer. With such presently preferred configuration, the controlling computer operates under software control to cooperate with line connection sub-system 1C to define call extending controller 2A (FIG. 2) which extends incoming calls to service attendants on an autonomously operating basis. It should be understood that the physical division of computer processing sub-system 1E into two separate personal computers is a subordinate detail. It would be suitable, for example, to employ a so-called "dumb terminal" with which a supervisor interacts with the system, and to concentrate computer processing functions within a single computer.

Figure 2:
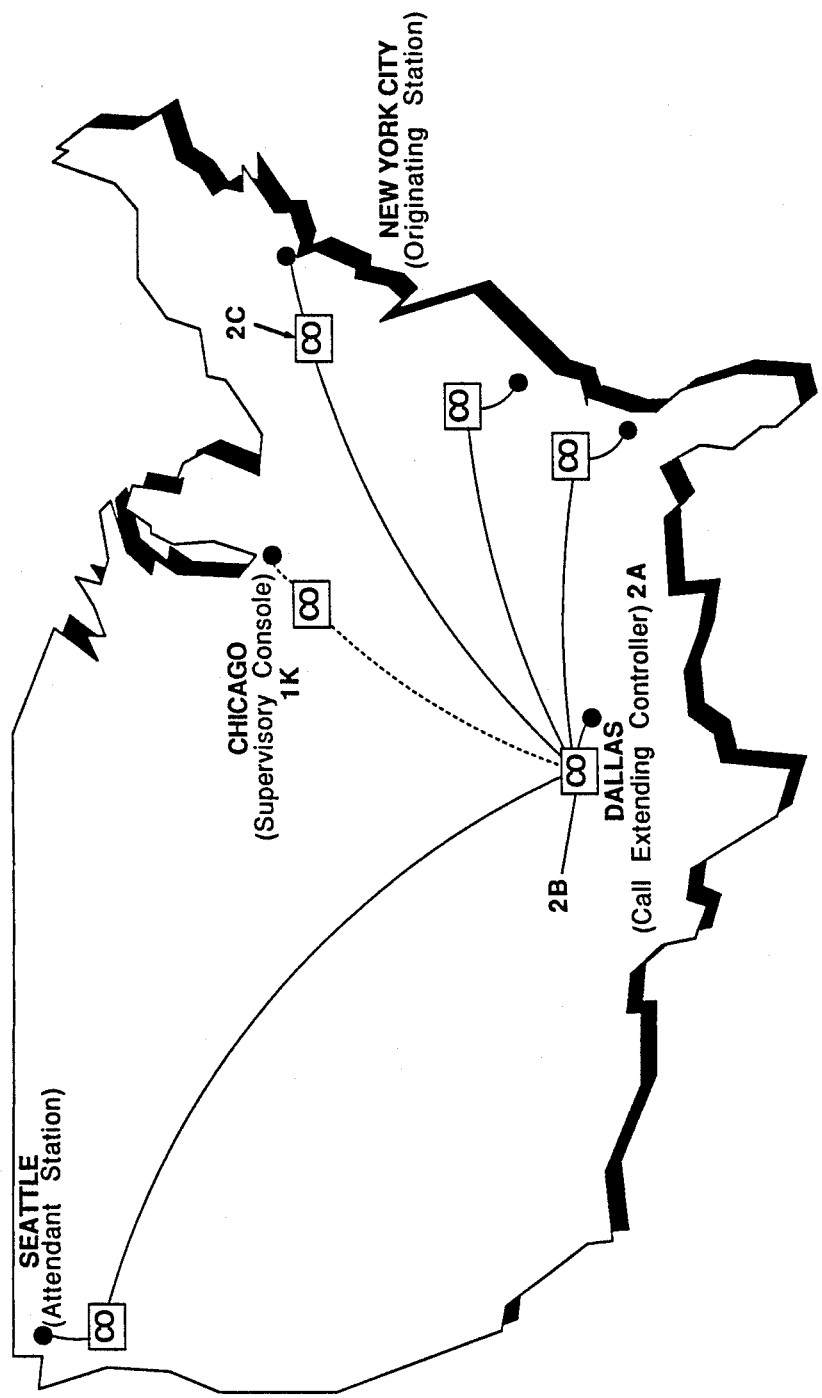
FIG. 2 is an annotated map indicating a representative, geographically-dispersed configuration of a system embodying a preferred feature of the invention whereby the public switched network is used to extend calls to multi-purpose stations located in various parts of the United States.

With reference to FIG. 2, there will now be described a representative overall system configuration, set up for an organization having facilities in Dallas, Tex. and an office in Chicago, Ill.

The representative configuration of FIG. 2 takes advantage of particularly preferred features of a system embodying the invention, whereby the incoming lines and the outgoing lines are connected to the public switched network. Because the incoming lines are connected to the public switched network, through a central office 2B near the Dallas facilities, a caller can originate an incoming call to the system from any arbitrary location, e.g., New York City as indicated in FIG. 2, with the incoming call being routed through a nearby central office 2C over the public switched network to central office 2B. The organization can subscribe to a group of incoming toll-free lines, all appearing to have the same "800" telephone number. The routing of any incoming call, originated by dialing the "800" number, is effected in accord with the standard techniques of the public switched network.

Because the outgoing lines are connected to the public switched network, incoming calls can be extended to various arbitrary locations, including private homes where ordinary home telephones can be used by a part-time staff of at-home service attendants to answer and service the calls.

For example, one of the part-time staff of at-home service attendants can answer and service calls extended by system 1A through the public switched network to Seattle, Washington, as indicated in FIG. 2.

Because of the three-hour difference between the time zones for the East Coast and the West Coast, it often will be desirable to take this time difference into account in forming a shift of at-home service attendants. Thus, when a high volume of incoming calls are likely to be placed from locations in the East Coast in the early morning there, say between 6:00 a.m. and 7:00 a.m., it is more desirable for the staff of at-home service attendants to be selected from residents along the East Coast.

As to the person who is to serve as the supervisor of the system, that person likewise can work at any arbitrary location, e.g., in the organization's offices in Chicago. In accord with preferred features of this invention, modems (not shown in FIG. 2) are provided to communicate data over the public switched network between call extending controller 2A located in Dallas and supervisory console 1K located in Chicago.

Further with respect to overall operation of system 1A, it is highly desirable for it to provide features making efficient use of the investment made in the system and in leasing telephone lines, and to minimize telephone usage charges, both with respect to usage charges for the incoming lines that are toll free only to the originating parties, and with respect to usage charges for the outgoing lines.

To provide for such efficiency, it is advantageous for the system to include automatic dialing features to place calls to a group of multi-purpose stations such as at-home telephones, and accept these called stations as network stations, all just before the beginning of any period of predictable high volume incoming traffic. System 1A has such preferred automatic dialing features as disclosed in more detail below, and has further novel and advantageous features relating to accepting multi-purpose stations into the network or complex of attendant service stations, and relating to performing this function in a highly automated way. As part of this automation, system 1A provides automatic message transmitting features, whereby service attendants upon answering the call automatically placed by the system are greeted with a pre-recorded message, alerting them that the call being answered is one from the system, and thereby prompting the entry of a code defining a security clearance signal which is transmitted in DTMF (Dual Tone Multi Frequency) signal form to system 1A. System 1A provides for transmitting numerous other messages under various circumstances, such as at the end of a shift; for transmitting music, for example, while a service attendant is waiting to have an incoming call extended; and for transmitting a prompt tone to the service attendant just before an incoming call is to be extended.

Figure 3:
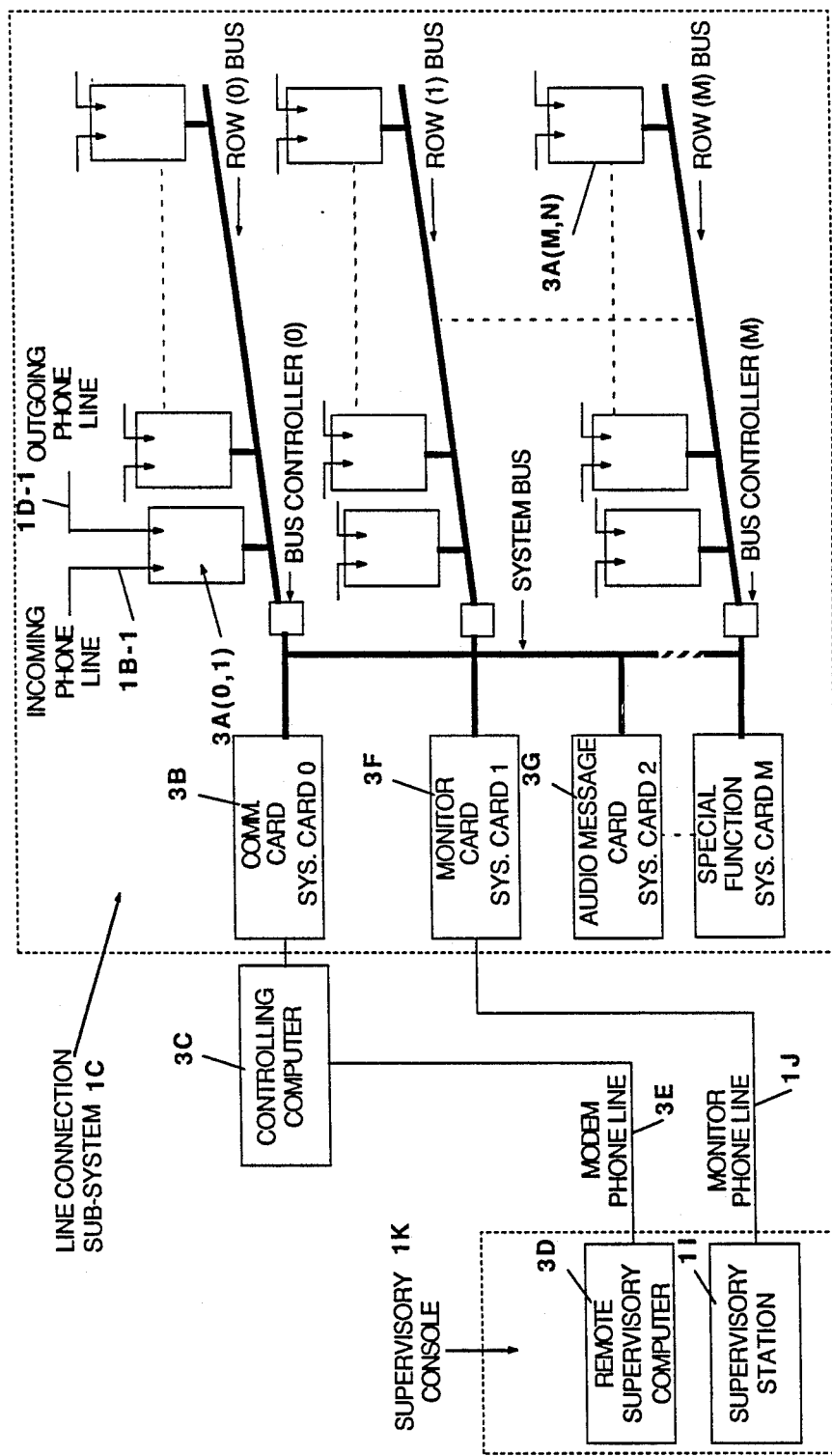
FIG. 3 is a functional block diagram illustrating a modular organization of electronic equipment incorporated in the preferred embodiment.

With reference to FIG. 3, system 1A will now be described at a more detailed block diagram level. To emphasize basic features of system 1A and to avoid obscuring such basic features with subordinate detail, various matters concerning the construction of this specific embodiment are referenced in FIG. 3 in general terms. One such matter concerns a matrix of line cards referenced in FIG. 3 in general terms as line card 3A(0,1) through line card 3A(M,N), where M stands for row and N stands for column. In a specific embodiment, particularly suitable for handling a high volume of incoming traffic, there are 105 line cards arranged in seven rows (0 ... 6) and fifteen columns (1 ... 15).

The line cards form part of line connection subsystem 1C that is appropriately characterized as a hardware sub-system. In addition to the line cards, sub-system 1C includes a separate row bus corresponding to each row of line cards, including row (0) bus, row (1) bus, and row (M) bus. Sub-system 1C further includes a separate bus controller corresponding to each row bus, including bus controller (0), bus controller (1), and bus controller (M). Sub-system 1C further includes a system bus, and a plurality of system cards. As presently arranged, the specific embodiment has the capacity to receive up to seven different system cards, including such system cards as may be provided in future expansion to provide special functions that may be desired. One of the system cards that is used in this specific embodiment is a SYS. CARD 0, which is also referred to as communications card 3B.

FIG. 3 also shows a controlling computer 3C which communicates with line connection sub-system 1C through communications card 3B. Communications card 3B has an asynchronous communications interface for communicating with controlling computer 3C. FIG. 3 also shows supervisory console 1K as comprising a remote supervisory computer 3D and supervisory station 1I. A modem phone line 3E connects remote supervisory computer 3D to controlling computer 3C. Controlling computer 3C has an internal modem which is connected via modem phone line 3E to a remote modem within remote supervisory computer 3D.

Another one of the system cards, viz, SYS. CARD 1 (also referred to as monitor card 3F) communicates with supervisory station 1I via monitor phone line 1J. Another one of the system cards, viz, SYS. CARD 2 (also referred to as audio message card 3G) provides circuitry used in automatic message transmitting features of system 1A.

Each line card has an incoming line interface, an outgoing line interface, and a row bus interface. Line card 3A(0,1) has its incoming line interface connected to incoming line 1B-1, and has its outgoing line interface connected to outgoing line 1D-1. In general, any line card can be referred to as line card 3A(i,j), and in accord with such general terminology, such line card 3A(i,j) has its incoming line interface connected to incoming line 1B-[(i*15)++j] and its outgoing line interface connected to outgoing line 1D-[(i*15)+j].

Each of the line cards along a row has its row bus interface connected to the particular row bus of row bus (0) through row bus (M) that corresponds to that row. All the bus controllers and all the system cards connect directly to the system bus.

Figure 4:
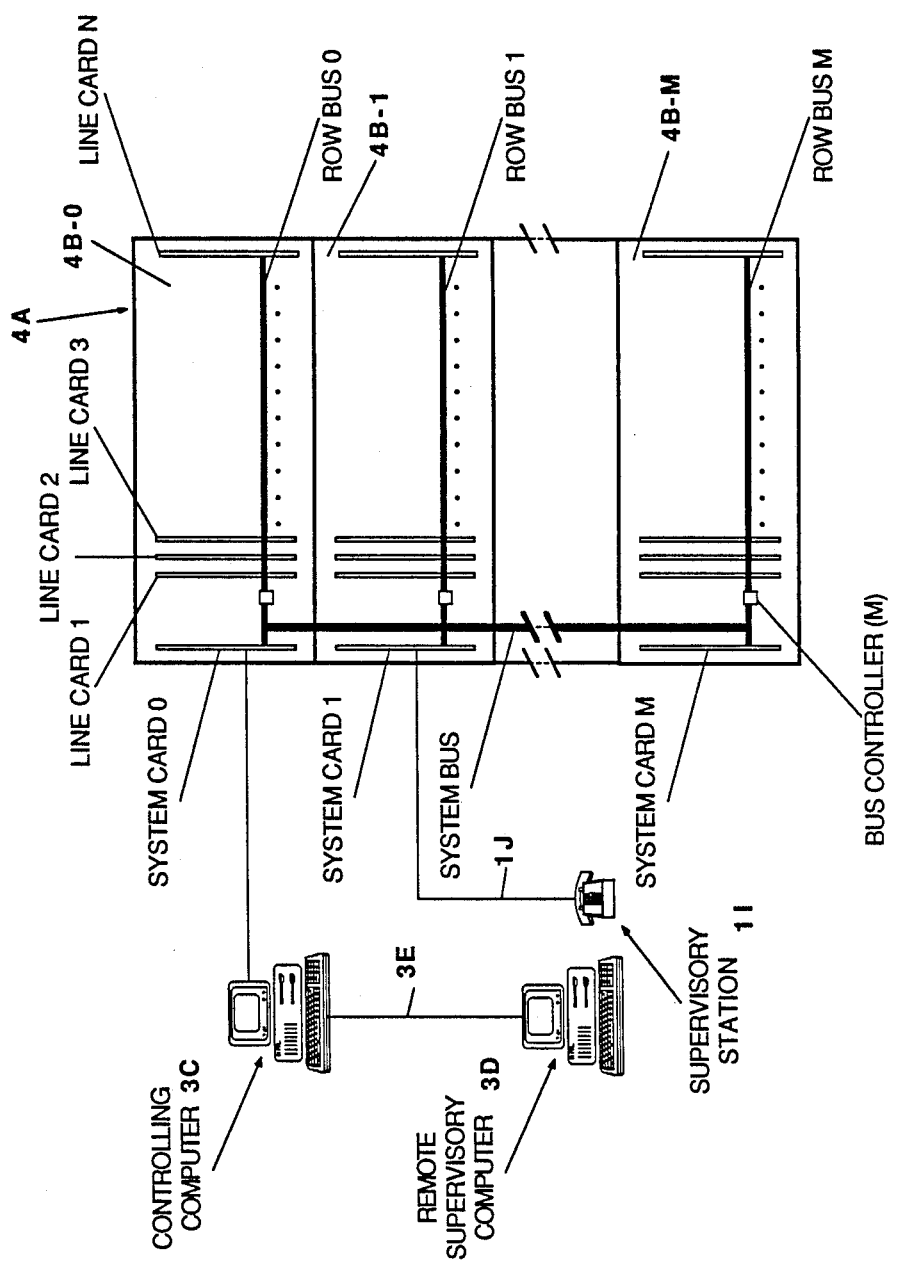
FIG. 4 shows mechanical features of the modular organization.

FIG. 4 shows the line cards in place within a cabinet 4A that is a standard size cabinet for housing rack-mounted printed circuit boards. Within cabinet 4A there are seven backplane or motherboards 4B-0 through 4B-M, each extending across the width of cabinet 4A. In accord with conventional techniques, each line card has an edge connector for connection to a mating, vertically oriented connector on such a motherboard. As indicated in FIG. 4, the fifteen line cards of each row are horizontally spaced apart within cabinet 4A.

Each motherboard has, in addition to the fifteen connectors for a row of line cards, another connector for a system card. As indicated above, each system card communicates with the system bus. Each motherboard also supports circuitry (FIG. 5) for implementing the functions of the bus controller for the corresponding row.

To provide a further general overview of the entire system before proceeding into a detailed disclosure of specific implementing hardware, there will now be described, with reference to FIG. 23, a representative human-readable status report that is displayed to the supervisor. This representative displayed status report, like others described below, has a format suitable for presentation on a standard 25-line monochrome display, but preferably is displayed on a color display so that easily remembered color codes can facilitate prompting of the supervisor.

The top line of the displayed status report is referred to herein as a main menu selection line. Any item on the main menu selection line can be selected by the supervisor by moving mouse 1G so as to position a mouse cursor to the desired item and clicking a button on the mouse. Some of the main menu items have associated sub-menus (not shown in FIG. 23), each of which presents sub-selections in a pull-down menu upon selection of a main menu item. Further, some sub-selections on certain pull-down menus have associated options that are presented as a pull-out menu as explained more fully below.

Figure 23:
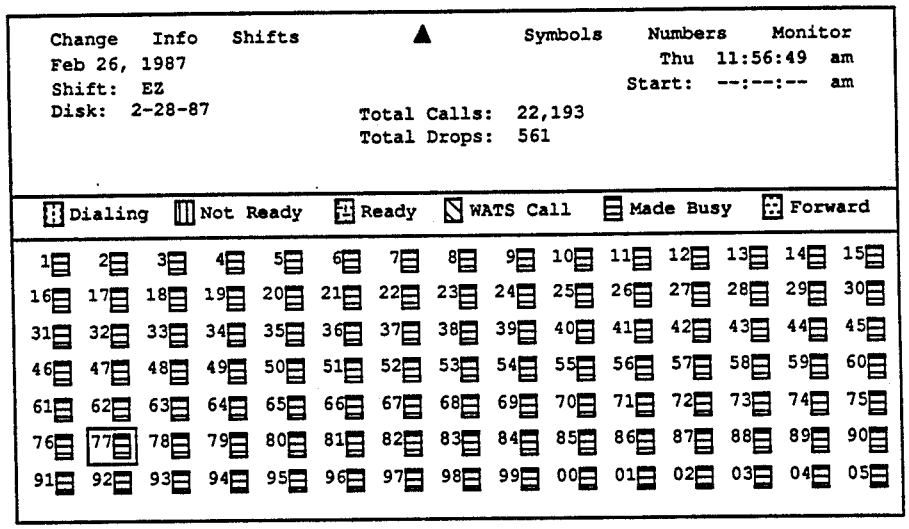
FIG. 23 shows a representative displayed status report for a supervisor at a supervisory console.

The main menu items appearing on the representative displayed status report of FIG. 23 are "Change," "Info," "Shifts," "Symbols," "Numbers," and "Monitor."

Beneath the main menu selection line there is an area that in the representative displayed status report of FIG. 23 sets out what can be categorized as "global information." This global information includes the current date and time and information concerning a "shift"; i.e., information identifying, as a group, the people who are serving as service attendants, and statistical information ("Total calls" and "Total Drops") concerning the performance of the system.

Beneath the global information area is a legend line showing six items, viz, "Dialing," "Not Ready," "Ready," "WATS Call," "Made Busy," and "Forward." Each of these items is displayed with a color-coded box to aid the supervisor in interpreting color coding of the displayed status report.

Beneath the legend line there is a matrix display area that in this specific embodiment has 105 elements that are in one-to-one correspondence with the 105 line cards mentioned above. Each of the elements in the matrix display area comprises a box and an optional line card number. Each box provides status information concerning a corresponding line card; preferably this is provided by color coding the boxes. In FIG. 23, each box is shaded for the color blue, this being the color used to indicate a line card condition in which there is no attendant on line, and software has made the line card idle by "busying" its incoming line. Other colors, not shown in FIG. 23, are: bright red to indicate that the attendant is not ready to service an incoming call; yellow to indicate that the attendant is waiting for an incoming call; green to indicate that the attendant is servicing an incoming call; and grey to indicate that, during a particular mode, referred to hereafter as call forward mode, the attendant is not on line.

One box at a time is surrounded by a frame that serves as a display pointer to a line card. In FIG. 23, the display pointer happens to be framing the box numbered "77." This means that the supervisor can issue supervisory commands targeted to affect the line card that has a line card ID of "77." If the supervisor wants to issue supervisory commands targeted to affect a different line card, the supervisor can move mouse 1G to position the mouse cursor at the desired box, then click the mouse button, and the display pointer will jump to the selected box.

If the supervisor desires to erase the line card ID numbers that appear in this displayed report, the supervisor can position the mouse cursor to the "Numbers" item on the main menu selection line, then click the mouse cursor button, and the line card ID numbers will be erased. The "Numbers" item on the main menu selection line constitutes a toggle-type selection; i.e., successive selections of this item toggles the numbers on and off. If the supervisor desires to be prompted by symbols instead of color coding (as when a monochrome display is being used), the supervisor can position the mouse cursor to the "Symbols" item on the main menu selection line, then click the mouse button, and status-representing symbols will replace the color-coded boxes in the matrix and in the legend line. Like the "Numbers" item, the "Symbols" item is a toggle. Another toggle item is the "Monitor" item. Successive selections of this item toggle between an incoming line monitor and an outgoing line monitor. The status of the monitor item toggle is also visually displayed; in the preferred embodiment, the display pointer is a single line frame in one case, and a double line frame in another case. There is no need for any pull-down menu for any of the toggle items.

Figure 5:
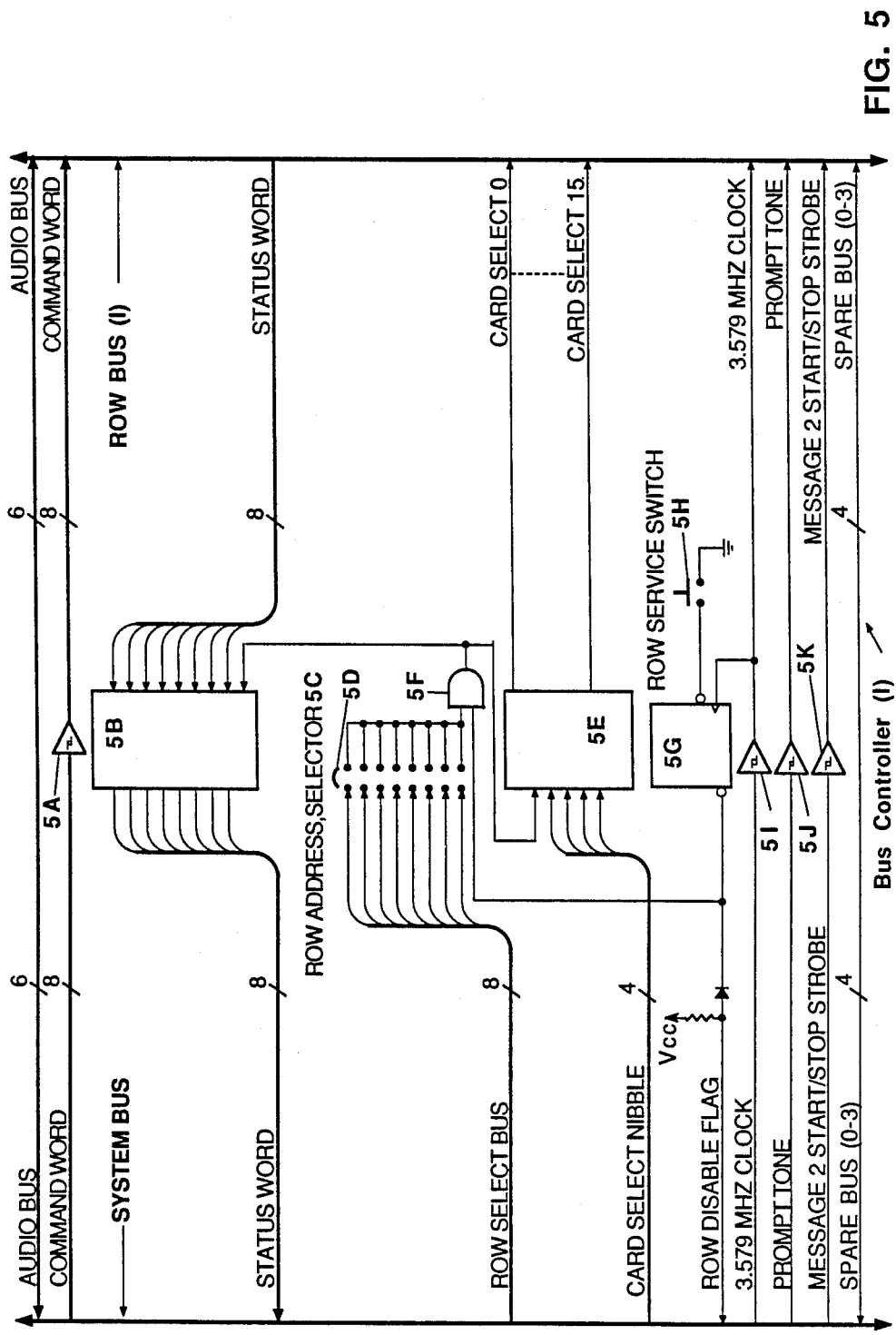
FIG. 5 is a block and schematic diagram of a bus controller incorporated in each of a series of rows of a line connection sub-system rack mounted in a cabinet in the preferred embodiment.
Figure 6:
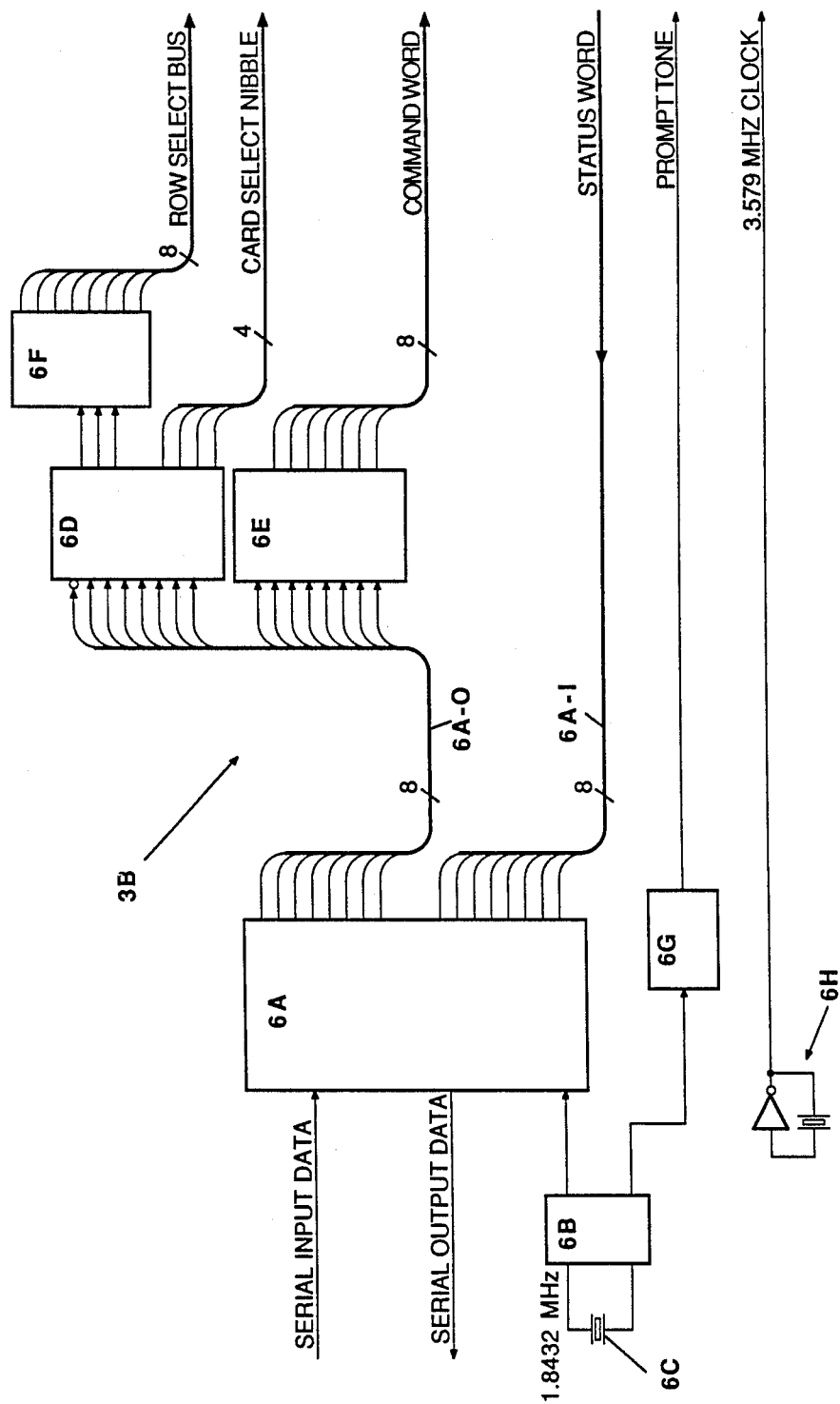
FIG. 6 is a block and schematic diagram of circuitry included on a communications card used in the preferred embodiment.

With reference to FIGS. 5 and 6, there will now be described circuitry involved in communicating digitally coded commands and status data, and audio, between controlling computer 3C and sub-system 1C. FIG. 5 shows circuitry for implementing a bus controller; as stated above, each motherboard has such a bus controller. FIG. 6 shows circuitry for implementing communications card 3B.

Each bus controller has essentially the same construction, and, for generality of reference, circuitry shown in FIG. 5 is identified therein as "BUS CONTROLLER (I)." This circuitry is connected between the system bus and row bus (I).

The system bus has 42 parallel conductors. Six of these parallel conductors are referred to as an Audio Bus which provides for propagating signals identified as Message 1, Message 2, Message 3, Message 4, Music, and Monitor Audio. The purposes of these signals have been generally described above as part of the general overview of the system and various features it provides including automatic message transmission features, etc. Each row bus has six corresponding parallel conductors, and each bus controller directly connects together the Audio Bus portion of the system bus and the Audio Bus portion of the row bus. This is indicated in FIG. 5 by the line labelled "Audio Bus" that extends between the lines labelled "SYSTEM BUS" and "ROW BUS (I)."

The number of parallel conductors in the Audio Bus is indicated in FIG. 5 by a slash and the number 6 next to the slash. This symbology of a slash and an adjacent number is used throughout the drawings to indicate the number of parallel conductors that are represented as a single line.

Eight other parallel conductors of the system bus provide for propagating a Command Word. In FIG. 5, a functional block 5A is used to indicate that eight parallel Schmitt trigger drivers are included in each bus controller for communicating each such Command Word to the corresponding row bus.

Eight other parallel conductors of the system bus provide for propagating a Status Word. As indicated in FIG. 5, a tri-state bus driver 5B is included in each bus controller for selectively communicating a Status Word from the corresponding row bus to the system bus.

Eight other parallel conductors of the system bus are referred to as a Row Select Bus which provides for propagating a one-out-of-eight selection signal. As indicated in FIG. 5, each bus controller has a row address selector 5C comprising a group of terminal pairs with which a jumper 5D is used to configure a row address. It should be understood that one of these eight conductors is a spare providing for system expansion from the seven-row matrix of cards used in the specific embodiment being described.

Four other parallel conductors of the system bus provide for propagating a Card Select Nibble. As indicated in FIG. 5, a decoder 5E is included in each bus controller for decoding the Card Select Nibble. Decoder 5E has an enable input connected to the output of an AND gate 5F. If the output of AND gate 5F is true, and a Card Select Nibble is applied to decoder 5E, then one of sixteen Card Select signals will be true. A Card Select 0 signal selects a system card within a row. Each of the remaining fifteen such card select signals selects a line card within a row.

One other conductor of the system bus provides for propagating a Row Bus Disable Flag produced by a retriggerable one-shot 5G in response to manual actuation of a row service switch 5H.

One other conductor of the system bus provides for propagating a 3.579 MHz Clock signal. Each bus controller has a Schmitt trigger driver 5I for propagating this clock signal to the corresponding conductor of the row bus.

One other conductor of the system bus provides for propagating a Prompt Tone signal. The Prompt Tone signal is used for the purpose, generally described within the general overview of the system, of prompting a service attendant to be prepared to service an incoming call; the Prompt Tone signal is automatically transmitted over an outgoing line just before an incoming call is extended for answer and service by the service attendant. Suitably, the Prompt Tone signal has a frequency of 400 Hz. Each bus controller has a Schmitt trigger driver 5J for propagating this Prompt Tone signal to the corresponding conductor of the row bus.

One other conductor of the system bus provides for propagating a Message 2 Start/Stop Strobe signal. Each bus controller has a Schmitt trigger driver 5K for propagating this strobe signal to a corresponding conductor of the row bus.

Four other conductors of the system bus define a spare bus providing for system expansion.

As shown in FIG. 6, communications card 3B includes a UART (Universal Asynchronous Receiver Transmitter) 6A having an "S In" input for receiving serial input data (from controlling computer 3C) and having an "S Out" output for transmitting serial output data (to controlling computer 3C). A baud rate generator 6B and a crystal 6C tuned to 1.8432 MHz cooperate to provide an input control signal to UART 6A to set its baud rate.

With respect to the serial input data UART 6A receives, UART 6A performs a serial-to-parallel conversion function such that each group of eight successive bits of a byte are converted to parallel format and applied to an eight-conductor signal path 6A-0. With respect to the serial output data UART 6A transmits, UART 6A performs a parallel-to-serial conversion function such that each eight-bit Status Word it receives in parallel from the system bus via a signal path 6A-I is converted to serial form for transmission to controlling computer 3C.

Communications card 3B further includes an 8-bit address latch 6D, an 8-bit command word latch 6E, and a 3×8 decoder 6F that are arranged to respond to the parallel output of UART 6A; and further includes a divider 6G that performs a frequency dividing function in response to an output of generator 6B to produce the Prompt Tone at approximately 400 Hz; and further includes a crystal-controlled clock source 6H for producing the 3.579 MHz Clock. The output of decoder 6F is connected to the row select bus conductors of the system bus. The four least significant bit positions of latch 6D provide the Card Select Nibble to the system bus. The 8-bit output of latch 6E provides the Command Word to the system bus. The Prompt Tone and the 3.579 Mhz Clock are applied to the system bus.

The digitally coded commands that controlling computer 3C issues to sub-system 1C are received in serial form by UART 6A. These digitally coded commands include commands having a two-byte format, one byte defining a card address and another byte defining a Command Word. A card address byte, converted from serial to parallel by UART 6A, undergoes two levels of decoding, one level to address a row of line cards, and another level to address a line card within the addressed row. As to the row-addressing, the most significant nibble of the addressing byte is, after it is latched within part of address latch 6D, decoded by decoder 6F so that only a selected conductor of the eight-conductor row select bus propagates a true signal whereas the remaining conductors propagate a false signal. Because there are seven rows in this embodiment, three addressing bits suffice to identify a row. The most significant bit of a group of eight bits transmitted from controlling computer 3C may be coded to distinguish an address from a Command Word.

If, for example, row 0 of the matrix of line cards is being addressed, Row Select 0 (FIG. 5) will be true. In bus controller (0), jumper 5D connects a terminal pair of row address selector C such that the true condition of Row Select 0 causes the output of AND gate 5F to become true (if the row has not been disabled for service via actuation of row service switch 5H). While the output of AND gate 5F is true, decoder 5E is enabled to decode the Card Select Nibble provided by part of latch 6D (FIG. 6). If, for example, line card 3A(0,1) is being addressed, the Card Select Nibble will cause decoder 5E to force the Card Select 1 signal to be true, and to force the Card Select 0 signal and each of Card Select 2 through Card Select 15 signals to be false.

The digitally coded status data that controlling computer 3C receives from line connection sub-system 1C are transmitted in serial form by UART 6A. The signal flow in this direction proceeds from a row bus to a tristate bus driver 5B within the corresponding bus controller. The output of AND gate 5F is applied to an enable input of tri-state bus driver 5B to perform the same kind of selection function as has been described above, whereby only one row bus at a time is selected to provide a Status Word to the system bus. UART 6A on communications card 3B serializes the Status Word it receives from the system bus, and transmits it as its serial data output to controlling computer 3C.

Figure 7:
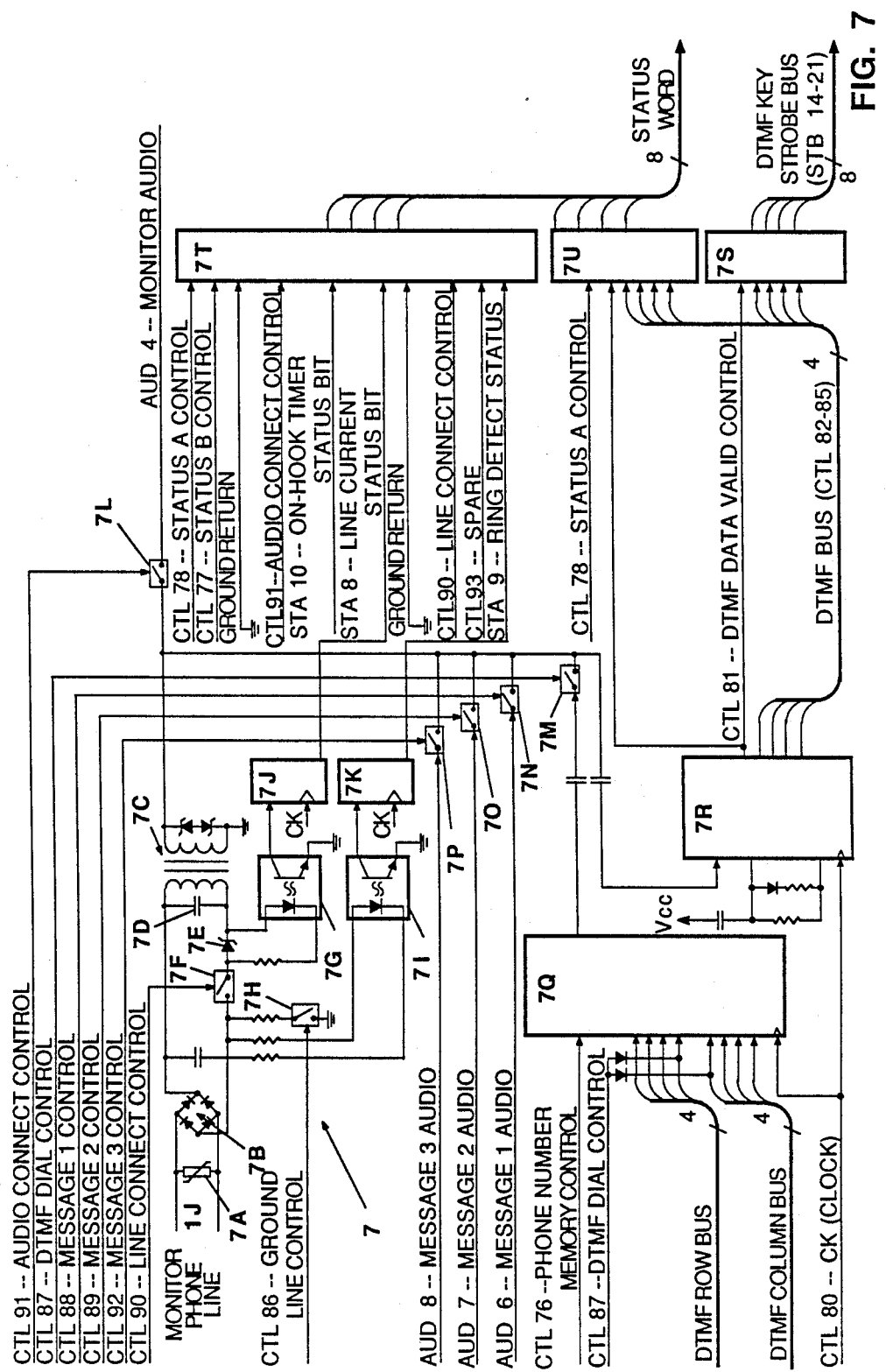
FIG. 7 is a block and schematic diagram of circuitry for a supervisory station connection controller included on a monitor card used in the preferred embodiment.
Figure 8:
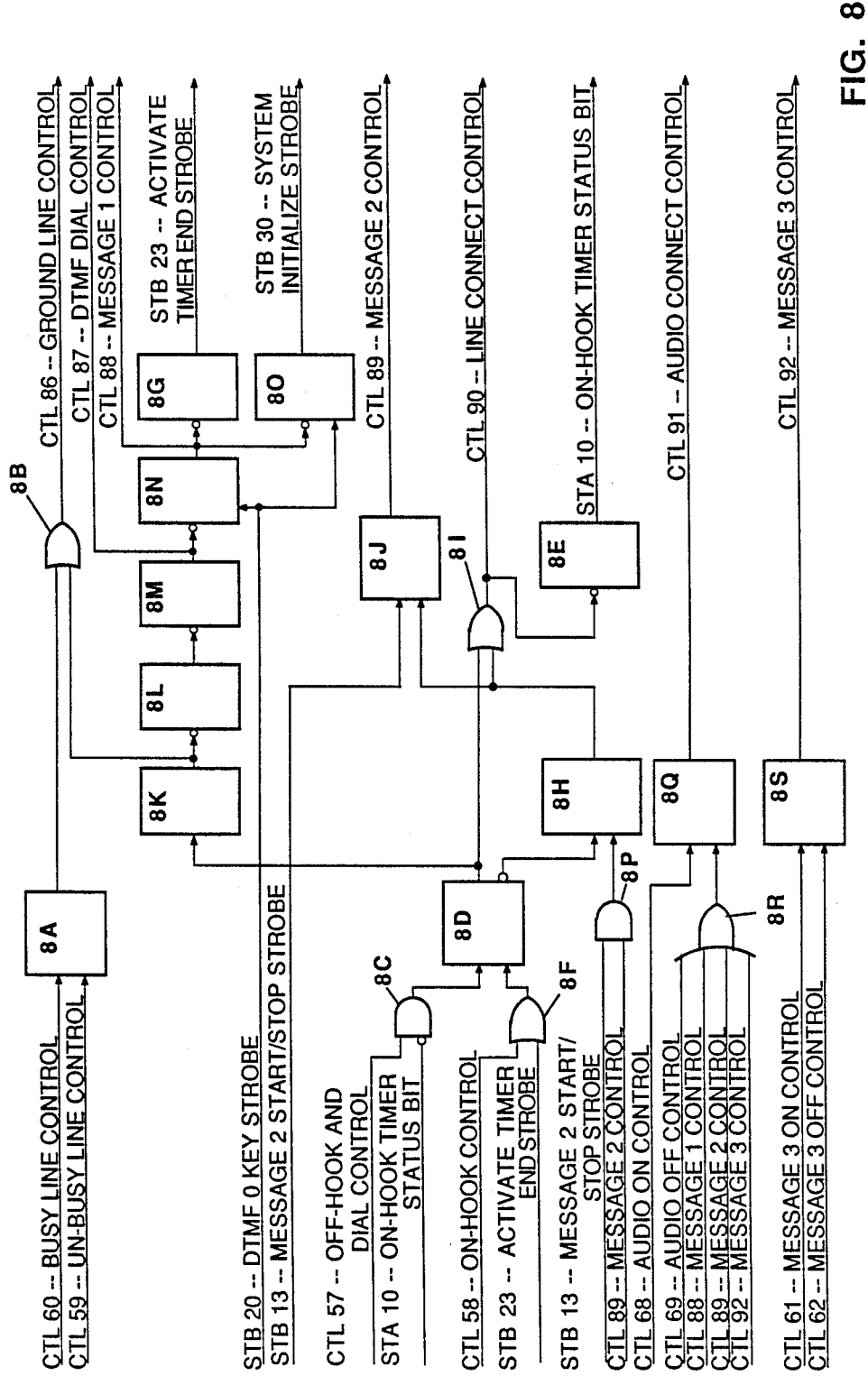
FIG. 8 is a block and schematic diagram of sequencing circuitry for the monitor card.
Figure 9:
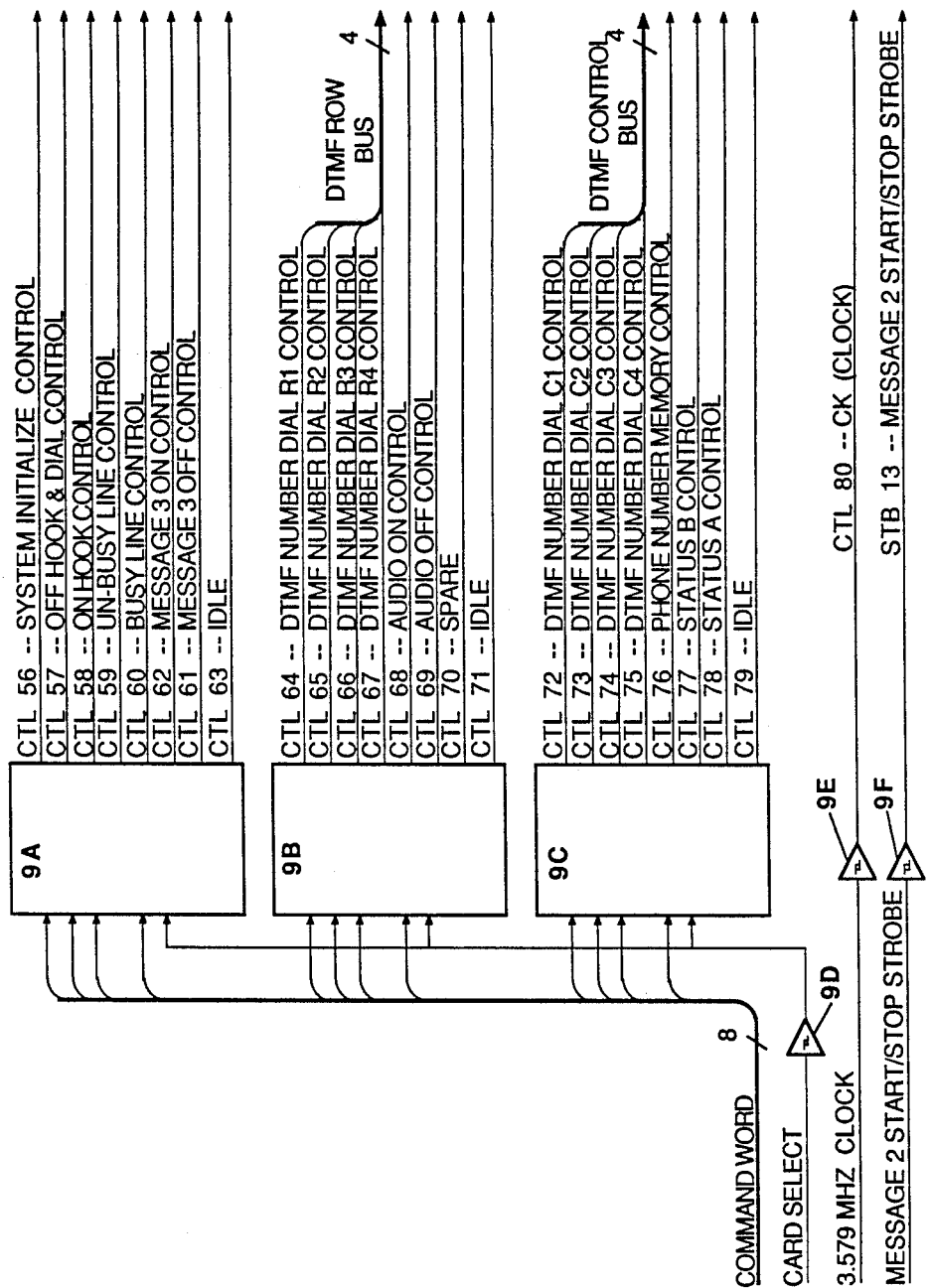
FIG. 9 is a block and schematic diagram of command-decoding circuitry for the monitor card.

With reference to FIGS. 7, 8, and 9, there will now be described circuitry included on another system card, viz, monitor card 3F.

Monitor card 3F defines, among other things, the interface between line connection sub-system 1C and supervisory station 1I; i.e., monitor phone line 1J has one of its ends connected to monitor card 3F as shown in FIG. 7, and has its opposite end connected to supervisory station 1I. Some of the circuitry shown in FIG. 7, in particular circuitry indicated generally at 7, performs functions for a supervisory connection controller for cooperating with supervisory station 1I to form opposite ends of a call connection path. Other circuitry shown in FIG. 7 performs functions for providing status data to controlling computer 3C. Monitor card 3F includes command-decoding circuitry (shown in FIG. 9) for producing various logic signals, some of which cause logic and sequencing circuitry on monitor card (shown in FIG. 8) to produce other logic signals in a predetermined sequence.

As to the decoding circuitry depicted in FIG. 9, it includes three decoders 9A, 9B, and 9C, and a Schmitt trigger driver 9D. The input to driver 9D is a Card Select signal received from row bus (1). As indicated by FIGS. 2 and 3, monitor card 3F occupies the system slot of row 1 of sub-system 1C. When the bus controller for row 1 is enabled and its decoder 5E (FIG. 5) forces the Card Select 0 signal to be true, circuit 9D enables decoders 9A, 9B, and 9C to produce a valid decoded output in response to the Command Word being propagated to monitor card 3F from controlling computer 3C via the system bus, Schmitt trigger drivers 5A (FIG. 5), and row bus (1).

The circuitry depicted in FIG. 9 also includes a Schmitt trigger driver circuit 9E and a Schmitt trigger driver circuit 9F. Circuit 9E provides for buffering the 3.579 MHz clock. Circuit 9F provides for buffering a Message 2 Start/Stop Strobe.

As shown in FIG. 7, circuitry 7 of the supervisory station connection controller includes an incoming transient-surge suppressor 7A connected across monitor phone line 1J, Tip and Ring lines, and a diode bridge 7B connected between monitor phone line 1J and the Tip and Ring lines to ensure correct polarity for DC potential of the Tip line relative to the Ring line.

Circuitry 7 further includes a transformer 7C having a capacitor 7D connected in parallel with its primary winding, a zener diode 7E, a hook switch simulating controllable switch 7F, which is a relay. While switch 7F is closed and DC loop current flows through it, such DC loop current flows from the Tip line, through the primary winding of transformer 7C, through zener diode 7E, through the closed switch 7F, to the Ring line. While such loop current flows, a voltage is developed across zener diode 7E. A loop-current detecting circuit 7G is connected to be responsive to the voltage developed across zener diode 7E, and includes a switching transistor that is on only while loop current is flowing.

Circuitry 7 further includes a ground-start simulating controllable switch 7H that, like hook switch simulating controllable switch 7F, is a relay. Circuitry 7 further provides for sensing and detecting a ringing signal. In particular, a ringing-signal detecting circuit 7I has its input AC coupled across the Tip and Ring lines, and has a switching transistor that is on if a ringing signal is present.

The controllable switches of circuitry 7 operate in accord with logic signals, the values of which are determined by commands that are issued by controlling computer 3C. One of the logic signals produced by the sequencing circuitry depicted in FIG. 8 is identified in FIG. 8 as "CTL 90-Line Connect Control." This CTL 90 signal is applied as the control input to hook switch simulating switch 7F shown in FIG. 7, as indicated by the reference to "CTL 90-Line Connect Control" adjacent the line leading to switch 7F. The foregoing is in accord with a notational convention used generally throughout the drawings to indicate how various circuits on separate drawing figures are interconnected. Also, as part of the notational convention, the terms "Control," "Strobe," and "Status Bit," are used to indicate the nature of a signal. The term "Control" applies to a signal that has either a true value to establish a control condition or a false value to establish an opposite control condition. The term "Strobe," applies to a signal having a pulse format for initiating or terminating an operation. The term "Status Bit" applies to a signal containing information to be provided to controlling computer 3C is a part of a group defining a Status Word. Further with respect to logic signal notation, the circuitry shown throughout the drawings uses "positive logic control." For example, a true logic level for the CTL 90 control signal causes the switch it controls, viz, switch 7F, to close; otherwise the switch 7F is open.

In addition to the Line Connect Control signal (CTL 90) described above, a Ground Line Control signal (CTL 86) is produced by the sequencing circuitry depicted in FIG. 8 and used to control circuitry 7. More particularly, this CTL 86 signal is used to control ground start simulating switch 7H.

A CK signal (CTL 80) is a buffered clock signal provided by driver 9E (FIG. 9), and is applied as a trigger input to each of two retriggerable one-shots 7J and 7K. One-shot 7J responds to loop-current detecting circuit 7G to produce a Line Current Status Bit signal (STA 8). One-shot 7K responds to ringing-signal detecting circuit 7I to produce a Ring Detect Status signal (STA 9).

The secondary winding of transformer 7C is connected to a controllable switch 7L that defines a controllable inter-connection means arranged between the line connection controller circuitry 7 and a conductor of the Audio Bus used for propagating a Monitor Audio Signal (AUD 4). Controllable switch 7L is a field effect transistor (FET); a suitable alternative is a relay. Controllable switch 7L is closed while an Audio Connect Control signal (CTL 91) is true; otherwise it is open. The logic level of the Audio Connect Control signal is determined by circuitry depicted in FIG. 8 in accord with signals produced by the command-decoding circuitry shown in FIG. 9.

A circuit node is defined where controllable switch 7L and the secondary winding of transformer 7C are interconnected. Four other controllable switches 7M, 7N, 7O, and 7P are also connected to that circuit node. In operation of system 1A, no more than one of these four switches is closed at any one time. During the time that a call is being placed to a remote supervisor, switch 7M is closed, and the output of a DTMF generator 7Q is coupled through switch 7M so as to dial a telephone number at which the remote supervisor can be reached. Before such dialing commences, a sequence of operations is performed, under control of controlling computer 3C; the sequence includes loading DTMF generator 7Q with a selected telephone number, closing switch 7F to simulate an off hook condition, operating switch 7H in accord with conventional ground start line protocol so that dial tone will be requested, and then causing DTMF generator 7Q to output the stored telephone number for the supervisor.

Switches 7N, 7O, and 7P provide switching control for propagating, respectively, Message 1 Audio (AUD 6), Message 2 Audio (AUD 7), and Message 3 Audio (AUD 8). These three audio signals are used in the automatic message transmitting feature.

A DTMF receiver 7R has its input capacitively connected to the above-mentioned node to which the foregoing numerous switches are connected; receiver 7R provides for detection of in-band signals used in the operation of system 1A. A decoder 7S responds to the parallel output signal of receiver 7R to produce eight different strobe signals that are identified in FIG. 7.

The circuitry depicted in FIG. 7 further includes circuitry for defining the information content of a Status Word to be provided to controlling computer 3C regarding conditions of operation of monitor card 3F. This circuitry includes a three-stage bus driver and multiplexer 7T, and a three-stage, four-bit latch 7U. Multiplexer 7T has an "A Enable" control input and a "B Enable" control input that receive, respectively, a Status A Control signal (CTL 78) and a Status B Control signal (CTL 77). These control signal are produced by decoder 9C (FIG. 9) in response to digitally coded commands issued by controlling computer 3C. When controlling computer 3C issues a digitally coded command to obtain Status A data from monitor card 3F, decoder 9C forces the Status A Control signal (CTL 78) to be true. In response, multiplexer 7T propagates signals from its "A" data inputs to Bits 4–7 of the Status Word. Its "A" inputs include Ground Return, i.e., a false logic value; the Audio Connect Control signal (CTL 91); an On-Hook Timer Status Bit signal (STA 10); and the Line Current Status Bit signal (STA 8). When controlling computer 3C issues a digitally coded command to obtain Status B data from monitor card 3F, decoder 9C forces the Status B Control signal (CTL 77) to be true. In response, multiplexer 7T propagates signals from its "B" data inputs to Bits 4–7 of the Status Word. Its "B" inputs include Ground Return; the Line Connect Control signal (CTL 90); and the Ring Detect Status signal (STA 9). One of the "B" inputs is a spare.

As for Bits 0–3 of a status word provided by monitor card 3F, latch 7U has an enable input that responds to the Status A Control signal (CTL 78). When controlling computer 3C issues a digitally coded command to obtain Status A data from monitor card 3F, decoder 9C forces the Status A Control signal (CTL 78) to be true. In response, latch 7U propagates signals from its data inputs to Bits 0–3 of the Status Word. Its data inputs are the four parallel output signals of receiver 7R, i.e., the CTL 82, CTL 83, CTL 84, and CTL 85 signals. Latch 7U copies these signals whenever receiver 7R forces a DTMF Data Valid Control signal (CTL 81) to become true.

With reference to FIG. 8, the circuitry depicted therein is generally related to sequencing functions, a representative example of which has been generally described above concerning the sequence of operations involved in going off-hook and dialing the supervisor. The circuitry of FIG. 8 includes a busy line flip flop 8A that, like other flip flops and other bit-storing devices described below, has a Q output and a $\overline{Q}$ output. In the case of flip flop 8A, only the Q output is connected to other circuitry. While flip flop 8A is in its set state, its Q output produces a true logic level signal, and its $\overline{Q}$ output produces a false logic level signal. While in its reset state, its Q output is false and its $\overline{Q}$ output is true. Flip flop 8A is set by a Busy Line Control signal (CTL 60), and is reset by an Un-Busy Line Control signal (CTL 59). These setting and resetting signals are produced by decoder 9A (FIG. 9) in response to digitally coded commands issued by controlling computer 3C. The Q output of flip flop 8A is connected to one input of a two-input OR gate 8B, the output of which produces the Ground Line Control signal (CTL 86) for controlling ground start simulating switch 7H (FIG. 7).

The circuitry of FIG. 8 further includes a gate 8C that produces a signal to set a phone line flip flop 8D if an Off-Hook And Dial Control signal (CTL 57) is true and an On-Hook Timer Status Bit signal (STA 10) is false. The Off-Hook And Dial Control signal is produced by decoder 9A (FIG. 9) in response to digitally coded commands issued by controlling computer 3C. The On-Hook Timer Status Bit signal is produced by an on-hook timer circuit 8E. Phone line flip flop 8D is reset when the output of an OR gate 8F is true; this occurs if either an On-Hook Control signal (CTL 58) or an Activate Timer End Strobe signal (STB 23) becomes true. The On-Hook Control signal is produced by the decoder 9A (FIG. 9) in response to digitally coded commands issued by controlling computer 3C. The Activate Timer End Strobe signal is produced by a timer-end one-shot circuit 8G.

The circuitry of FIG. 8 further includes a disconnect timer circuit 8H that has a trigger input and a clear input. When triggered, disconnect timer 8H initiates a sequence of operations involved in playing a message (message 2) to the supervisor and then terminating the call connection path between supervisory station 1I and monitor card 3F. Message 2 in this embodiment has a duration of approximately ten seconds, and is cyclically generated. To ensure that the full message is played from start to finish, disconnect timer circuit 8H provides a timing interval having a maximum duration of twice the length of the message, i.e., twenty seconds.

The trigger input of disconnect timer circuit 8H is connected to the $\overline{Q}$ output of flip flop 8D. A false-to-true transition in the signal produced by the Q output of flip flop 8D, triggers disconnect timer circuit 8H to start to define its timing interval. During this timing interval the Q output of disconnect timer 8H is true. This forces the output signal of an OR gate 8I to remain true; it had been true because the signal produced by the Q output of flip flop 8D had been true until disconnect timer 8H was triggered. The output signal of OR gate 8I is the Line Connect Control signal (CTL 90) that controls hook-switch simulating switch 7F (FIG. 7). Thus, hook switch 7F continues to simulate an off-hook condition while the timing interval defined by disconnect timer 8H is in progress. Also while the signal produced by timer circuit 8H is true, a message 2 flip flop 8J is enabled to respond to the Message 2 Start/Stop Strobe signal (STB 13) which is applied to its toggle input. When the STB 13 strobe occurs while the signal produced by disconnect timer 8H is true, message 2 flip flop 8J changes state. The output signal it produces, a Message 2 Control signal (CTL 89), controls switch 7O (FIG. 7) so that a Message 2 Audio signal (AUD 7) is gated through by the supervisory station connection controller circuitry 7. Thus, this CTL 89 signal becomes true only at the start of a given cycle of message 2, and only if disconnect timer 8H has initiated the sequence of operations for terminating the call connection path between supervisory station 1I and monitor card 3F. The true-to-false transition in the signal produced by OR gate 8I triggers on-hook timer 8E. The timing interval provided by on-hook timer 8E is suitably two seconds; this duration is sufficiently long as to prevent any ambiguity with a "hook flash" type operation of a momentary on-hook condition.

The circuitry of FIG. 8 further includes a group of sequencing circuits arranged in tandem between phone line flip flop 8D and timer end one-shot 8G. These circuits include dial tone one-shot 8K, delay one-shot 8L, dial one-shot 8M, and activate timer 8N. The output of dial tone one-shot 8K is connected to one of the inputs of OR gate 8B. Thus, while the signal produced by one-shot 8K is true, it forces the Ground Line Control signal (CTL 86) to be true. This in turn causes ground-start simulating switch 7H (FIG. 7) to close temporarily, so as to stimulate the source of dial tone to provide it before automatic dialing commences. Suitably, dial tone one-shot defines a 0.5 second pulse for this purpose.

Delay one-shot 8L is triggered by the true-to-false transition in the pulse signal produced by dial tone one-shot 8K and defines a delay period sufficiently long to allow for the source of dial tone to react and to provide the dial tone. Suitably, this delay period is one second. The true-to-false transition in the signal produced by delay one-shot 8L triggers dial one-shot 8M to force a DTMF Dial Control signal (CTL 87) to become true. This CTL 87 signal is coupled through diodes to $R_4$ and $C_1$ inputs of DTMF generator 7Q. These inputs in combination correspond to the "#" symbol; the parallel signals coupled through the diodes initiate the dialing. This CTL 87 signal also controls switch 7M (FIG. 7) so that the automatic telephone number dialing output signal of DTMF generator 7Q is gated through by the supervisory station connection controller circuitry 7. Suitably, the timing interval defined by dial one-shot 8M is two seconds. This is long enough for as many as twenty-one digits to be produced as the telephone number to be dialled to reach supervisory station 1I.

The true-to-false transition in the CTL 87 signal triggers activate timer circuit 8N to start defining a verification timing interval, preferably having a maximum duration of 30 seconds. The Q output of activate timer 8N produces a Message 1 Control signal (CTL 88). This CTL 88 signal controls switch 7N (FIG. 7) to provide for selectively gating Message 1 Audio (AUD 6) for transmission by the system. When an supervisor answers the call at the called supervisory station, the transmission of Message 1 Audio alerts the supervisor that the call has been originated by the system, and provides a prompt for entry of a code defining the security clearance signal.

Activate timer circuit 8N has a clear input that responds to a DTMF Strobe 0 Key Strobe Signal (STB 20). This strobe signal is produced by decoder 7S (FIG. 7) in response to detection of an in-band signal by DTMF receiver 7R; this strobe signal is normally false, and defines a true pulse if a security-clearance signal is provided. This strobe signal is also applied to a disable input of an activate abort one-shot 8O which has its trigger input connected to the Q output of activate timer circuit 8N and which produces a System Initialize Strobe signal (STB 30). If the security verification signal is provided within the maximum time allotted by timer circuit 8N, then the STB 20 signal clears timer circuit 8N and at the same time disables one-shot 8O from being triggered. If timer circuit 8N completes timing out the maximum time it allots, then the true-to-false transition in the signal it provides on its Q output triggers one-shot 8O, thereby causing a true pulse to be defined in the STB 30 signal. The occurrence of a true pulse in the STB 30 signal, in effect, aborts this sequence of events involved in placing a call to a supervisor. It does so by resetting all timers, one-shots, and flip flops on monitor card 3F. This same resetting function is subject to software control. That is, controlling computer 3C issues a command for monitor card 3F to perform this resetting function; this command causes decoder 9A (FIG. 9) to force the System Initialization Control signal (CTL 56) true. Further as to software control, controlling computer 3C, as will be explained below, provides for counting the number of tries to place such a call and causes automatic retries up to a maximum number of retries. The maximum number of retries can be set as desired from supervisory computer 3D.

The circuitry of FIG. 8 further includes an AND gate 8P, an audio connect flip flop 8Q, an OR gate 8R, and a message 3 flip flop 8S. AND gate 8P produces a signal to control the clear input of disconnect timer 8H, in response to two signals, viz, the STB 13 signal and the CTL 89 signal. Audio connect flip flop 8Q has a set input that responds to an Audio On Control signal (CTL 68) produced by decoder 9B (FIG. 9) in response to digitally coded commands issued by controlling computer 3C. The Q output of flip flop 8Q produces the Audio Connect Control signal (CTL 91) that controls inter-connection switch 7L (FIG. 7).

As to OR gate 8R, the signal it produces is applied to the reset input of flip flop 8Q; this signal is true if and only if any one of four signals applied to OR gate 8R is true. One of these four signals is an Audio Off Control signal (CTL 69) that is produced by decoder 9B (FIG. 9) in response to digitally coded commands issued by controlling computer 3C. Another of these four signals is the Message 1 Control signal (CTL 88) produced by activate timer 8N. Another of these four signals is the Message 2 Control signal (CTL 89) produced by message 2 flip flop 8J. Another of these four signals is the Message 3 Control signal (CTL 92) produced by message 3 flip flop 8S.

As to Message 3 flip flop 8S, its state is controlled by signals (CTL 61 and CTL 62) that are produced by decoder 9A (FIG. 9) in response to digitally coded commands issued by controlling computer 3C. Message 3 flip flop 8S produces the CTL 92 signal that controls switch 7P (FIG. 7) to provide for selectively gating Message 3 Audio (AUD 8) for transmission by the system.

Figure 10:
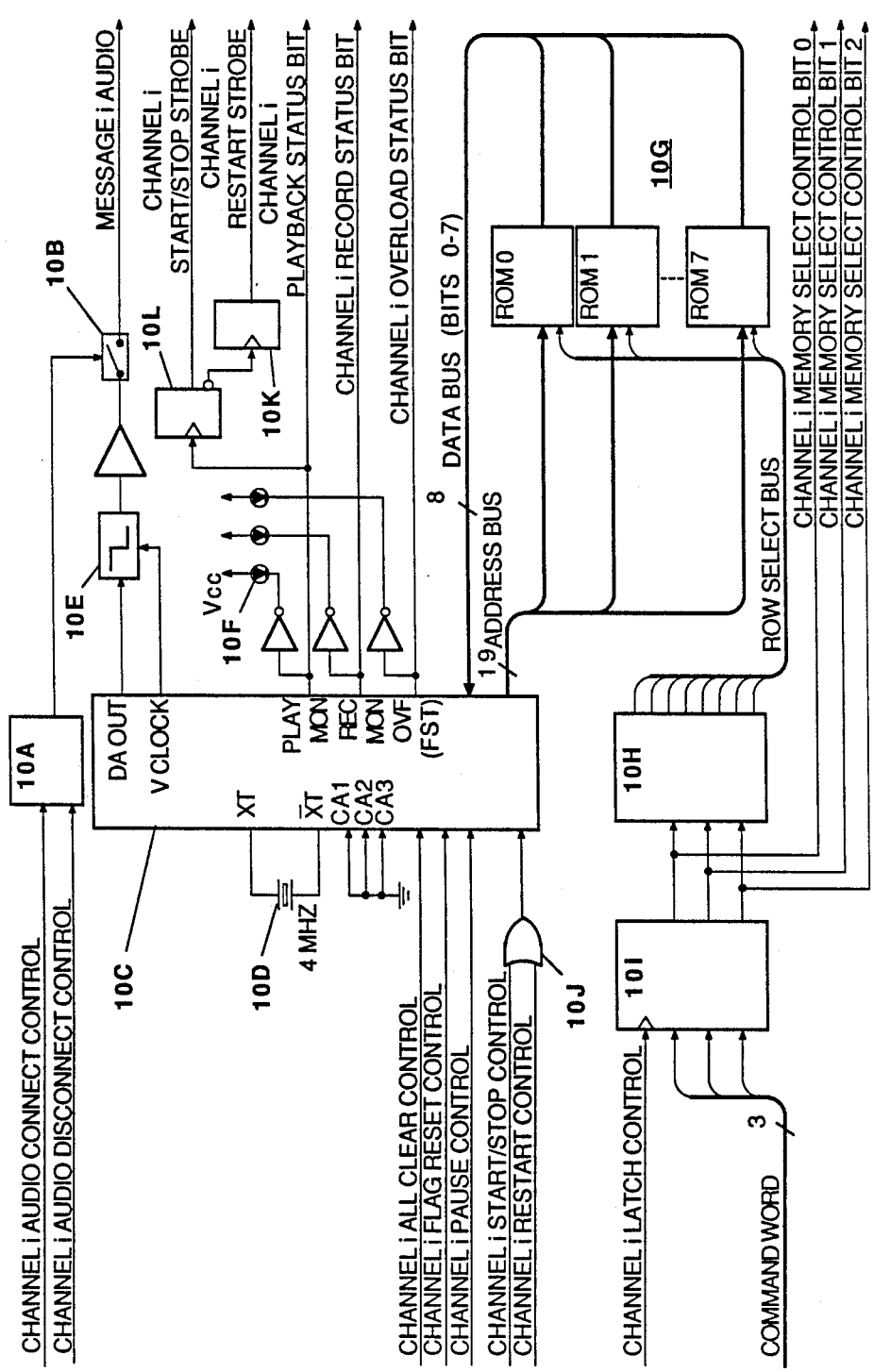
FIG. 10 is a block and schematic diagram of a circuit arrangement that is replicated on an audio message card used in the preferred embodiment for generating and transmitting messages.
Figure 11:
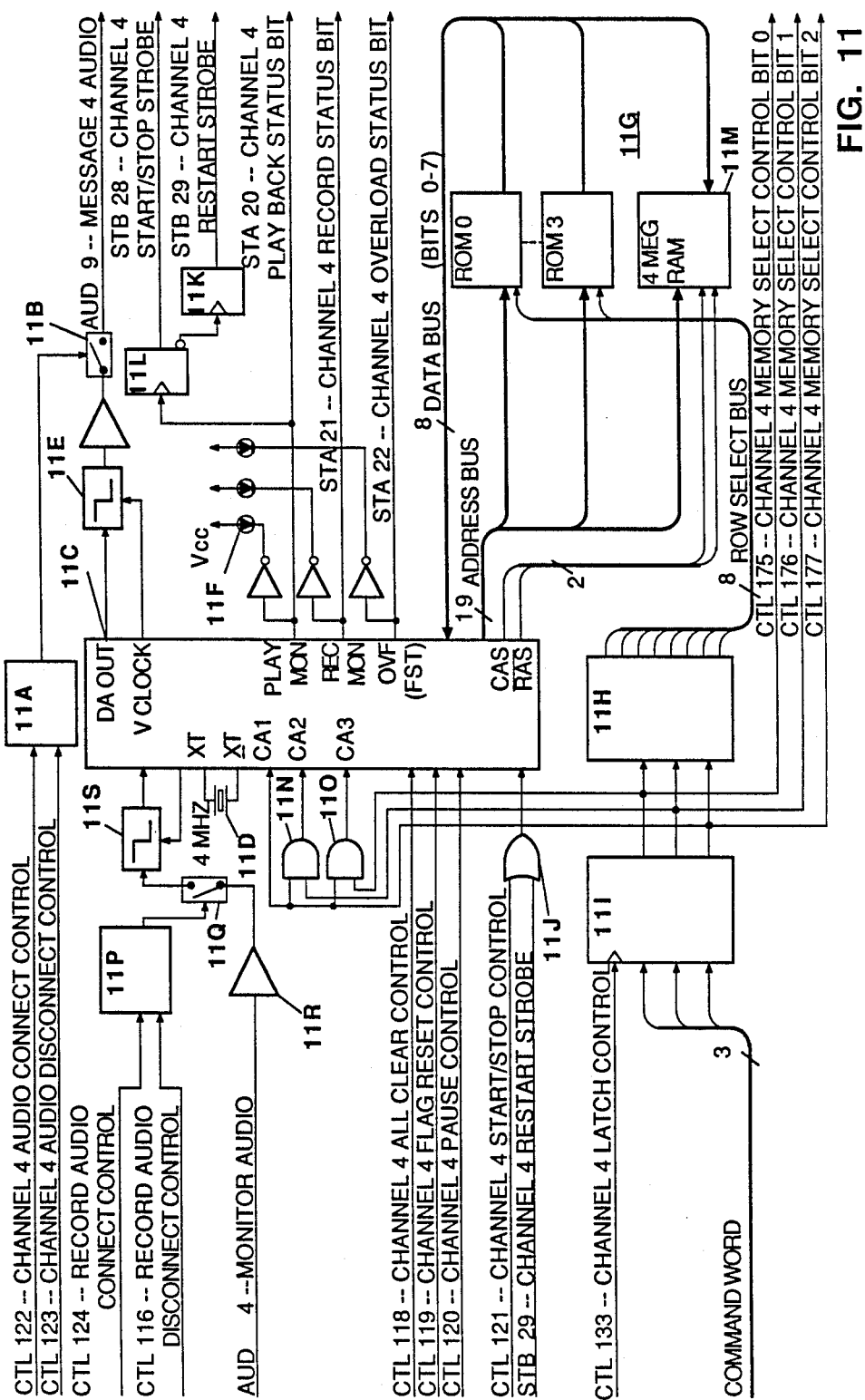
FIG. 11 is a block and schematic diagram of a circuit arrangement, similar in most respects to that of FIG. 10, and having additional circuitry used for digitizing an audio message and storing the digitized message in a RAM.
Figure 12:
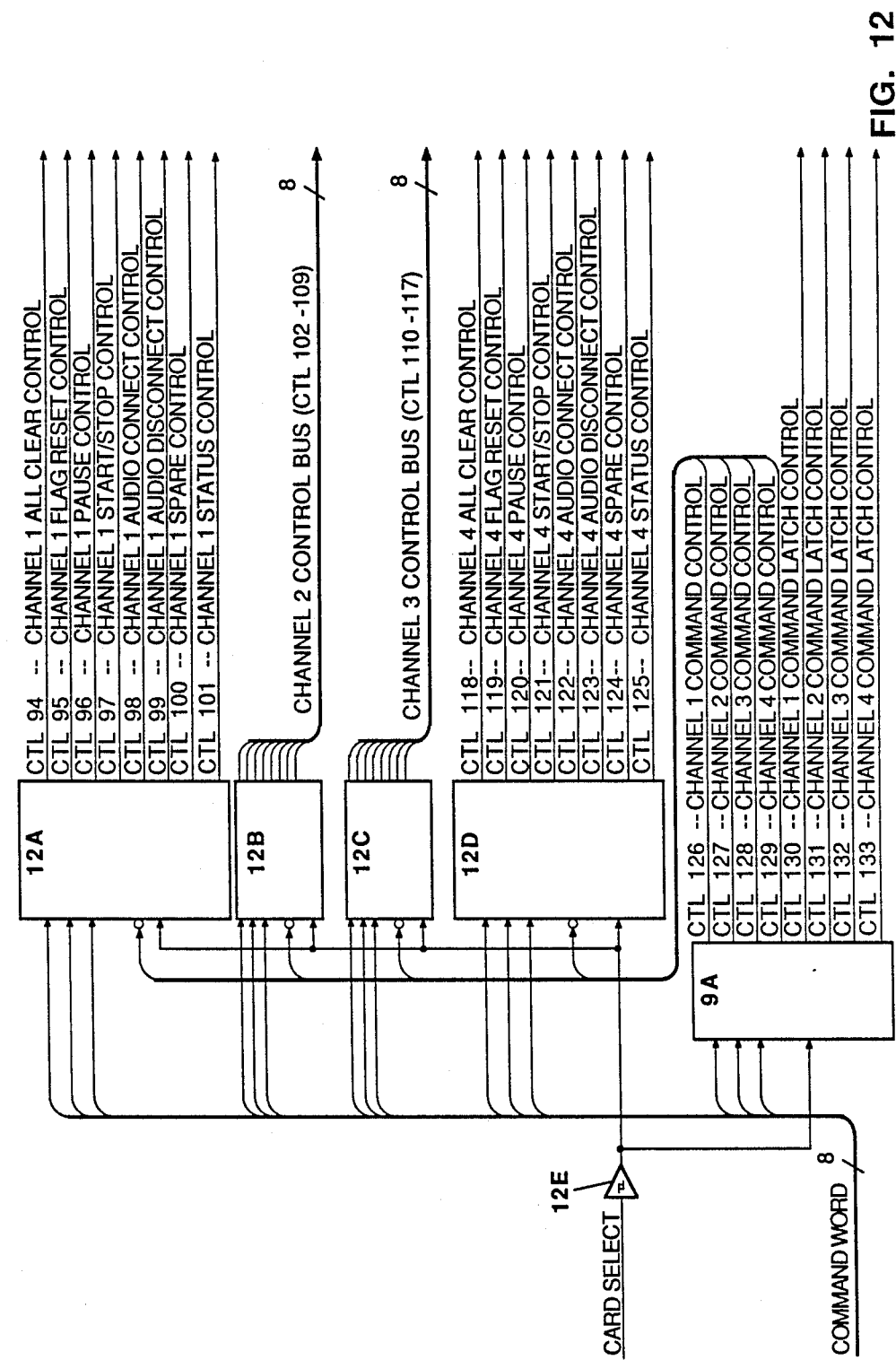
FIG. 12 is a block and schematic diagram of command-decoding circuitry for the audio message card.
Figure 13:
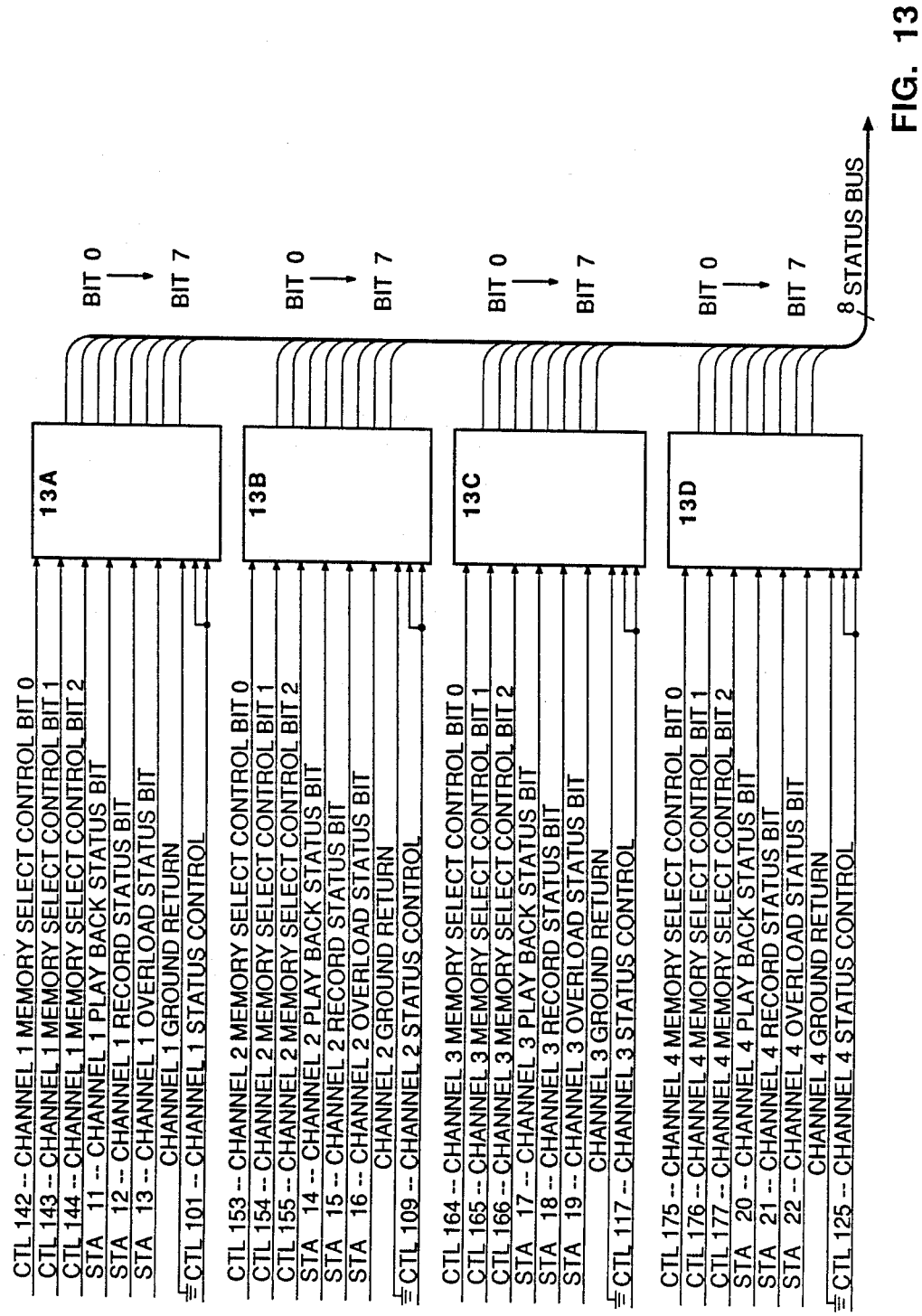
FIG. 13 is a block and schematic diagram of circuitry on the audio message card for providing status data.

With reference to FIGS. 10-13, there will now be described circuitry included on audio message card 3G which occupies the system slot within row 2 of line connection sub-system 1C. The functions audio message card 3G performs relate to generation of the four messages that system 1A automatically transmits at selected times. (Three of these messages apply equally to a supervisor or to any attendant; one of them applies specifically to an attendant at the end of a shift.) To perform these functions, audio message card 3G cooperates with controlling computer 3C via row bus (2), the system bus, and communications card 3B to receive digitally coded commands and to provide status data. The circuitry on audio message card 3G for decoding digitally coded commands is shown in FIG. 12. The circuitry on audio message card 3G for applying status data to the status bus is shown in FIG. 13.

Three of the messages that system 1A automatically generates and transmits are generated by three identical circuit arrangements. FIG. 10 shows such a circuit arrangement, and sets out references in general terms such as "Channel i." It should be understood that this circuit arrangement is replicated three times such that there are in the preferred embodiment a Channel 1, a Channel 2, and a Channel 3. Another message, viz, Message 4, is generated by a circuit arrangement, shown in FIG. 11, that, in most respects except those specifically described, is identical to the circuit arrangement of FIG. 10.

The circuitry shown in FIG. 10 includes an audio connect flip flop 10A, a switch 10B controlled by flip flop 10A, and a speech processor 10C. In the preferred embodiment, speech processor 10C is an OKI 6258 Solid State Recorder Speech Processor integrated circuit chip. It handles analog-to-digital and digital-to-analog conversion, and operates in cooperation with a crystal 10D, tuned to 4 MHz in this embodiment. It has numerous outputs, including a "DA OUT" output and a "V Clock" output which are connected to a low pass filter 10E. A buffer amplifier is connected between the output of low pass filter 10E and switch 10B.

Another output of speech processor 10C is "Play Mon"; the signal that it produces is a Play-Back Status Bit. This signal is buffered and applied to an LED 10F. This and two other LED's shown in FIG. 10 are mounted on the audio message card 3G so as to provide an indication to maintenance personnel for use in servicing the system. Another output of speech processor 10C is "Rec Mon"; the signal it produces is a Record Status Bit. Another output is "OVF(FST)"; the signal it produces is an Overload Status Bit.

Another set of outputs of speech processor 10C are connected to a 19-conductor address bus used to propagate addressing signals to a message memory array generally indicated at 10G. Eight ROM chips are arranged in parallel to define this message memory array. One at a time of these eight ROM chips is selected by a one-out-of-eight select signal produced by a decoder 10H. The selected ROM chip responds to the addressing signal provided by speech processor 10C to apply an eight bit byte to a data bus connecting the output to the ROM chips to a data input of speech processor 10C.

Decoder 10H decodes a three-bit wide signal produced by a latch 10I. The input signals applied to latch 10I are three parallel bits supplied as part of a command word issued by controlling computer 3C, and a control signal for latch control which is produced by command-decoding circuitry shown in FIG. 12.

Speech processor 10C receives three control signals directly from the command-decoding circuitry of FIG. 12; these are an All Clear Control signal, a Flag Reset Control signal, and a Pause Control signal. Speech processor 10C receives another control signal from the output of an OR gate 10J which responds to a Start/Stop Control signal and a Restart Strobe signal. The Start/Stop Control signal is produced by the command-decoding circuitry shown in FIG. 12. The Restart Strobe signal is produced by a one-shot 10K that is triggered by a signal produced by one-shot 10L.

As stated above, the circuitry shown in FIG. 10 represents one of three circuit arrangements having identical construction for handling a respective one of three messages the system automatically generates and transmits. The following cross-reference table provides information about how the command-decoding circuitry of FIG. 12 is interconnected to these three circuit arrangements, which are referred to in the table as Channel 1, Channel 2, and Channel 3.

Cross-Reference Table Regarding Channel 1, Channel 2, and Channel 3 Signals

| Signal | Channel | CTL or STB No. |
| --- | --- | --- |
| Audio Connect Control | 1 | CTL 98 |
| Audio Connect Control | 2 | CTL 106 |
| Audio Connect Control | 3 | CTL 114 |
| Audio Disconnect Control | 1 | CTL 99 |
| Audio Disconnect Control | 2 | CTL 107 |
| Audio Disconnect Control | 3 | CTL 115 |
| All Clear Control | 1 | CTL 94 |
| All Clear Control | 2 | CTL 102 |
| All Clear Control | 3 | CTL 110 |
| Flag Reset Control | 1 | CTL 95 |
| Flag Reset Control | 2 | CTL 103 |
| Flag Reset Control | 3 | CTL 111 |
| Pause Control | 1 | CTL 96 |
| Pause Control | 2 | CTL 104 |
| Pause Control | 3 | CTL 112 |
| Start/Stop Control | 1 | CTL 97 |
| Start/Stop Control | 2 | CTL 105 |
| Start/Stop Control | 3 | CTL 113 |
| Restart Strobe | 1 | STB 24 |
| Restart Strobe | 2 | STB 25 |
| Restart Strobe | 3 | STB 27 |
| Latch Control | 1 | CTL 130 |
| Latch Control | 2 | CTL 131 |
| Latch Control | 3 | CTL 132 |
| ROM 0 Select Control | 1 | CTL 134 |
| ROM 0 Select Control | 2 | CTL 145 |
| ROM 0 Select Control | 3 | CTL 156 |
| ROM 1 Select Control | 1 | CTL 135 |
| ROM 1 Select Control | 2 | CTL 146 |
| ROM 1 Select Control | 3 | CTL 157 |
| ROM 2 Select Control | 1 | CTL 136 |
| ROM 2 Select Control | 2 | CTL 147 |
| ROM 2 Select Control | 3 | CTL 158 |
| ROM 3 Select Control | 1 | CTL 137 |
| ROM 3 Select Control | 2 | CTL 148 |
| ROM 3 Select Control | 3 | CTL 159 |
| ROM 4 Select Control | 1 | CTL 138 |
| ROM 4 Select Control | 2 | CTL 149 |
| ROM 4 Select Control | 3 | CTL 160 |
| ROM 5 Select Control | 1 | CTL 139 |
| ROM 5 Select Control | 2 | CTL 150 |
| ROM 5 Select Control | 3 | CTL 161 |
| ROM 6 Select Control | 1 | CTL 140 |
| ROM 6 Select Control | 2 | CTL 151 |
| ROM 6 Select Control | 3 | CTL 162 |
| ROM 7 Select Control | 1 | CTL 141 |
| ROM 7 Select Control | 2 | CTL 152 |
| ROM 7 Select Control | 3 | CTL 163 |
| Message Audio | 1 | AUD 6 |
| Message Audio | 2 | AUD 7 |
| Message Audio | 3 | AUD 8 |
| Start/Stop Strobe | 1 | STB 23 |
| Start/Stop Strobe | 2 | STB 13 |
| Start/Stop Strobe | 3 | STB 26 |
| Restart Strobe | 1 | STB 24 |
| Restart Strobe | 2 | STB 25 |
| Restart Strobe | 3 | STB 27 |
| Play Back Status Bit | 1 | STA 11 |
| Play Back Status Bit | 2 | STA 14 |
| Play Back Status Bit | 3 | STA 17 |
| Record Status Bit | 1 | STA 12 |
| Record Status Bit | 2 | STA 15 |
| Record Status Bit | 3 | STA 18 |
| Overload Status Bit | 1 | STA 13 |
| Overload Status Bit | 2 | STA 16 |
| Overload Status Bit | 3 | STA 19 |
| Memory Select Control Bit 0 | 1 | CTL 142 |
| Memory Select Control Bit 0 | 2 | CTL 153 |
| Memory Select Control Bit 0 | 3 | CTL 164 |
| Memory Select Control Bit 1 | 1 | CTL 143 |
| Memory Select Control Bit 1 | 2 | CTL 154 |
| Memory Select Control Bit 1 | 3 | CTL 165 |
| Memory Select Control Bit 2 | 1 | CTL 144 |
| Memory Select Control Bit 2 | 2 | CTL 155 |
| Memory Select Control Bit 2 | 3 | CTL 166 |

As to the fourth kind of message that the system automatically generates and transmits, reference is made to FIG. 11. The reference numbers used in FIG. 11 are correlated with those used in FIG. 10 so as to indicate circuit elements that are identical. For example, audio connect flip flop 11A (FIG. 11) has the same construction and operation as audio connect flip flop 10A (FIG. 10).

The circuitry of FIG. 11 differs from that of FIG. 10 in the following respects. First, message memory array 11G includes a RAM; i.e., it is written into as well as read from during normal operation of the system in contrast to the all-ROM configuration of message memory array 10G (FIG. 10). Second, additional outputs of speech processor 11C are used in the circuit arrangement of FIG. 11; these are the CAS and $\overline{RAS}$ outputs that are connected to corresponding inputs of a four megabyte RAM chip 11M of message memory array 11G. Third, three of the inputs in speech processor 11C, viz, the CA1, CA2, and CA3 inputs, are connected differently. In particular, the CA1 input is connected to the $Q_2$ output of latch 11I (this being the most significant bit of the three bit positions of the latch); the CA2 input is connected to the output of an AND gate 11N, and the CA3 input is connected to the output of an AND gate 11O. AND gate 11N has two inputs, one connected to the most significant of these three bit positions ($Q_2$), and the other connected to the next most significant bit position ($Q_1$). AND gate 11O has two inputs, one connected to the most significant of these bit positions ($Q_2$), and the other connected to the least significant bit position ($Q_0$). The remaining differences involve additional circuits for switchably applying an audio signal to speech processor 11C so that such audio signal can be digitized and stored in the message memory array 11G. The additional circuits are an audio connect flip flop 11P, a switch 11Q controlled by flip flop 11P, a buffer amplifier 11R through which the audio signal propagates to switch 11Q and, while switch 11Q is closed, through a low pass filter 11S to an input of speech processor 11C.

With reference to FIG. 12, the command-decoding circuitry for audio monitor card includes four decoder circuits 12A, 12B, 12C, and 12D, each of which is enabled by a pair of enabling signals to decode Bits 0–3 of the command word received via the command word bus portion of the system bus. One of the enabling signals is produced by a Schmitt trigger driver circuit 12E that responds to the Card Select signal. Another decoding circuit 12F provides four enabling signals, one for each decoder 12A–12D. Decoder 12F, while enabled by the Card Select signal, decodes Bits 4–6 of the command word.

With reference to FIG. 13, the circuitry shown therein provides for communicating status data from audio message card 3G to the status bus so that the status data can propagate to controlling computer 3C. This circuitry includes four tri-state bus drivers 13A, 13B, 13C, and 13D.

Having completed the description of the construction of the various circuit arrangements of the three system cards, there will now be described, with reference to FIGS. 14–22, the construction of a line card. As stated above, this specific embodiment of the present invention has 105 line cards, every one of which has the same construction. This modular arrangement is advantageous in numerous respects, particularly for flexibility in configuring a system. Any one of the line cards can be removed from the rack that houses line connection sub-system 1C, for maintenance or the like without necessitating a system shut down. Further, the modular arrangement is advantageous with respect to system expansion; as indicated above, a variety of provisions have been made to facilitate any such system expansion. This modular architecture is further advantageous in that each line card defines a module having its own hardware sequencing circuitry such that a sufficient number of sequencing functions are controlled at the line card level to provide for autonomous operation of call extending operations. Thus, even if a power failure or other untoward event interrupts the operation of controlling computer 3C during a peak period of incoming traffic, each line card can continue to operate to extend a sequence of incoming calls.

To provide an introduction to the construction of a line card, there will now be described the functional block diagram of FIG. 14. The Tip andrrrr Ring lines of an incoming phone line are connected to an incoming line connection controller 14A. To ensure a sufficient power level for audio signals propagated by the phone lines, each such incoming phone line is suitably connected to the output of a conventional voice frequency repeater VFR (not shown).

Figure 14:
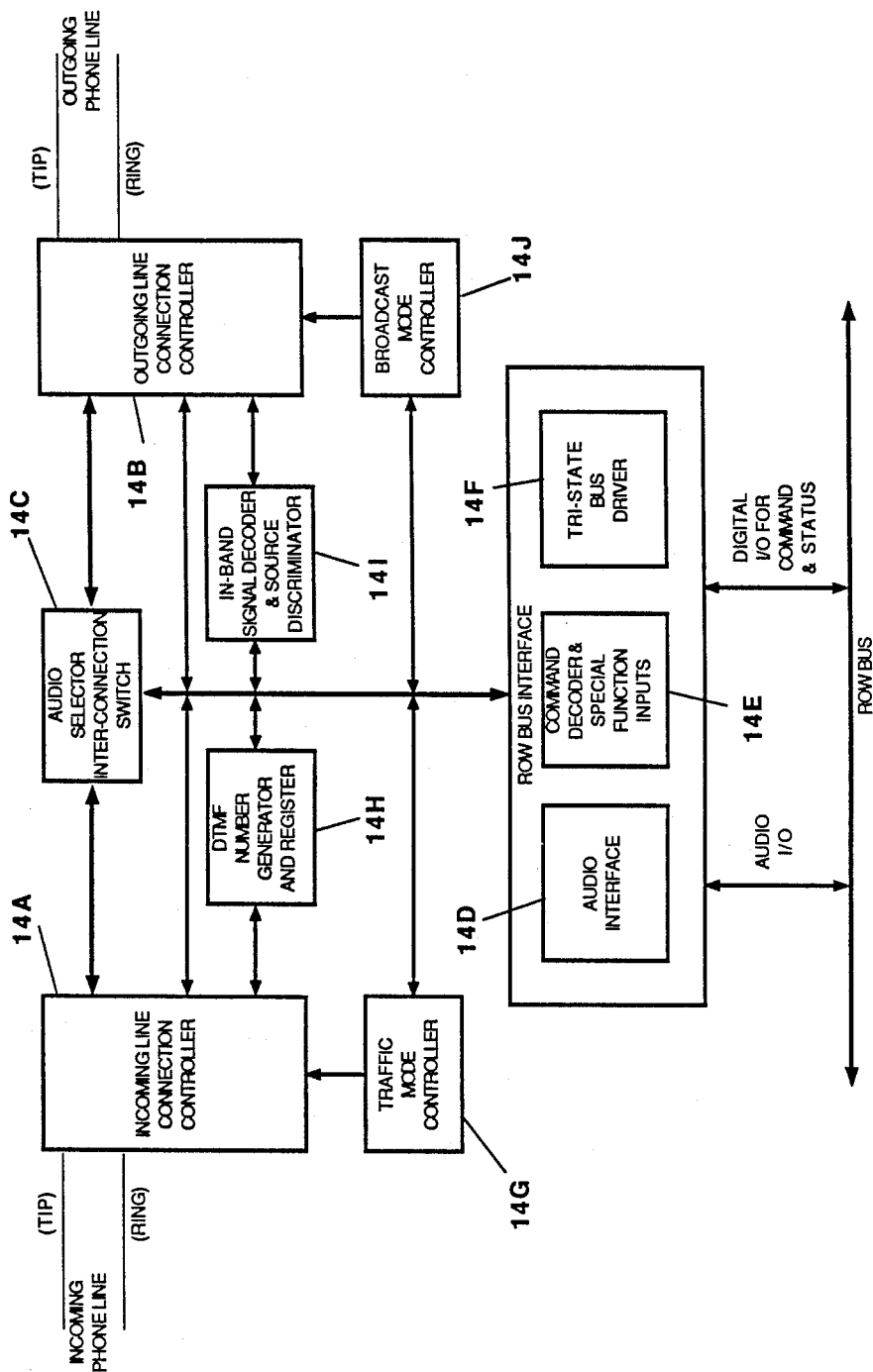
FIG. 14 is a general functional block diagram of a line card used in the present invention for each pair of incoming and outgoing telephone lines.

FIG. 14 also shows the Tip and Ring lines of an outgoing phone line and an outgoing line connection controller 14B that is connected to the outgoing phone line. An audio selector inter-connection switch 14C is arranged between controllers 14A and 14B. (Circuitry for line connection controllers 14A and 14B and circuitry for inter-connection switch 14C are shown in FIG. 15.)

Figure 16:
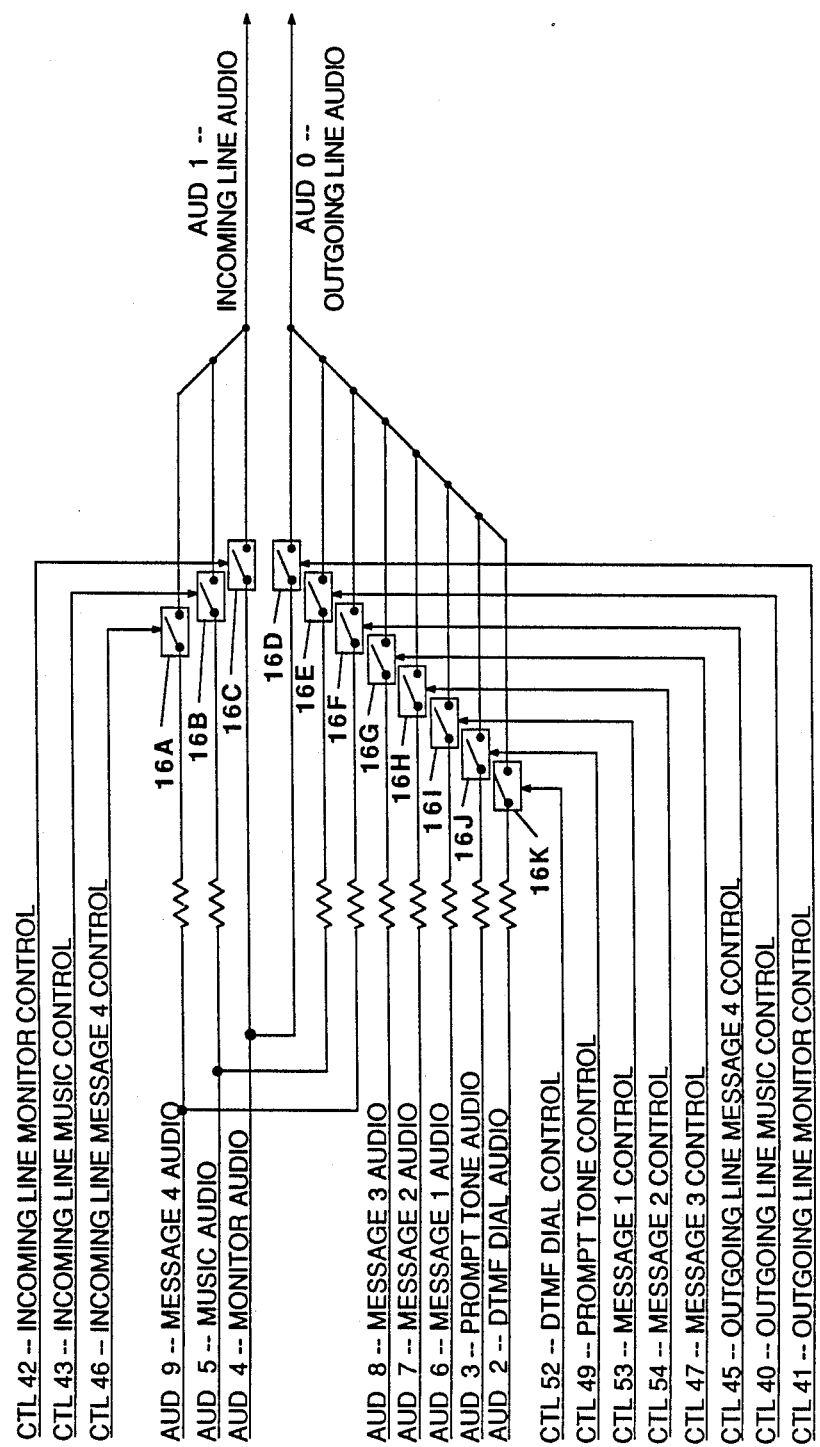
FIG. 16 is a block and schematic diagram of another portion of the line card, and shows circuitry for implementing an audio interface incorporating audio selection switches.
Figure 21:
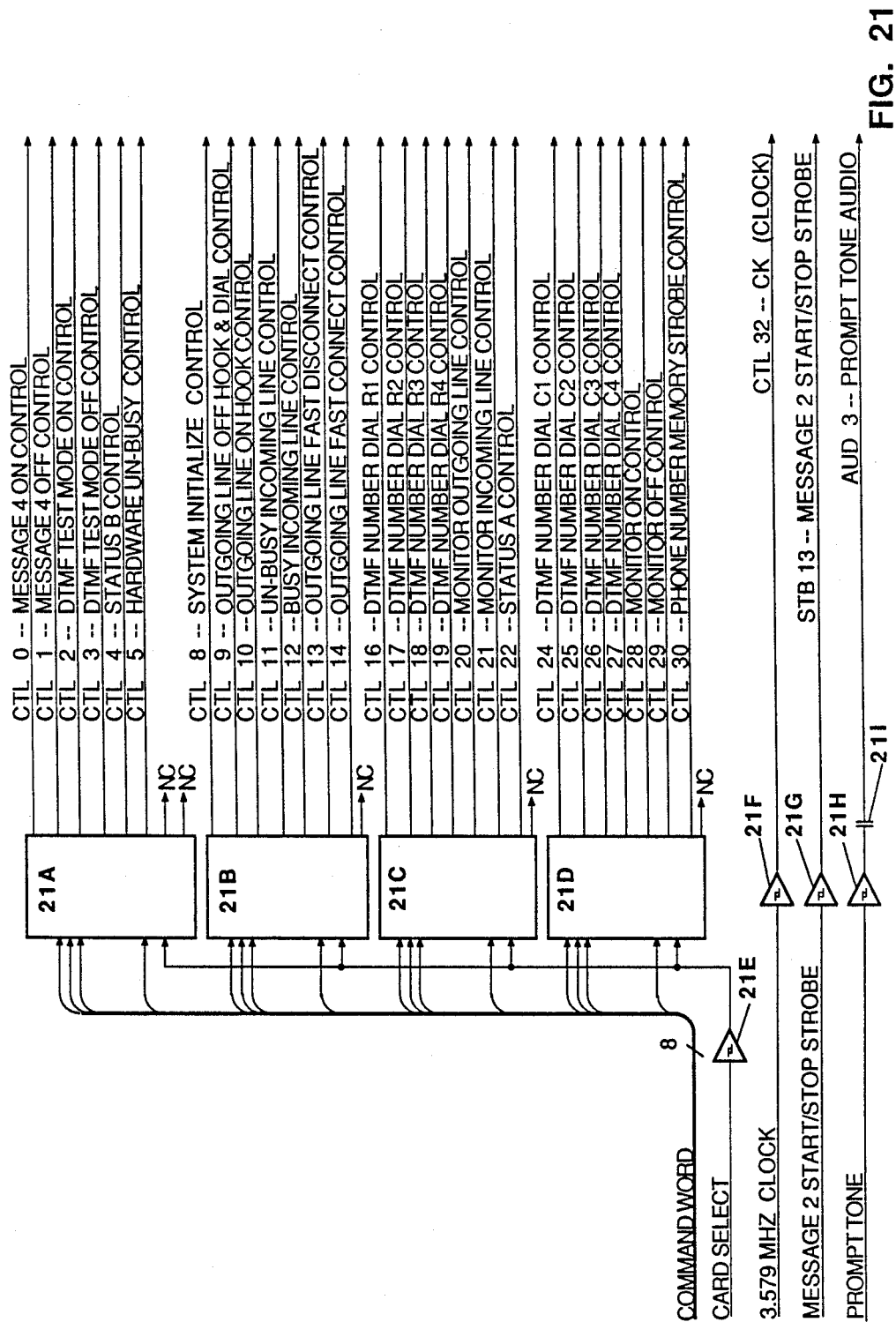
FIG. 21 is a block and schematic diagram of another portion of the line card, and shows command-decoding circuitry.
Figure 22:
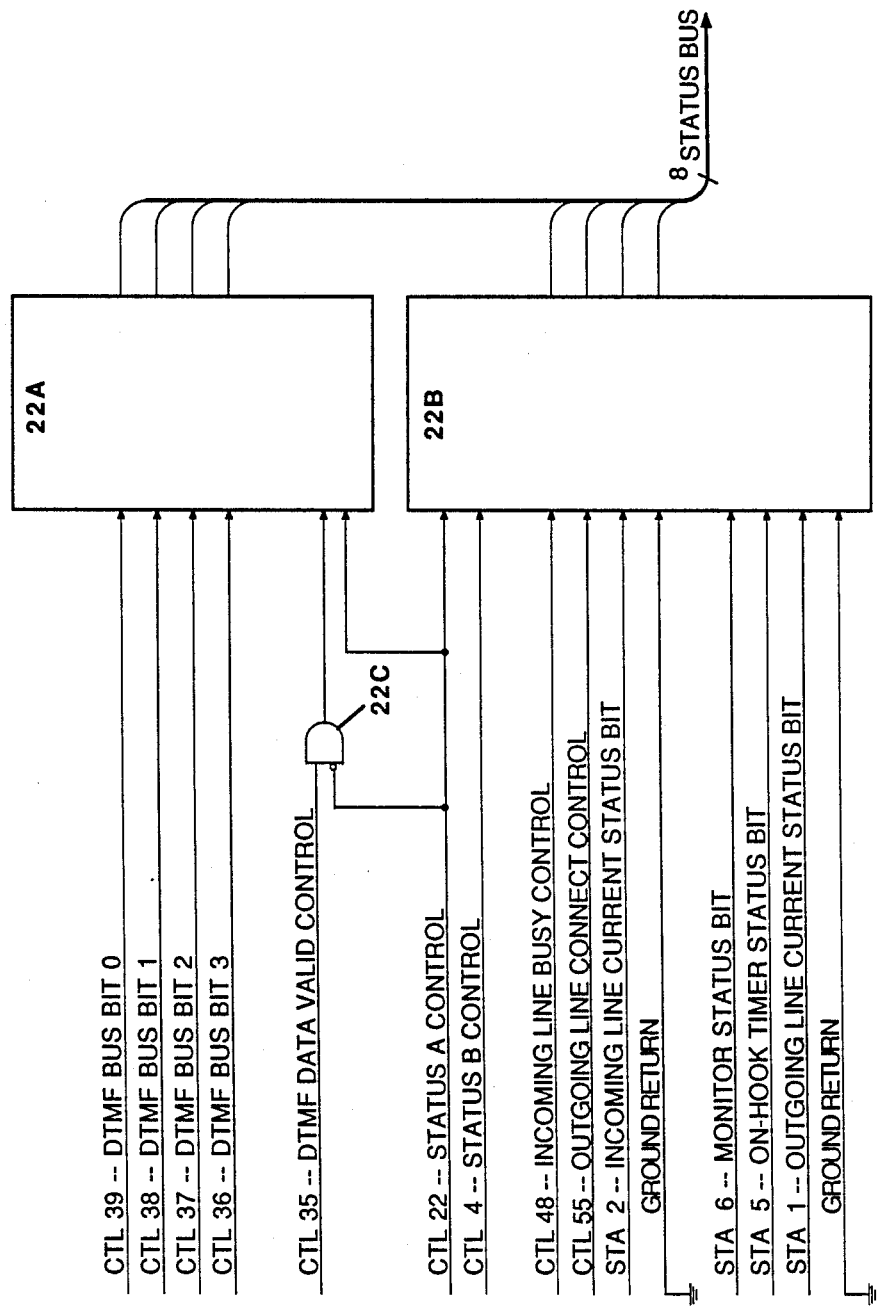
FIG. 22 is a block and schematic diagram of another portion of the line card, and shows circuitry for providing status data.

Switch 14C is connected to a row bus interface which includes an audio interface 14D, a decoder for commands and special function inputs 14E, and a tri-state bus driver 14F. (Circuitry for audio interface 14D is shown in FIG. 16. Command-decoding circuitry 14E is shown in FIG. 21. Tri-state bus driver circuitry 14F for providing status data is shown in FIG. 22.)

Figure 19:
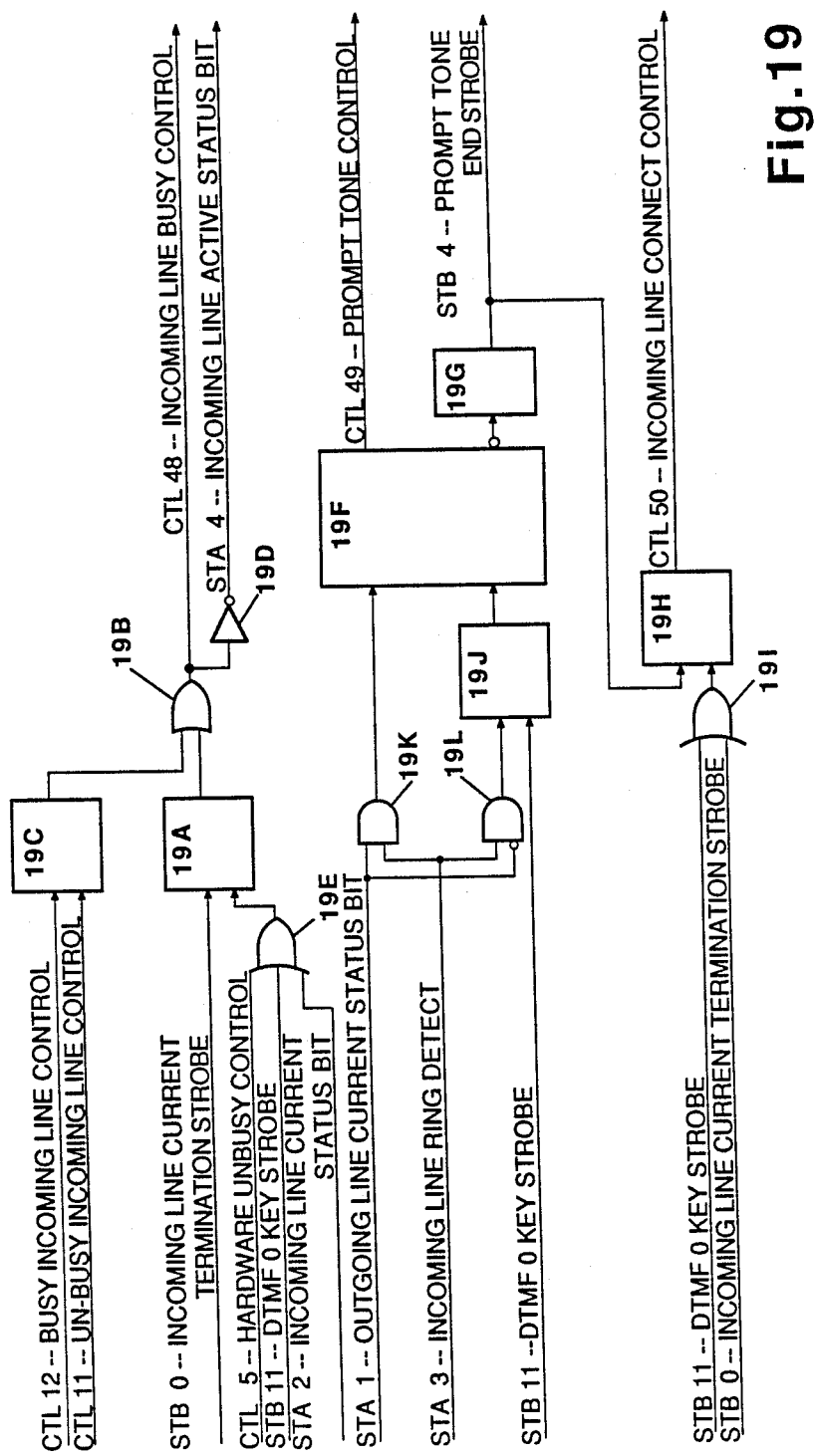
FIG. 19 is a block and schematic diagram of another portion of the line card, and shows sequencing circuitry for the connection controller for the incoming line.
Figure 20:
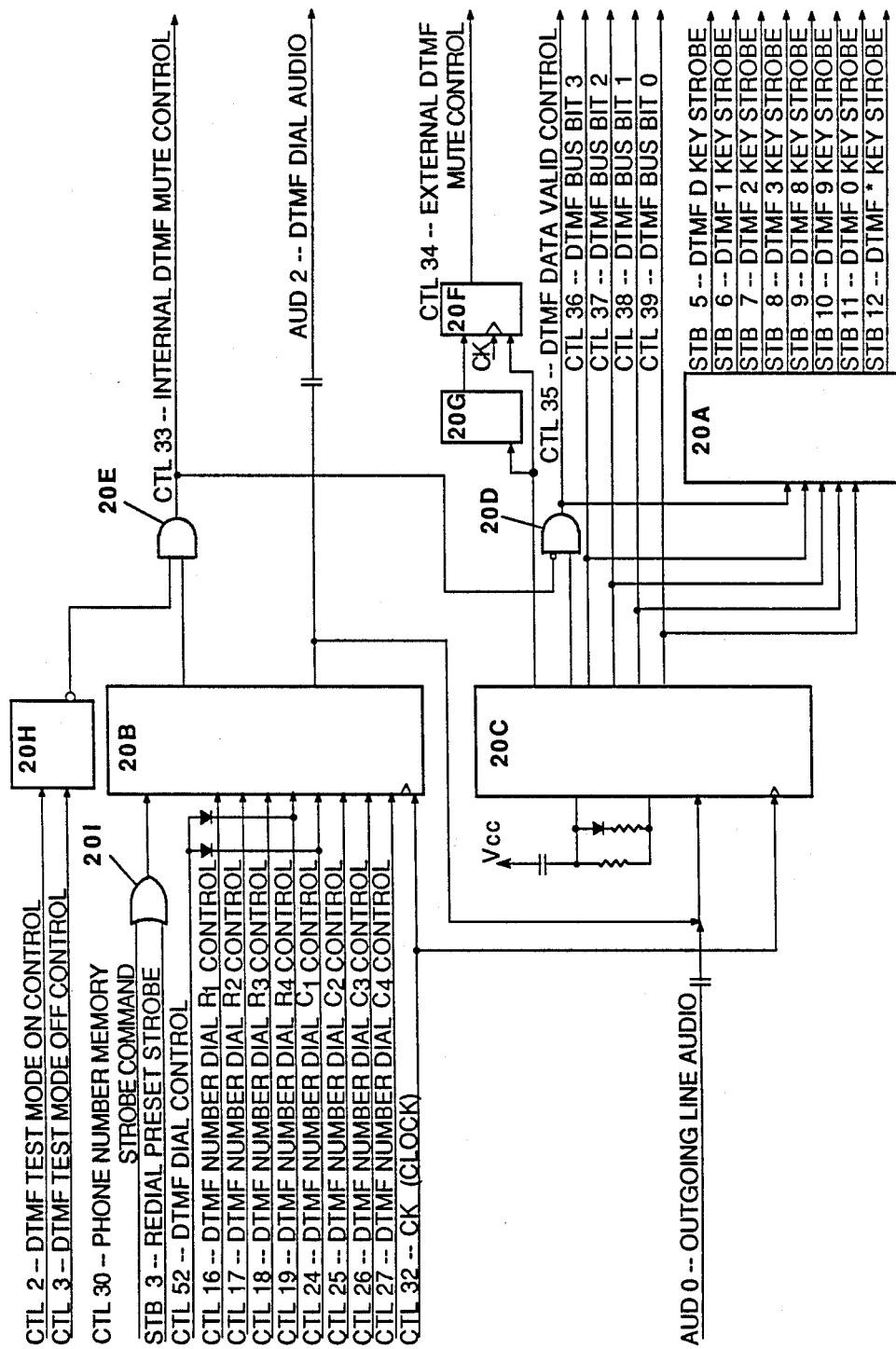
FIG. 20 is a block and schematic diagram of another portion of the line card, and shows circuitry for DTMF number generation and in-band signal decoding.

FIG. 14 indicates, beneath the row bus interface, lines labeled "Audio I/O" and "Digital I/O For Command And Status" which connect to the row bus. FIG. 14 shows, above the row bus interface, lines connecting the row bus interface to each of the remaining functional blocks of the line card. These include, in addition to blocks 14A–14C mentioned above, a traffic mode controller 14G, a DTMF number generator and register 14H, and in-band signal decoder and source discriminator 14I, and a broadcast mode controller 14J. (Circuitry that performs functions of traffic mode controller 14G is shown in FIG. 19. Circuitry for DTMF generation and decoding is shown in FIG. 20.)

Figure 15:
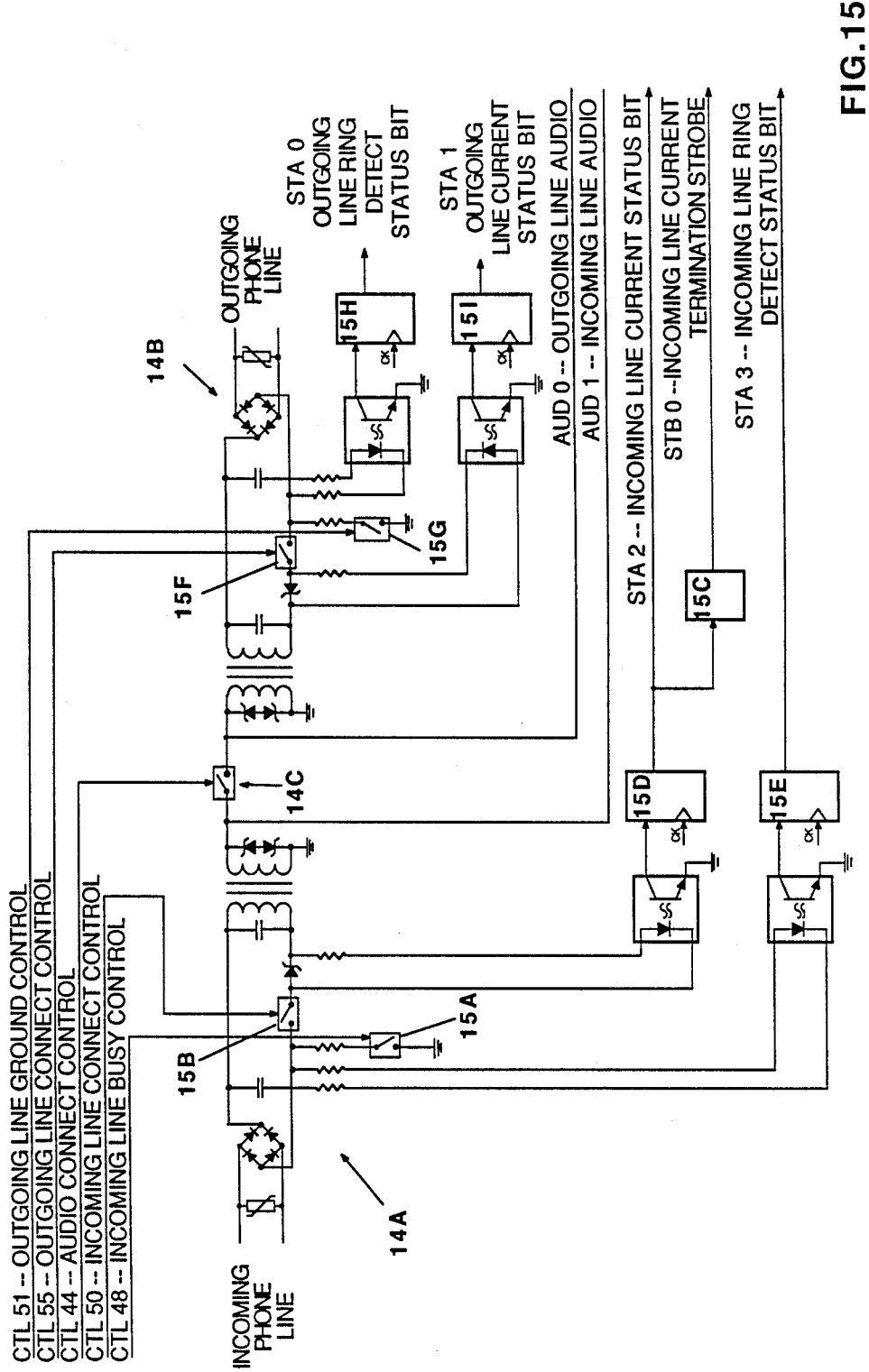
FIG. 15 is a block and schematic diagram of a portion of the line card, and shows circuitry for a pair of connection controllers and an inter-connection switch.

With reference to FIG. 15, there will now be described circuitry for implementing connection controllers 14A and 14B and inter-connection switch 14C.

Circuitry generally indicated at 14A in FIG. 15 performs functions for a station connection controller for cooperating with an originating station to form opposite ends of a call connection path. This circuitry is implemented by the same components arranged in the same way as the circuitry for supervisory station connection controller 7 (FIG. 7). Circuitry generally indicated at 14B in FIG. 15 performs functions for a station connection controller for cooperating with a multi-purpose station to form opposite ends of a call connection path. This circuitry is also implemented by the same components arranged in the same way as the circuitry for the above-mentioned station connection controllers. Inter-connection switch 14C is implemented by a FET switch just as switch 7L (FIG. 7) is, within monitor card 3F.

As to controller 14A, it includes controllable switches and circuitry for producing signals representing conditions of operation of controller 14A. The controllable switches are an incoming line ground-start simulating switch 15A, and an incoming line hook-switch simulating switch 15B. The circuitry of controller 14A for producing the condition-representing signals includes a one-shot 15C, and two retriggerable one-shots 15D and 15E. One-shot 15D produces an Incoming Line Current Status Bit signal (STA 2), and is responsive to a current detect circuit that is connected in the same way that circuit 7G (FIG. 7) is connected within the supervisory station connection controller 7. Thus, the STA 2 status bit signal it produces is true while opposite ends of a call connection path are completed; in other words, an originating party is off-hook and hook switch simulating switch 15B is simulating an off-hook condition. One-shot 15E produces an Incoming Line Ring Detect Status Bit signal (STA 3). One-shot 15E is responsive to a ring detect circuit that is connected in the same way that circuit 7I (FIG. 7) is connected within the supervisory station connection controller 7. Thus, the STA 3 status bit signal it produces is true while a ring signal is being detected. One-shot 15C produces an Incoming Line Current Termination Strobe signal (STB 0), and is triggered by the STA 2 status bit signal produced by one-shot 15D.

As to the controller 14B, it includes controllable switches and circuitry for producing signals representing conditions of operation of controller 14B. The controllable switches are an outgoing line hook-switch simulating switch 15F, and an outgoing line ground-start simulating switch 15G. The circuitry of controller 14B for producing the condition-representing signals includes two retriggerable one-shots 15H and 15I. One-shot 15H produces an Outgoing Line Ring Detect Status Bit signal (STA 0), and is responsive to a ring detect circuit that is connected in the same way that circuit 7I (FIG. 7) is connected within the supervisory station connection controller 7. Thus, the STA 0 status bit signal it produces is true while a ring signal is being detected. One-shot 15I produces an Outgoing Line Current Status Bit signal (STA 1), and is responsive to a current detect circuit that is connected in the same way that circuit 7G (FIG. 7) is connected within the supervisory station connection controller 7. Thus, the STA 1 status bit signal it produces is true while opposite ends of a call connection path are completed; in other words, a called party such as an attendant is off-hook and hook switch simulating switch 15B is simulating an off-hook condition.

As to inter-connection switch 14C, it is connected between controller 14A and 14B. One end of switch 14C is also connected to a conductor used to propagate an Incoming Line Audio signal (AUD 1). The opposite end of switch 14C is connected to a conductor used to propagate an Outgoing Line Audio signal (AUD 0).

With reference to FIG. 16, there will now be described circuitry for implementing an audio interface incorporating audio selection switches. This circuitry includes eleven controllable switches 16A–16K, each of which is preferably implemented by a FET. Each of switches 16A–16C has one end connected to the conductor used to propagate the Incoming Line Audio signal (AUD 1). As indicated by the arrangement of controllable switches 16A–16C, the Incoming Line Audio signal (AUD 1) can be any one of three signals depending upon which one, if any, of switches 16A–16C is closed. The Incoming Line Audio signal (AUD 1) will be the Message 4 Audio signal (AUD 9) if switch 16A is closed; the Music Audio signal (AUD 5) if switch 16B is closed; the Monitor Audio signal (AUD 4) if switch 16C is closed.

Each of switches 16D–16K has one end connected to the conductor used to propagate the Outgoing Line Audio signal (AUD 0). As indicated by the arrangement of controllable switches 16D–16K, the Outgoing Line Audio signal (AUD 0) can be any one of eight signals depending upon which one, if any, of switches 16D–16K is closed. The Outgoing Line Audio signal (AUD 0) will be the Monitor Audio signal (AUD 4) if switch 16D is closed; the Music Audio signal (AUD 5) if switch 16E is closed; the Message 4 Audio signal (AUD 9) if switch 16F is closed; the Message 3 Audio signal (AUD 8) if switch 16G is closed; the Message 2 Audio signal (AUD 7) if switch 16H is closed; the Message 1 Audio signal (AUD 6) if switch 16I is closed; the Prompt Tone Audio (AUD 3) if switch 16J is closed; the DTMF Dial Audio signal (AUD 2) if switch 16K is closed.

Resistors are indicated in FIG. 16 in series with individual controllable switches; these resistors provide for individually adjusting the sound level of each of the various audio signals and, therefore, implement the audio interface function indicated in block 14D (FIG. 14).

Figure 17:
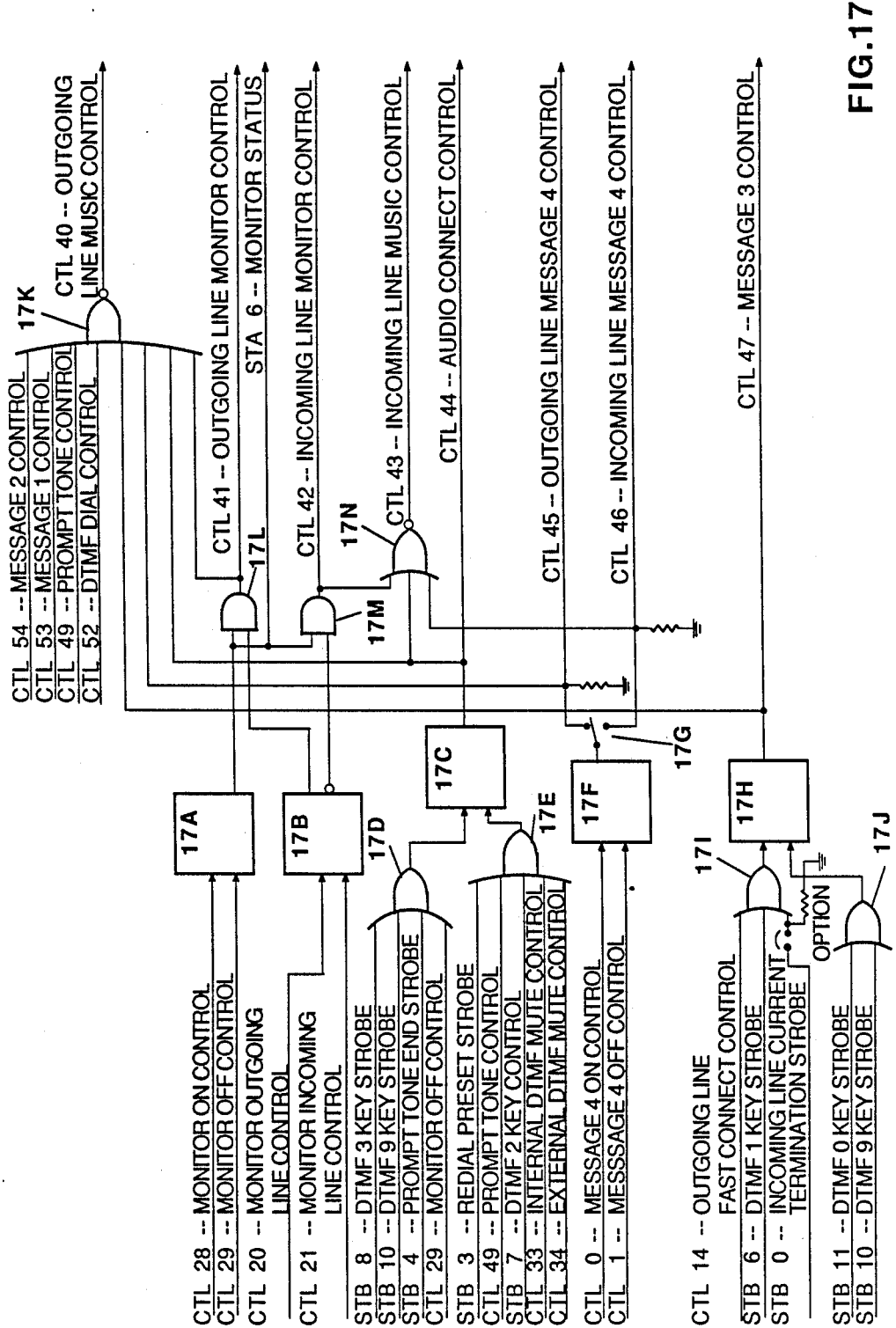
FIG. 17 is a block and schematic diagram of another portion of the line card, and shows circuitry for controlling audio selection switches.

With reference to FIG. 17, there will now be described circuitry for controlling the audio selection switches. This circuitry includes a monitor flip flop 17A and a monitor side flip flop 17B, which perform functions involved in selectively propagating audio signals between the particular line card and supervisory station 1I. Flip flop 17A produces the Monitor Status signal (STA 6). An audio connect flip flop 17C produces the Audio Connect Control signal (CTL 44) that controls inter-connection switch 14C. Audio connect flip flop 17C is set by a signal produced by an OR gate 17D and is reset by a signal produced by an OR gate 17E.

A message 4 flip flop 17F produces a signal that is switched through an option switch 17G. Depending upon the setting of 17G, one of two signals is maintained at the false logical level by virtue of a resistor and the other of the two signals is the same as the signal produced by Message 4 flip flop 17F. One of these two signals is an Outgoing Line Message 4 Control signal (CTL 45) that controls switch 16F (FIG. 16). The other of these two signals is an Incoming Line Message 4 Control signal (CTL 46) that controls switch 16A (FIG. 16).

A message 3 flip flop 17H is set by a signal produced by an OR gate 17I, and is reset by a signal produced by an OR gate 17J, and produces a Message 3 Control signal (CTL 47) which, when true, causes switch 16G (FIG. 16) to close to propagate the Message 3 Audio signal (AUD 8) as the Outgoing Line Audio signal (AUD 0). To provide an option whether, when a caller hangs up, to play message 3 audio to the attendant, an option jumper controls whether the STB 0 signal, which is produced by one-shot 15E (FIG. 15), is applied to OR gate 17I so as to set message 3 flip flop 17H when incoming line current has terminated. The CTL 47 signal is also applied to one of the inputs of a NOR gate 17K. The signal NOR gate 17K produces is an Outgoing Line Music Control signal (CTL 40). It is true if and only if every one of the signals applied to its inputs is false. Thus, while the CTL 47 signal is true, thereby causing the Message 3 audio signal to be propagated, the CTL 40 signal is false. While the CTL 40 signal is false, switch 16E (FIG. 16) is open, preventing music audio from being propagated as the Outgoing Line Audio signal. In effect, the Music Audio signal constitutes the default Outgoing Line Audio signal. This is so because if none of the other possible audio signals have been selected, whereby every input signal to NOR gate 17K is false, then the Music Audio signal propagates as the Outgoing Line Audio signal.

The control circuitry of FIG. 17 further includes AND gates 17L and 17M, and a NOR gate 17N. The input signals for AND gate 17L are supplied by the Q output of flip flop 17A and the Q output of flip flop 17B. The signal AND gate 17L produces is an Outgoing Line Monitor Control signal (CTL 41) which, while true, causes switch 16D (FIG. 16) to close to enable the supervisor to confer with a service attendant whose multi-purpose station is connected to the line card outgoing line.

The input signals for AND gate 17M are supplied by the Q output of flip flop 17A and the $\overline{Q}$ output of flip flop 17B. The signal AND gate 17M produces is an Incoming Line Monitor Control signal (CTL 42) which, while true, causes switch 16C (FIG. 16) to close to enable the supervisor to confer with a calling party whose originating station is connected to the line card incoming line. The CTL 42 signal is also applied as one of the input signals to NOR gate 17N. The signal NOR gate 17N produces is an Incoming Line Music Control signal (CTL 43). It is true if and only if every one of the signals applied to its inputs is false. Thus, while the CTL 42 signal is true, thereby causing an inter-connection whereby the supervisor can confer with a calling party, the CTL 43 signal is false. While the CTL 43 signal is false, switch 16B (FIG. 16) is open, thereby preventing music audio from being propagated as the incoming line audio signal. In effect, the music audio signal constitutes the default incoming line audio signal. This is so for the same reasons set forth above with respect to the outgoing line audio signal.

Figure 18:
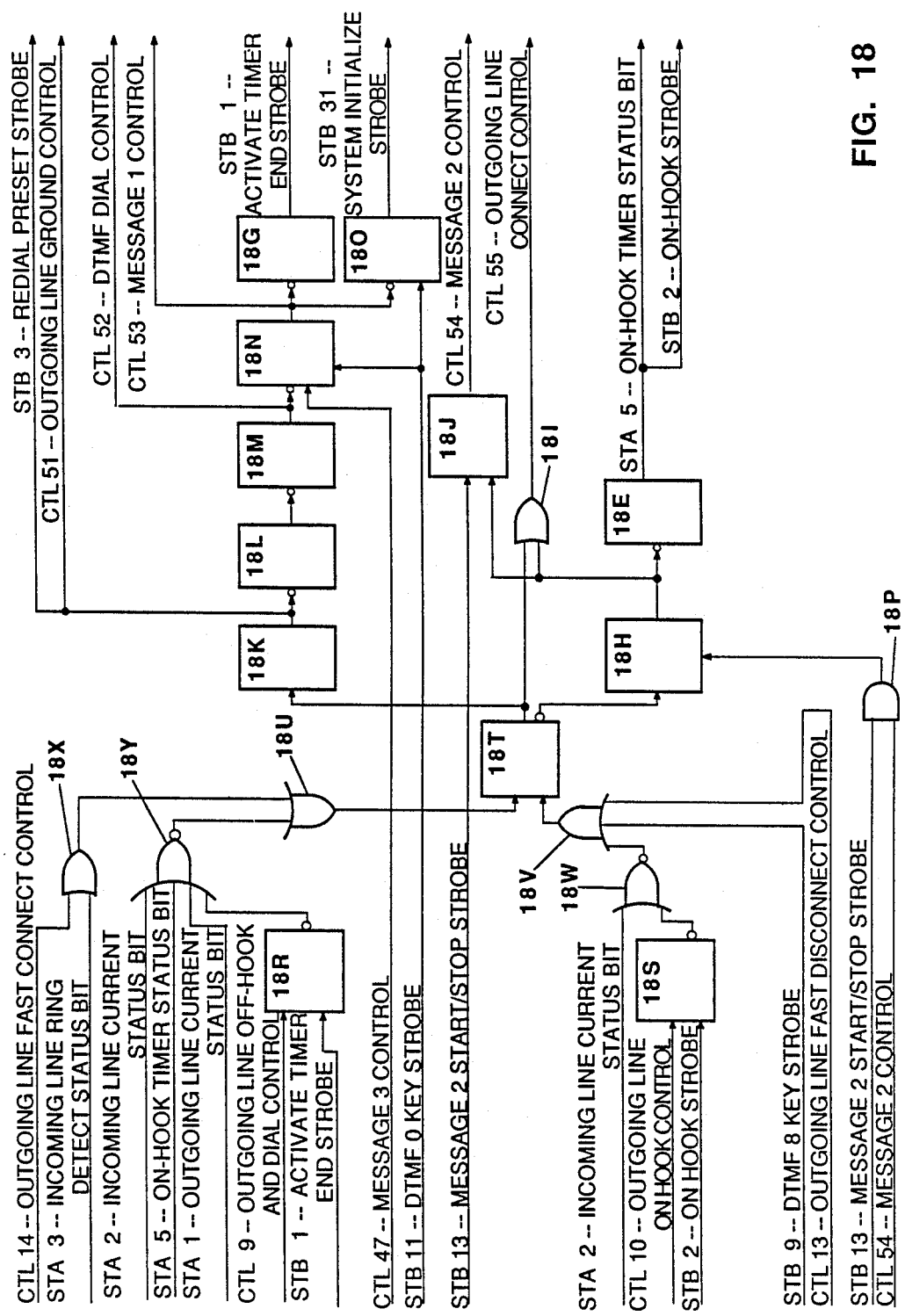
FIG. 18 is a block and schematic diagram of another portion of the line card, and shows sequencing circuitry for the connection controller for the outgoing line.

With reference to FIG. 18, there will now be described some of the sequencing circuitry provided on each line card. A number of the circuits shown in FIG. 18 have the same construction and operation as circuits described above with reference to FIG. 8 concerning sequencing circuitry for the monitor card 3F. For example, a dial tone one-shot 18K (FIG. 18) has the same construction and operation as one-shot 8K (FIG. 8). Similar reference numbers are used in FIG. 8 and FIG. 18 for other such similar circuits (18E, 18G, 18H, 18I, 18J, 18L, 18M, 18N, and 18O). As to on-hook timer 18E, like on-hook timer 8E, the signal it produces is an On-Hook Timer Status Bit (STA 5 in the case of on-hook timer 18E). In addition, this signal is also referred to as an On-Hook Strobe signal (STB 2).

The sequencing circuitry of FIG. 18 further includes an off-hook flip flop 18R and an on-hook flip flop 18S. Flip flops 18R and 18S provide for keeping track of the pendency of decoded commands, until sequences of operation for these commands have been executed. At the end of a sequence to disconnect an attendant, on-hook timer 18E forces the STB 2 signal true temporarily, and this resets on-hook flip flop 18S. When timer end one-shot 18G force the STB 1 signal true temporarily, this resets off-hook flip flop 18R. The sequencing circuitry of FIG. 18 further includes an outgoing line connect flip flop 18T. Flip flop 18T is set by a signal produced by an OR gate 18U, and is reset by a signal produced by an OR gate 18V. One of the signals supplied as an input to OR gate 18V is produced by a NOR gate 18W. The arrangement of flip flop 18S, NOR gate 18W, and OR gate 18V defines the conditions under which flip flop 18T will be reset. With respect to the setting of flip flop 18T, the circuitry which defines the conditions for setting it are OR gate 18U, an OR gate 18X, a NOR gate 18Y, and flip flop 18R.

When flip flop 18T changes state from its reset state to its set state, this initiates a sequence of timing operations in automatically placing an outgoing call to a multi-purpose station, and verifying that the person who answers the call at the multi-purpose station is authorized to be a service attendant. The details of this sequence are described below as part of a description of operation in response to a digitally coded command issued by controlling computer 3C. Briefly, during this sequence, an Outgoing Line Ground Control signal (CTL 51), produced by dial tone one-shot 18K, is temporarily forced true, and this causes ground start simulating switch 15G to close temporarily. Also during this sequence, an Outgoing Line Connect Control signal (CTL 55), produced by OR gate 18I, is forced true, and this causes hook switch simulating switch 15F (FIG. 15) to close. With switch 15F closed, and switch 15G temporarily closed, dial tone will appear on the outgoing line. Then, automatic dialing can proceed. Also during this sequence, dial one-shot 18M temporarily forces true the DTMF Dial Control signal (CTL 52). While the CTL 52 signal is true, switch 16K (FIG. 16) is closed and propagates the DTMF Dial Audio signal (AUD 2) as the Outgoing Line Audio signal (AUD 0).

With reference to FIG. 19, there will now be described circuitry that performs functions of traffic mode controller 14G. This circuitry includes an incoming line hardware busy flip flop 19A, the Q output of which is connected to an input of an OR gate 19B. An incoming line software busy flip flop 19C has its Q output connected to another input of OR gate 19B. If either hardware-busy flip flop 19A or software-busy flip flop 19C is in its set state, then OR gate 19B forces an Incoming Line Busy Control signal (CTL 48) true. The Incoming Line Busy Control signal (CTL 48) controls ground start simulating switch 15A (FIG. 15). An invertor 19D responds to the CTL 48 signal and produces an Incoming Line Active Status Bit signal (STA 4). As to the setting of hardware-busy flip flop 19A, this is controlled by the Incoming Line Current Termination Strobe signal (STB 0) that is produced by one-shot 15C (FIG. 15). As to the resetting of flip flop 19A, this is controlled by a signal produced by an OR gate 19E.

A prompt tone one-shot 19F produces a Prompt Tone Control signal (CTL 49) on its Q output. This CTL 49 signal controls switch 16J (FIG. 16), and is one of the signals that, as shown in FIG. 17, is applied to OR gate 17E to reset audio connect flip flop 17C. The $\overline{Q}$ output of one-shot 19F produces a signal that triggers an end tone one-shot 19G. A Prompt Tone End Strobe signal (STB 4) is produced by one-shot 19G; it is one of the signals that is applied to OR gate 17D (FIG. 17) to provide for setting audio connect flip flop 17C. The STB 4 signal is also applied to a set input of an incoming line connect flip flop 19H that produces an Incoming Line Connect Control signal (CTL 50). The CTL 50 signal controls hook-switch simulating switch 15B (FIG. 15). The reset input of flip flop 19H receives a signal produced by an OR gate 19I. One of the signals applied to OR gate 19I is the Incoming Line Current Termination Strobe signal (STB 0), which is produced by one-shot 15C (FIG. 15). Thus, when a caller hangs up, flip flop 19H is reset.

In accord with a particularly preferred feature, each line card is controlled to operate in traffic dependent modes, one of which is referred to as a multi-mode and the other as a forward mode. While a line card operates in the multi-mode, the attendant remains on line by keeping the multi-purpose station off-hook between incoming calls. To alert the attendant who is staying on line between calls that another call is ready to be extended to the attendant's multi-purpose station, the prompt tone is propagated out via the outgoing line before inter-connection switch 14C is closed. While a line card is operated in the forward mode, the line card is controlled so as to disconnect the multi-purpose station between incoming calls and to re-establish the multi-purpose station as a network station as part of the sequence of operations for responding to an incoming call.

A forward mode flip flop 19J produces a signal that is applied to a disable input of prompt tone one-shot 19F. An AND gate 19K produces a signal that is applied to a trigger input of prompt tone one-shot 19F. The signals applied to AND gate 19K are the Outgoing Line Current Status Bit (STA 1) and the Incoming Line Ring Detect signal (STA 3) is true. The STA 1 signal is produced by one shot 15I (FIG. 15), and is true while a call connection path is completed at both ends between the system and the multi-purpose station (i.e., the attendant is on line). The STA 3 signal is produced by one-shot 15E (FIG. 15), and becomes true when a ring signal is detected, thereby indicating an incoming call needs service.

While forward mode flip flop 19J is in its set state, prompt tone flip flop 19F is disabled from responding to the signal applied to its trigger input. The set input of forward mode flip flop 19J is connected to the output of a gate 19L. The signal that gate 19L produces is true while the STA 1 signal is false and the STA 3 signal is true. In addition to the role the STA 3 signal plays in disabling prompt tone one-shot 19J, the STA 3 signal is, as shown in FIG. 18, one of the signals applied to OR gate 18X. When the STA 3 signal is forced true by detection of the ringing signal, this sets outgoing line connect flip flop 18T, and thereby initiates a timing sequence to call the attendant.

While forward mode flip flop 19J is in its reset state, one-shot 19F is not disabled, and it responds to the trigger signal produced by an AND gate 19K. When one-shot 19F responds to the trigger signal, it produces a pulse in the Prompt Tone Control signal (CTL 49). This causes switch 16J (FIG. 16) to close temporarily so that the Prompt Tone Audio signal (AUD 3) propagates as the Outgoing Line Audio signal (AUD 0). This also temporarily forces NOR gate 17K (FIG. 17) to produce a false logic level in the Outgoing Line Music Control signal to prevent music from being propagated out over the outgoing line.

With reference to FIG. 20, there will now be described line card circuitry for DTMF number generation and for in-band signal decoding. This circuitry forms part of the circuitry of functional block 14I (FIG. 14), and includes a decoder 20A, a DTMF generator 20B, and a DTMF receiver 20C. DTMF generator 20B stores a selected telephone number used in placing a call to a multi-purpose station. DTMF receiver 20C provides for receiving and decoding in-band signals for security and other purposes. DTMF receiver 20C receives the Outgoing Line Audio signal (AUD 0), and produces a signal on a data valid output when it detects the presence of a touch tone pair constituting an in-band signal. This output signal is applied to a gate 20D that produces a DTMF Data Valid Control signal (CTL 35) to control an enable input of decoder 20A. Gate 20D also responds to an Internal DTMF Mute Control signal (CTL 33) that is produced by an AND gate 20E. The CTL 33 signal is one of the signals provided to OR gate 17E (FIG. 17) to cause audio connect flip flop 17C to reset. While the CTL 33 signal is false, and valid data is being produced by receiver 20C, gate 20D enables decoder 20A to decode a four-bit parallel coded signal produced by receiver 20C. The individual signals forming this coded signal are a DTMF Bus Bit 3 signal (CTL 36); a DTMF Bus Bit 2 signal (CTL 37); a DTMF Bus Bit 1 signal (CTL 38); and a DTMF Bus Bit 0 signal (CTL 39). Decoder 20A produces the following signals: a DTMF D Key Strobe (STB 5); a DTMF 1 Key Strobe (STB 6); a DTMF 2 Key Strobe (STB 7); a DTMF 3 Key Strobe (STB 8); a DTMF 8 Key Strobe (STB 9); a DTMF 9 Key Strobe (STB 10); a DTMF 0 Key Strobe (STB 11); AND a DTMF * Key Strobe (STB 12). The "D" key is provided on some special 4-column touch tone keypads. The STB 5 signal relates to this key; it is provided for future expansion and is not used in system IA.

The STB 6 strobe signal is one of the signals provided to OR gate 17I (FIG. 17) to cause message 3 flip flop 17H to set. The STB 7 strobe signal is one of the signals provided to OR gate 17E (FIG. 16) to cause audio connect flip flop 17F to reset. The STB 8 strobe signal and the STB 10 signal are among the signals provided to OR gate 17D (FIG. 17) to cause audio connect flip flop 17F to set. The STB 9 strobe signal is one of the signals provided to OR gate 18V (FIG. 18) to cause outgoing line connect flip flop 18T to reset. The STB 11 strobe signal is provided to numerous circuits. As to circuitry shown in FIG. 19, the STB 11 strobe signal is one of the signals provided to OR gate 19I (FIG. 19) to reset incoming line flip flop 19H; it is provided to the reset input of forward mode flip flop 19J; and it is one of the signals provided to OR gate 19E to reset hardware-busy flip flop 19A. As to circuitry shown in FIG. 18, the STB 11 strobe signal is applied to the clear input of activate timer 18N and to the disable input of activate abort one-shot 18O. As to circuitry shown in FIG. 17, the STB 11 strobe signal is one of the signals provided to OR gate 17J to cause message 3 flip flop to reset.

The circuitry shown in FIG. 20 further includes a retriggerable one-shot 20F that produces an External DTMF Mute Control signal (CTL 34). One-shot 20F is clock triggered under control of signals provided by the ESt output of receiver 20C and by a delay one-shot 20G. One-shot 20F is disabled from responding to clock triggering while the signal produced by one-shot 20G is true. If, after the signal produced by one-shot 20G returns false, the signal produced by the ESt output of receiver 20C remains true, then one-shot 20F responds to the clock trigger to force the CTL 34 signal true. The CTL 34 signal is one of the signals provided to OR gate 17E to cause audio connect flip flop 17C to reset. Such resetting of flip flop 17C is part of an operation to provide source discrimination. More particularly, when a false-to-true transition occurs in a signal produced by DTMF receiver 20C, thereby indicating that an in-band signal is present in the AUD 0 signal, it is initially ambiguous whether the source of this in-band signal is a multi-purpose station or an originating station. However, because of the operation of one-shots 20G and 20F in response to receiver 20C, and because of the resulting operation of resetting of audio connect flip flop 17C, inter-connection switch 14C opens. Continued detection of the in-band signal after switch 14C opens cannot be attributed to an originating station.

The circuitry shown in FIG. 20 further includes a DTMF Test Mode flip flop 20H, and an OR gate 20I. The $\overline{Q}$ output of flip flop 20H produces a signal that is provided to AND gate 20E. AND gate 20E produces the Internal Mute Control signal (CTL 33), and causes it to be true if both the signal it receives from flip flop 20H and a signal it receives from a Mute output of generator 20B are true. The dialing tone-pair signals produced by DTMF generator 20B for the purpose of placing a call to a multi-purpose station via an outgoing line cannot inadvertently be propagated out via an incoming line. This is so because the CTL 33 signal, when true, causes audio connect flip flop 17C to reset, thereby opening inter-connection switch 14C.

One of the advantageous features resulting from the in-band signal decoding is that an attendant can cause an incoming call to be disconnected while the attendant remains on line to the system. When the attendant taps the "0" key on the touch tone pad, the resulting in-band signal is decoded by DTMF receiver 20C and decoder 20A to force the STB 11 signal true. This causes flip flop 19H (FIG. 19) to reset, which in turn causes incoming line hook switch 15B to open so as to disconnect the incoming call.

With reference to FIG. 21, there will now be described command-decoding circuitry of a line card. This command decoding circuitry includes four decoder circuits 21A, 21B, 21C, and 21D, each of which is enabled by a pair of enabling signals to decode Bits 0–3 of the command word received via the command word bus portion of the row bus for the row in which the line card is used. One of the enabling signals is produced by a Schmitt trigger driver circuit 21E that responds to the Card Select signal.

The circuitry shown in FIG. 21 further includes three Schmitt trigger driver circuits 21F, 21G, and 21H, and a capacitor 21I. Circuit 21F provides buffering of the clock signal for the line card; its output signal is the CK signal (CTL 32). Circuit 21G provides buffering of the Message 2 Start/Stop Strobe signal for the line card; its output signal is the Message 2 Start/Stop Strobe signal (STB 13). Circuit 21H provides buffering of the Prompt Tone signal for the line card, and capacitor 21I provides DC isolation for the Prompt Tone signal (AUD 3).

With reference to FIG. 22, there will now be described circuitry for providing status data from the line card to the row bus. This circuitry includes a four-bit latch and tri-state bus driver 22A, a tri-state bus driver and multiplexer 22B, and a gate 22C. Driver 22A and multiplexer 22B are arranged and operate in almost the same way as latch 7U and multiplexer 7T (FIG. 7) are arranged and operate to provide status data from monitor card 3F. Multiplexer 22B has an "A Enable" control input and a "B Enable" control input that receive, respectively, a Status A Control signal (CTL 22) and a Status B Control signal (CTL 4). These control signals are produced by decoders 21C and 21A (FIG. 21) in response to digitally coded commands issued by controlling computer 3C, as explained more fully below.

There will now be described the manner in which the above-described circuitry of a line card responds to various digitally coded commands issued by controlling computer 3C. As stated above, each such digitally coded command has a two byte format, one byte for addressing a card, and another byte defining a Command Word. Controlling computer 3C sends digitally coded commands in serial form to UART 6A in communications card 3B. The Command Word is latched into latch 6E, applied to the system bus, and applied to every row bus by its corresponding bus controller. The addressing byte is latched into latch 6D, then decoded to select a row and a line card within a row, with the result that a Card Select signal (FIGS. 5 and 21) for the addressed line card will be forced true. Driver 21E (FIG. 21) of the addressed line card enables decoders 21A-21D to decode the Command Word received from the row bus.

Each of decoders 21A-21D has eight outputs, some of which provide spares for system expansion.

As to the outputs of decoder 21A that are used in system 1A, one of these produces a Message 4 On Control signal (CTL 0). When controlling computer 3C issues a digital command to force the CTL 0 signal true, this results in setting message 4 flip flop 17F. Depending upon the position of option switch 17G, this results in either the Outgoing Line Message 4 Control signal (CTL 45) or the Incoming Line Message 4 Control signal (CTL 46) being forced true. If the CTL 45 signal is true, then switch 16F closes, so that the Message 4 Audio signal is gated through to the outgoing line. If the CTL 46 signal is true, then switch 16A closes, so that the Message 4 Audio signal is gated through to the incoming line.

On another one of its outputs, decoder 21A produces a Message 4 Off Control signal (CTL 1). When controlling computer 3C issues a digital command to force the CTL 1 signal true, this results in resetting message 4 flip flop 17F. Depending upon the position of option switch 17G, this results in either the Outgoing Line Message 4 Control signal (CTL 45) or the Incoming Line Message 4 Control signal (CTL 46) being forced false. Whenever the CTL 45 signal is false, switch 16F is open, so that the Message 4 Audio will not propagate to the outgoing line. Whenever the CTL 46 signal is false, switch 16A is open, so that the Message 4 Audio signal will not propagate to the incoming line.

On another one of its outputs, decoder 21A produces a DTMF Test Mode On Control signal (CTL 2). When controlling computer 3C issues a digitally coded command to force the CTL 2 signal true, this results in setting the DTMF Test Mode flip flop 20H. On another one of its outputs, decoder 21A produces a DTMF Test Mode Off Control signal (CTL 3). When controlling computer 3C issues a digitally coded command to force the CTL 3 signal true, this results in resetting DTMF Test Mode flip flop 20H.

On another one of its outputs, decoder 21A produces a Status B Control signal (CTL 4). The circuitry that responds to this control signal also responds to a Status A Control signal (CTL 22) produced by decoder 21C. When controlling computer 3C issues a digitally coded command to obtain Status A data from an addressed line card, decoder 21C forces the Status A Control signal (CTL 22) true. In response, multiplexer 22B propagates signals from its "A" data inputs to Bits 4–7 of the Status Bus. Its "A" inputs include Ground Return, i.e., a false logic value; the Incoming Line Current Status Bit signal (STA 2); the Outgoing Line Connect Control signal (CTL 55); and the Incoming Line Busy Control signal (CTL 48). When controlling computer 3C issues a digitally coded command to obtain Status B data from an addressed line card, decoder 21A forces the Status B Control signal (CTL 4) true. In response, multiplexer 22B propagates signals from its "B" data inputs to Bits 4–7 of the Status Bus. Its "B" inputs include Ground Return; the Outgoing Line Current Status Bit signal (STA 1); the On-Hook Timer Status Bit signal (STA 5); and the Monitor Status Bit signal (STA 6).

As for Bits 0-3 of a status word provided by an addressed line card, latch 22A has an enable input that responds to the Status A Control signal (CTL 22). When controlling computer 3C issues a digitally coded command to obtain Status A data from monitor card 3F, decoder 21C forces the Status A Control signal (CTL 22) true. In response, latch 22A propagates signals from its data inputs to Bits 0–3 of the Status Bus. Its data inputs are the four parallel output signals of receiver 20A, i.e., the CTL 36, CTL 37, CTL 38, and CTL 39 signals. Latch 22A copies these signals whenever the output signal of gate 22C is forced true by the DTMF Data Valid Control signal (CTL 35) being true while the Status A Control signal (CTL 22) is false.

On another one of its outputs, decoder 21A produces a Hardware Un-Busy Control signal (CTL 5). Some of the line card circuitry that is controlled by this control signal is also controlled by an Un-Busy Incoming Line Control signal (CTL 11) produced by decoder 21B. In fact, one command of the command repertory forces each of the CTL 5 and CTL 11 signals true. This command is issued to change the mode of the line card to the call forward mode when the line card is in an idle condition. When the CTL 5 signal is forced true, this ensures that incoming line hardware busy flip flop 19A is in its reset state. This is a necessary but not a sufficient condition to cause ground start simulating switch 15A to be open. With the CTL 11 signal forced true, this ensures that incoming line software busy flip flop 19C is in its reset state. With each of flip flops 19A and 19C in their reset state, the CTL 48 signal must be false, thereby ensuring that ground start simulating switch 15A is open.

As to other outputs of decoder 21B that are used in system 1A, one of these produces a System Initialize Control signal (CTL 8) that performs the same resetting function for a line card that the CTL 56 signal performs for monitor card 3F. Another one of the outputs of decoder 21B is an Outgoing Line Off Hook & Dial Control signal (CTL 9). When controlling computer 3C issues a digitally coded command to force the CTL 9 signal true, this results in setting off-hook flip flop 18R, which remains in its set state until completion of execution of operations required by this command. While flip flop 18R is set, the signal its $\overline{Q}$ output produces is false. This is a necessary condition for the signal produced by NOR gate 18Y to be true. The other necessary conditions are that three other signals must also be false. These three signals are the Incoming Line Current Status Bit signal (STA 2), the Outgoing Line Current Status Bit signal (STA 1), and the On-Hook Timer Status Bit signal (STA 5).

The STA 2 signal being false indicates that no call is in progress on the incoming line. The STA 1 signal being false indicates that no call is in progress on the outgoing line. The STA 5 signal being false indicates that a minimum threshold time period has passed since outgoing hook-switch 15F opened, thereby providing a basis for distinguishing a hook-switch flash within a single call from the termination of one call and the start of another.

When all these necessary conditions prevail, the signal produced by NOR gate 18Y forces OR gate 18U to set Outgoing Line Connect flip flop 18T. In response, OR gate 18I forces the CTL 55 signal to be true, and this signal causes outgoing line hook-switch 15F to close, thereby simulating an off-hook telephone. Also, the false-to-true transition in the signal produced by the Q output of flip flop 18T triggers dial tone one-shot 18K. As a result, a pulse is defined in the signal produced by one-shot 18K. This signal has multiple functions, and is referred to as the Outgoing Line Ground Control (CTL 51) signal because it controls outgoing line ground-start switch 15G, and is also referred to as the Redial Preset Strobe signal (STB 3) because it controls the memory strobe input of DTMF generator 20B. In particular, it prepares generator 20B to initiate dialing upon receipt of an ensuing input of parallel signals representing the "#" symbol.

The pulse in the CTL 51 signal temporarily closes outgoing line ground-start switch 5G for approximately one-half second to stimulate generation of dial tone. The pulse in the STB 3 signal forces OR gate 17E to reset audio connect flip flop 17C. This ensures that the Audio Connect Control signal (CTL 44) is false, and thereby ensures that inter-connection switch 14C is open while a call is being placed via the outgoing line.

At the end of this pulse, its true-to-false transition triggers delay one-shot 18L to allow sufficient time to ensure that dial tone is provided. At the end of the approximately one-second long delay defined by one-shot 18L, a true-to-false transition in the signal it produces triggers dial one-shot 18M. The signal one-shot 18M produces is a DTMF Dial Control signal (CTL 52). It is coupled through diodes to the $R_4$ and $C_1$ inputs of generator 20B. These inputs in combination correspond to the "#" symbol; the parallel signals coupled through the diodes initiate the dialing, which is completed before the end of the approximately two-second long delay provided by one-shot 18M. The true-to-false transition in the CTL 52 signal also triggers activate timer 18N to initiate its timing interval of up to a maximum of 30 seconds.

The signal produced by the Q output of activate timer 18N is the Message 1 Control signal (CTL 53) that controls switch 16I. While the CTL 53 signal is true, switch 16I is closed, and the Message 1 Audio signal (AUD 6) is applied to the outgoing line. The CTL 53 signal is also applied to the trigger inputs of timer end one-shot 18G and activate abort one-shot 18O. The true-to-false transition in the CTL 53 signal always triggers (regardless of whether it occurs at the end of the maximum time-out period of 30 seconds or before) timer end one-shot 18G. Thus, a true pulse is defined in the Activate Timer End Strobe signal (STB 1) in either case. On the other hand, the true-to-false transition in the CTL 53 signal triggers activate abort one-shot 18O only if the STB 11 signal has remained false throughout the full 30 seconds, and accordingly has not disabled activate abort one-shot 18O.

On another one of its outputs, decoder 21B produces an Outgoing Line On Hook Control signal (CTL 10). This signal sets flip flop 18S, which remains in its set state until completion of execution of operations required by this command. With respect to this command, consider a situation prevailing at the end of a shift. If any attendant from the shift is continuing to confer with an incoming caller, it is desirable to await the end of that conversation before terminating the call connection path to that attendant. When the call in progress at the time of issuance of this command ends, the STA 2 signal becomes false. Then, because flip flop 18S is set (therefore the signal produced by its $\overline{Q}$ output is false), and the STA 2 signal is false, NOR gate 18W produces a true signal, causing OR gate 18V to reset outgoing line connect flip flop 18T. This starts the sequence involved in disconnecting the call connection path to the attendant. This sequence entails playing message 2 within the overall time alloted by disconnect timer 18H, and, finally, when the CTL 55 signal becomes false at the end of message 2, it causes hook-switch simulating switch 15F to simulate an on-hook condition. The triggering of disconnect timer 18H enables message 2 flip flop 18J to be toggled by the next ensuing false-to-true transition in the Message 2 Start/Stop Strobe signal (STB 13), which is produced by driver circuit 21G. The signal produced by message 2 flip flop 18J is the Message 2 Control signal (CTL 54). While the CTL 54 signal is true, switch 16H is closed and propagates the Message 2 Audio signal (AUD 7) as the Outgoing Line Audio signal (AUD 0). The next false-to-true transition in the STB 13 signal causes AND gate 18P to clear disconnect timer 18H and simultaneously toggles message 2 flip flop 18J.

On another one of its outputs, decoder 21B produces a Busy Incoming Line Control signal (CTL 12). Controlling computer 3C issues this command to exercise software control over the incoming line; more particularly, when this command is decoded, incoming line software busy flip flop 19C is set. While flip flop 19C is set, the CTL 48 signal produced by OR gate 19B must be true, and accordingly ground start simulating switch 15A must be closed. Controlling computer 3C exercises this software control as part of a software sequence for loading a phone number and placing a call to the multi-purpose station identified by that phone number. As part of this software sequence, controlling computer 3C issues a command to cause decoder 21D to force the Phone Number Memory Strobe Control signal (CTL 30) true. While true, the CTL 30 signal forces OR gate 20I to provide a memory strobe to DTMF generator 20B. Further as part of this software sequence, controlling computer 3C issues a series of commands to load a phone number. Each of the commands in this series causes each of decoders 21C and 21D to force true one of the signals it produces. For example, to load the digit "9," controlling computer 3C issues a command to force both the DTMF Number Dial R3 Control signal (CTL 18) and the DTMF Number Dial C3 Control signal (CTL 26) true. More generally, to load any digit, controlling computer 3C issues a command to cause decoders 21C and 21D to force one of the CTL 16, CTL 17, CTL 18, and CTL 19 signals true, and one of the CTL 24, CTL 25, CTL 26, and CTL 27 signals true. After issuing this series of commands to load the series of digits of the phone number into DTMF generator 20B, controlling computer 3C issues the command that causes decoder 21B to initiate the off-hook and dial sequence that begins with the CTL 9 signal becoming true.

Controlling computer 3C relentlessly monitors the status of each line card by issuing commands to retrieve status A and status B words. This relentless monitoring is a process that is independent of, and in parallel with, the above-described sequence of operation. Based on the retrieved status data, controlling computer 3C communicates via modem phone line 3E with supervisory computer 3D to provide data used to update the displayed status report. For example, when controlling computer 3C finds that a transition has occurred from one of three signals being true, that one being the CTL 48 signal, to all three signals being true, the three being the CTL 48, CTL 55, and STA 1 signals, then controlling computer 3C sends data to supervisory computer 3D to cause the color for the corresponding line card to change from blue to magenta.

Further as part of this independent and parallel process, controlling computer 3C recognizes the occurrence of the encoded security-clearance signal (i.e., the parallel bits of CTL 36–CTL 39). After this is recognized, controlling computer 3C issues the command to cause the CTL 11 signal true. This resets flip flop 19C.

As to the matter of retries, controlling computer 3C monitors the STA 1 and the CTL 55 signals. If transitions occur in these signals (from true to false), then controlling computer 3C increments its count of tries, and, if the incremented count is less than a pre-set number, initiates another try to complete a call with an attendant.

On others of its outputs, decoder 21B produces an Outgoing Line Fast Disconnect Control signal (CTL 13), and an Outgoing Line Fast Connect Control signal (CTL 14). With respect to these decoded commands, consider a sequence of operations carried out under software control to transfer a call from one attendant to another. At the outset of such a transfer, there is already a call in progress. Accordingly, the following signals are true: the STA 1 signal and the CTL 55 signal (in combination, this indicates a call connection path is complete on the outgoing line); and the STA 2 signal (this indicates a call connection path is complete on the incoming line).

Under these conditions, controlling computer 3C issues a command to monitor the incoming line by causing decoders 21C and 21D to force the CTL 21 and CTL 28 signals true. The CTL 21 signal, while true, resets monitor side flip flop 17B (FIG. 17). The CTL 28 signal, while true, sets monitor flip flop 17A (FIG. 17). Next, controlling computer 3C issues a command to cause decoder 21A to force the CTL 2 signal true. This sets flip flop 20H and this in turn disables the internal mute so as to allow DTMF decoder 20A to decode internally generated DTMF signals. Having established this condition, controlling computer 3C issues a command to cause decoders 21C and 21D to force the CTL 16 and CTL 25 signals true so as to simulate a digit "2" at the input of DTMF generator 20B. In response, DTMF generator 20B produces a DTMF signal corresponding to the digit "2." This DTMF signal is received via receiver 20C, and is decoded by decoder 20A so that the STB 7 signal becomes true. The STB 7 signal causes OR gate 17E to reset audio connect flip flop 17C, thereby opening inter-connection switch 14C. At this point, the supervisor can confer with the incoming caller, and the attendant on the outgoing line has been isolated from the incoming line.

Having established this condition, controlling computer 3C issues a command to cause decoder 21B to force the CTL 13 signal true. This causes OR gate 18V to reset outgoing line connect flip flop 18T. This in turn causes disconnect timer 18H to initiate the sequence of operations described above for playing message 2 and then disconnecting the call connection path to the attendant.

Controlling computer 3C monitors status data, as described above, to determine that the disconnection has occurred and that sufficient time has passed to go off hook and dial. This determination is based on monitoring three signals: the on-hook timer status signal (STA 5); the STA 1 signal; and the CTL 55 signal. When all three of these signals have become false, controlling computer 3C proceeds to download a phone number by the series of commands described above. This downloaded phone number identifies the telephone of a transferee attendant.

Next, controlling computer 3C issues a command to cause decoder 21B to force the Outgoing Line Fast Connect Control signal (CTL 14) true. While true, the CTL 14 signal causes OR gates 18X and 18U to set flip flop 18T. This initiates the hardware sequence of placing the call to the transferer attendant. Simultaneously, the CTL 14 signal causes OR gate 17I to set message 3 flip flop 17H to force the CTL 47 signal true. This disables activate timer 18N. Thus, although the sequential operation of one-shots 18K, 18L, and 18M is the same as described above, activate timer 18N does not respond to triggering in this transfer sequence. As a result, the message 1 control signal (CTL 53) remains false; further, neither one-shot 18G nor one-shot 18O is triggered.

When the security-verification signal for a transferee attendant is received, the STB 10 signal is forced true, and this causes OR gate 17J to reset flip flop 17H. As a result, the CTL 47 signal returns to its normal false value. Simultaneously, the STB 10 signal causes AND gate 17D to set audio connect flip flop 17C. Thus, at the end of this transfer sequence, the call on the incoming line is connected through inter-connection switch 14C to the outgoing line connected to the transferee's multipurpose station, and the monitor audio is connected to the incoming line.

To connect the monitor audio to the outgoing line, controlling computer 3C issues a command to force the CTL 20 signal true. This sets monitor side flip flop 17B.

Decoder 21D also produces a Monitor Off Control signal (CTL 29) in response to a digitally coded command issued by controlling computer 3C. The CTL 29 signal has two functions. One of these functions is to reset monitor flip flop 17A. While monitor flip flop 17A is in its reset state, AND gates 17L and 17M force the CTL 41 and CTL 42 signals false, so that both switch 16C and switch 16D are open, whereby neither the incoming line to the particular line card, nor the outgoing line from the particular line card is connected to supervisory station 1I. The second function of the CTL 29 signal is to cause OR gate 17D to set audio connect flip flop 17C. This function is involved when a supervisor has completed a conversation with an incoming caller while inter-connection switch 14C is open. When the Monitor Off Control signal is received, it forces inter-connection switch 14C to close, so that the incoming caller can resume conferring with an attendant.

There will now be described, with reference to FIGS. 24 to 28, other representative human-readable status reports that are displayed to the supervisor on the screen of video display terminal 1F. The ensuing description of these displayed status reports brings out how the supervisor is prompted to use either mouse 1G alone, or mouse 1G and keyboard 1H, in interactively performing a series of steps to effect a selection and every sub-selection needed to enter a supervisory command.

Figure 24:
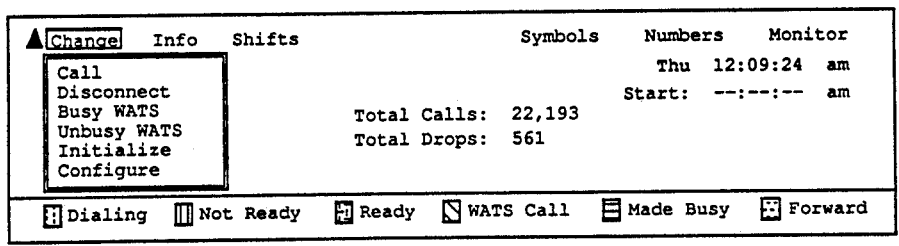
FIG. 24 shows a top portion of a displayed status report, in which a pull-down menu appears as a result of the selection of "Change"

In FIG. 24, the triangular-shaped mouse cursor appears in the main menu selection line, next to the "Change" menu item. The supervisor has selected this item on the main menu selection line by moving mouse 1G to position the mouse cursor next to the "Change" item and clicking the button on the mouse. As one result of this selection, the "Change" item is highlighted to indicate that it has been selected; the highlighting is indicated in FIG. 24 by a single-line box surrounding the "Change" item. As another such result, there appears in FIG. 24 a pull-down menu, which is associated with this selected main menu item and which is surrounded by a double-line box. This pull-down menu presents the following six sub-selections: "Call"; "Disconnect"; "Busy WATS"; "Unbusy WATS"; "Initialize"; and "Configure." The presentation of these six sub-selections prompts the supervisor to proceed to a step to select one of these six sub-selections by appropriately positioning the mouse cursor, and then clicking the mouse button.

Figure 25:
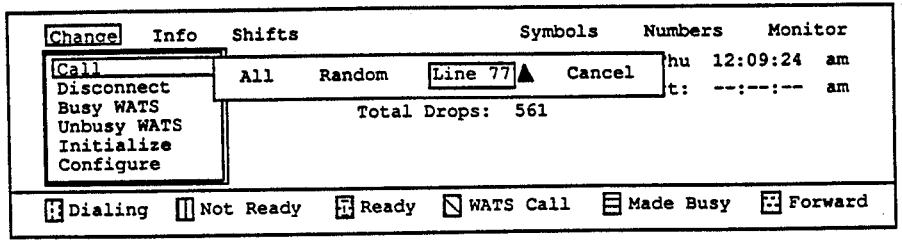
FIG. 25 is related to FIG. 24, and shows a pull-out menu resulting from a selection of "Call" from the pull-down menu.

FIG. 25 shows the top of the displayed status report after the supervisor has selected the "Call" sub-selection. As one result of this selection, the "Call" sub-selection is highlighted; this is indicated in FIG. 25 by a single-line box surrounding the "Call" sub-selection. As another such result, there appears in FIG. 25 a pull-out menu, which is associated with the "Call" sub-selection and which is surrounded by a single-line box. This pull-out menu presents the following four options: "All"; "Random"; "Line 77"; and "Cancel." The presentation of these four options prompts the supervisor to proceed to a step to select one of these options. By selecting the "All" option, the supervisor completes the steps of entering a supervisory command to cause every line card to execute the sequence of operations, under control of controlling computer 3C, involved in placing a call to an attendant who will answer and service calls via the respective line card. The "Random" option enables the supervisor to position the mouse cursor to any arbitrary one of the matrix of 105 line card representing elements, click the mouse button and thereby identify that line card for use in placing a call to an attendant. By doing so, the supervisor completes the steps for entering a supervisory command applicable to the identified line card. If the supervisor wants to enter a supervisory command applicable to another line card, this can be done again in the same way without repeating all the steps starting from selecting "Call" from the main menu selection line. As to the "Line 77" option, line card 77 happens to be the current line card. That is, it is the line card corresponding to the box framed by the display pointer (FIG. 23) at the time the supervisor selected the "Call" item on the main menu. Any line card can similarly be the current line card and be so indicated as part of this pull-out menu. In any case, the selection of this option completes the steps for entering a supervisory command to cause the current line card to execute the sequence of operations involved in placing a call to an attendant. The "Cancel" option is chosen if for example the supervisor had erroneously selected the "Call" sub-selection or the "Change" item. It is also chosen when the supervisor has entered the last of a series of commands from the random selection.

The pull-out menu that appears to the right of the "Call" sub-selection in FIG. 25 will also appear to the right of each of four other selected sub-selections within the pull-down menu. Thus, the supervisor can choose to disconnect every attendant, each of a series of individually identified attendants, or the attendant servicing the line card such as line card 77 that is the currently selected line card. The same is true for causing the busying or un-busying of the incoming lines to the line cards, and for initializing the line cards. As to the "Configure" sub-selection, this has an associated sub-menu (not separately shown) for prompting the supervisor to complete the steps involved in entering a change configuration command. The options of this sub-menu are to change parameters that are global to the system, so there is no need for an additional pull-out menu to prompt for line card identification. These global or system level parameters include ringthrough time, ringthrough length, number of retries, and an emergency telephone number. A ringthrough is a period during the day for which it is projected that incoming traffic will be relatively high so that it is desirable to have attendants on line and ready to answer and service incoming calls immediately.

For some applications of system 1A, it will be the case that incoming traffic volume will vary in a somewhat cyclical basis during the day: that is, there will be a period of low-volume incoming traffic; followed by periods in which incoming traffic rises rapidly, then remains high for awhile, then trickles down to a low volume; then the cycle will repeat again albeit not necessarily with a fixed period. Although variable, the incoming traffic can generally be predicted within reasonable limits. Accordingly, the projected ringthrough times can be stored in records on disk and loaded into supervisory computer 3D. For each projected ringthrough, these records specify a real time used in determining when to start a ring-through, and an interval used in determining when to end the ringthrough. The supervisor can issue a supervisory command to override any projected value.

Figures 26, 27, 28:
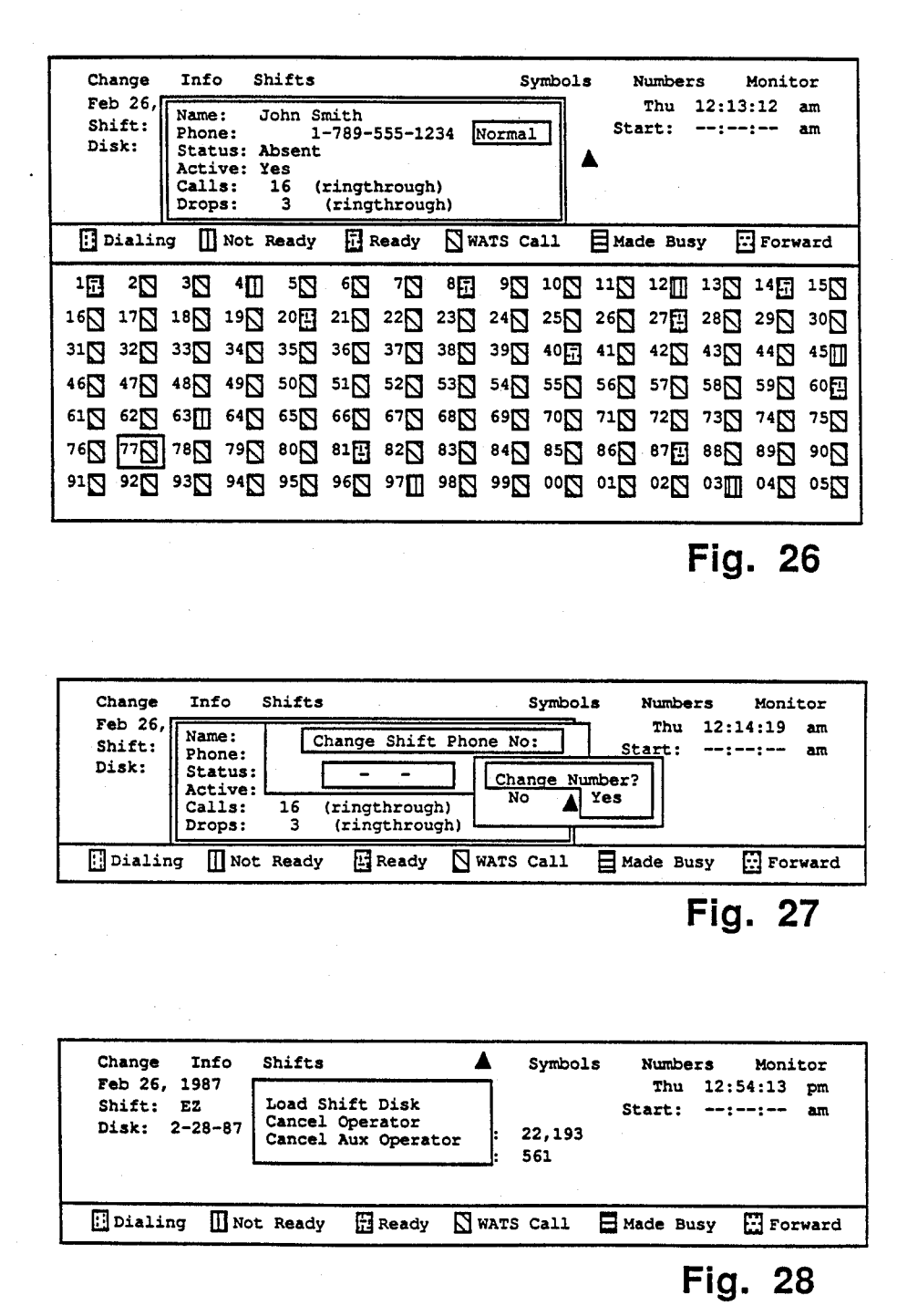

FIG. 26 is somewhat similar to FIG. 23 in that it shows an entire representative displayed status report. In the displayed status report of FIG. 26, the boxes representing the line cards are shaded to indicate various colors representing different status conditions for different line cards. Further, FIG. 26 shows a pull-down menu that is associated with the "Info" item of the main menu line. This pull-down menu is surrounded by a double-line box and presents information about the current line card, which happens to be line card 77 in this example. The information includes the name of the attendant currently designated to answer and service incoming calls through this line card; that attendant's phone number and status and activity and statistical data as to number of calls handled and calls dropped. As to the displayed status field, this can be, in addition to "Absent," as shown in FIG. 26, either "Refused" or "Transferred" or "Cancelled." As to the displayed activity field, this is either "Yes" or "No."

FIG. 27 is related to FIG. 26, and shows a portion of the displayed status report in which the supervisor is being prompted to confirm a change in a phone number. This prompt appears as a result of the supervisor having first clicked on "Phone," and having then entered a phone number by keyboard entry. Through use of this feature, an attendant who had been scheduled to answer and service calls from one multi-purpose station, for example at home, can answer and service calls from another station, for example, the phone at the home of someone the attendant is visiting that day.

FIG. 28 shows a top portion of a displayed status report, in which a pull-down menu appears as a result of the selection of "Shift" from the main menu selection line. In this pull-down menu, the sub-selections available are: "Load Shift Disk"; "Cancel Operator"; and "Cancel Aux Operator." The shift disk is a conventional floppy disk, pre-recorded with all necessary data for a series of shifts for a week. This data include name, phone number, and a Boolean field indicating the attendant either to be a primary attendant assigned to a particular line card or to be an auxiliary attendant to be in a pool available to be called if the need arises.

The above-described displayed status reports are generated by supervisory computer 3D under program control, based in part on status data provided to supervisory computer 3D from controlling computer 3C. As stated above, in the presently preferred embodiment, each of supervisory computer 3D and controlling computer 3C is a personal computer. Each uses a conventional disk operating system for performing a variety of low level functions under control of an application program. The application programs for supervisory computer 3D and controlling computer 3C may be written in any of numerous suitable languages. It is preferred that a compiled program rather than an interpretive program be used, for speed of execution, particularly with respect to matters such as rewriting the screen. A compiled program written in PASCAL has ample speed for this application.

With reference to the flow charts of FIGS. 29–34, there will now be described the internal operations of supervisory computer 3D. Three main processes are carried out on an independent and essentially parallel basis by supervisory computer 3D under program control. To this end, the programming of supervisory computer 3D uses non-preemptive multi-tasking techniques to achieve the effect of timesharing among these three processes.

Figure 29A:
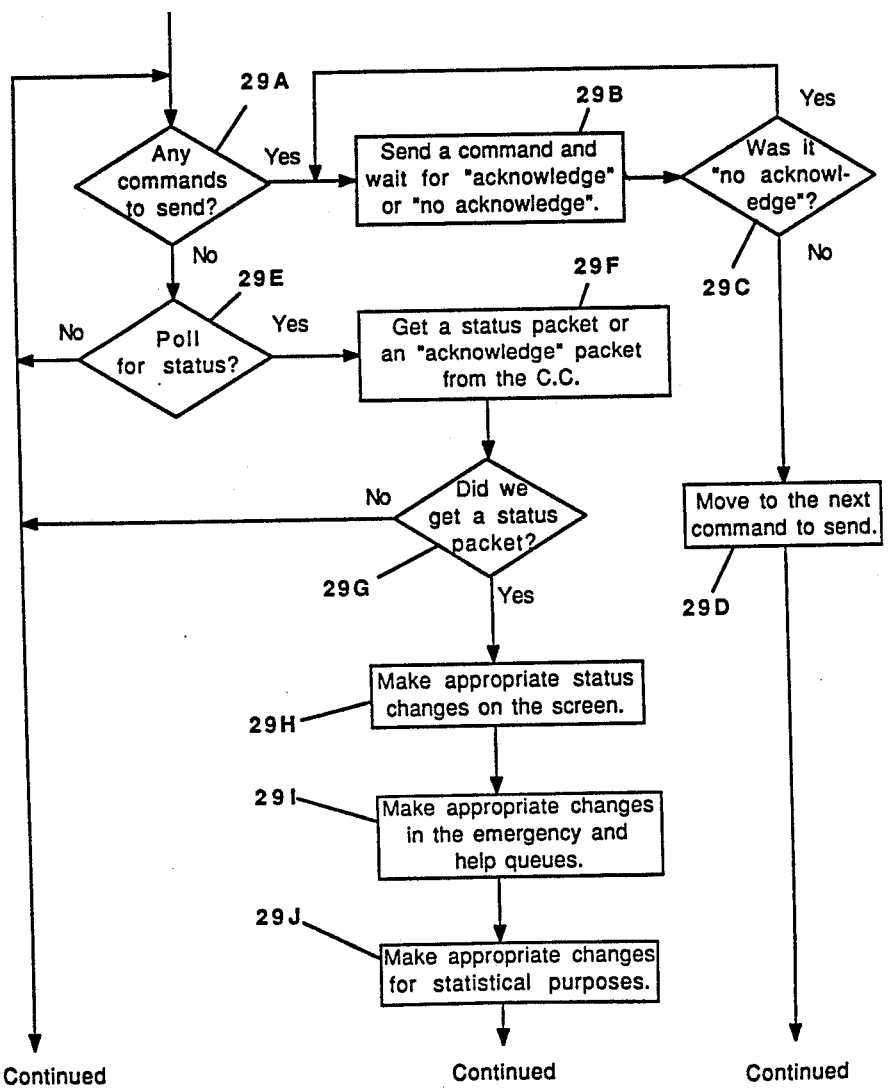
FIG. 29 comprises FIGS. 29A and 29B, and is a general flow chart of overall operations involved in one of three processes carried out by a supervisory computer in the presently preferred embodiment, each of the three processes operating independently of one another; the process of FIG. 29 being for communications between the supervisory computer and a controlling computer incorporated in the presently preferred embodiment.

The flow chart of FIG. 29 depicts the major operations of one of these three processes, which concerns communications between supervisory computer 3D and controlling computer 3C. It will be recalled that each of supervisory computer 3D and controlling computer 3C has a modem, and the two modems are interconnected by modem phone line 3E. Suitably, data are transferred between these two computers in packets. Each such packet has a standard header format, preceding a variable length record. In accord with standard techniques, the header includes bytes for a check sum and for the length of the ensuing variable length record. Various and sundry detailed operations are involved in assembling such packets, in establishing communication parameters for the modems, and in serially providing bytes to the modems. Providing for these and similar detailed operations are routine matters and are subordinate to the broader matters covered in FIG. 29 and the remaining flow charts.

The following PASCAL-language declarations set out constants that, in the application program for supervisory computer 3D, are referred to in operations to communicate supervisory commands from supervisory computer 3D to controlling computer 3C:

|  | {Communications-related packets.} | |
|---|---|---|
| Const | | |
| COMM_PREFIX = | $80; | {High 4-bits of a comm command.} |
| ACK_CMD = | $81; | {Acknowledge packet receipt.} |
| NAK_CMD = | $82; | {Error in packet communications.} |
|  | {Telephone number packets.} | |
| Const | | |
| TELENUM_PREFIX = | $90; | {High 4-bits of telenum command.} |
| GET_TELENUM_CMD = | $90; | {Get phone number Controller.} |
| SET_TELENUM_CMD = | $91; | {Set number in Controller.} |
| BLOCK_TELENUM_CMD = | $98; | {Set numbers for a row.} |
|  | {The line controlling commands.} | |
| Const | | |
| ALL_LINES = | $7F; | {For commands on all lines.} |
| LINECTRL_PREFIX = | $A0; | {High 4-bits of line cont. cmd.} |
| CALL_OPER_CMD = | $A0; | {Call operator(s).} |
| DISCONN_OPER_CMD = | $A2; | {Disconnect operator(s).} |
| BUSY_CALLER_CMD = | $A3; | {Make caller side(s) busy.} |
| UNBUSY_CALLER_CMD = | $A4; | {Make caller side(s) unbusy.} |
| INIT_CARD_CMD = | $A5; | {Initialize line card(s).} |
|  | {Monitor-related commands.} | |
| Const | | |
| MONITOR_PREFIX = | $B0; | {High 4-bits of monitor command.} |
| MONITOR_CALLER_CMD = | $B0; | {Monitor the caller side.} |
| MONITOR_OPER_CMD = | $B1; | {Monitor operator side.} |
|  | {Parameter-changing commands.} | |
| Const | | |
| PARAM_PREFIX = | $C0; | {High 4-bits of parameter cmd.} |
| SET_RETRY_CMD = | $C0; | {Set dialing retry count.} |
| SET_EMER_NUM_CMD = | $C1; | {Set emergency transfer number.} |

-continued

| | | |
|---|---|---|
| SET_NPA_CMD = | $C2; | {Set the local area code.} |
| SET_LOCAL_ACS_CMD = | $C3; | {Set the local access numbers.} |
| GET_READY_CMD = | $C8; | {Get dialing retry count.} |
| GET_EMER_NUM_CMD = | $C9; | {Get emergency transfer number.} |
| GET_NPA_CMD = | $CA; | {Get the local area code.} |
| GET_LOCAL_ACS_CMD = | $CB; | {Get the local access numbers.} |

{Emergency and help servicing commands.}

Const

| | | |
|---|---|---|
| EMERHELP_PREFIX = | $D0; | {High 4-bits of emer/help cmd.} |
| TRANSFER_EMER_CMD = | $D0; | {Transfer caller to emer number.} |
| HELP_SERVICED_CMD = | $D1; | {Signal the help as serviced.} |
| EMER_SERVICED_CMD = | $D2; | {Signal the emer as serviced.} |

{For the status.}

Const

| | | |
|---|---|---|
| STATUS_PREFIX = | $F0; | {High 4-bits of status/dump cmd.} |
| STATUS_CMD = | $F0; | {Returned status command.} |
| MULTI_STATUS_CMD = | $F1; | {Dump up to 105 new statuses.} |
| UPDATE_SUPER_CMD = | $F2; | {Update the supervisor.} |
| POLLING_CMD = | $F3; | {Poll the C. Comp. for packets.} |

(The term "operator," as used in the comments, means the attendant.)

In block 29A of FIG. 29, supervisory computer 3D determines whether any supervisory command is to be sent to controlling computer 3C. Block 29A is in accord with a convention used throughout the flow charts in which a diamond-shaped block indicates a control structure for controlling the flow of operations. A corresponding programming control structure is an "if-then-else" control structure. As to supervisory commands, the programming of supervisory computer 3D includes conventional mouse driver programming and associated programming that provides for determining when and which supervisory command has been entered by the supervisor. Further, conventional circular queue managing programming is included to provide a list of entered supervisory commands and to provide head and tail pointers to the list. If the tail pointer exceeds the head pointer by more than one (modulo the number of cells provided by the circular queue) then there are supervisory commands waiting in the queue to be sent to controlling computer 3C.

If there is a supervisory command to send, the flow proceeds to block 29B in which supervisory computer 3D sends a supervisory command to controlling computer 3C and waits for either an "acknowledge" or a "no acknowledge." In block 29C, supervisory computer 3D determines whether a "no acknowledge" has been returned and, if so, re-enters block 29B. Otherwise, the flow proceeds to a block 29D, which entails moving in the circular queue to the next supervisory command to send, and then looping back to re-enter block 29A.

If within block 29A it is determined that there is no supervisory command to send, the flow proceeds to block 29E in which supervisory computer 3D determines whether to poll for status data.

The following PASCAL-language declarations set out constants that, in the application program for supervisory computer 3D, are referred to in operations to receive status data from controlling computer 3C:

{Status byte returned from the controlling computer 3C.}
{Low nibble concerns screen colors.}
Const

| | | |
|---|---|---|
| S_DIALING | = 1; | {Card is trying to reach an operator.} |
| S_UNREADY | = 2; | {Operator is not ready for incoming calls.} |
| S_READY | = 3; | {Operator is ready and waiting for calls.} |
| S_CIP | = 4; | {There is a call in progress on the line.} |

-continued

| | | |
|---|---|---|
| S_BUSY | = 5; | {The caller side of the line is busied.} |
| S_UNBUSY | = 6; | {The caller side of the line is unbusied.} |
| S_FWD | = 7; | {The card is in forward mode.} |
| S_UNKNOWN | = 8; | {The card is in unknown condition.} |
| S_NOCARD | = 9; | {There is no card in the given position.} |

{High nibble concerns other status matters.}
Const

| | | |
|---|---|---|
| S_EMER | = 16; | {An emergency request for the given line.} |
| S_HELP | = 32; | {A help request for the given line.} |
| S_CANCEL | = 48; | {The help or emer request is cancelled.} |
| S_TFERRED | = 64; | {The emergency call has been transferred.} |
| S_NOOPER | = 80; | {The oper. didn't respond in retry limit.} |
| S_REFUSED | = 96; | {The operator refused further calls.} |

If no such polling is to be conducted, the flow returns to block 29A. Otherwise, the flow proceeds to block 29F in which supervisory computer 3D gets a status packet or an acknowledge packet from controlling computer 3C. Next, the flow proceeds to block 29G, in which supervisory computer 3D determines whether a status packet has been received. If not, the flow returns to block 29A. Otherwise, the flow proceeds to block 29H, in which supervisory computer 3D updates the displayed status report in accord with the data provided by controlling computer 3C in the received status packet. In the presently preferred embodiment, the colors of the boxes are controlled by screen attribute bytes stored in the screen buffer. The following PASCAL-language constant declarations apply to these attribute bytes:

{The colors of the line card status}
Const

| | | |
|---|---|---|
| DIALING_COLOR | = $0D; | {Light magenta/black} |
| NOT_READY_COLOR | = $0C; | {Light red/black} |
| READY_COLOR | = $0E; | {Yellow/black} |
| WATS_CALL_COLOR | = $02; | {Green/black} |
| MADE_BUSY_COLOR | = $09; | {Light blue/black} |
| MADE_UNBUSY_COLOR | = $06; | {Brown/black} |
| FORWARD_COLOR | = $07; | {Grey/black} |
| NO_CARD_COLOR | = $00; | {Black/black} |
| FLASH_COLOR | = $80; | {Makes a color flash} |

Thus, there is no need to keep a separate table in supervisory computer 3D of status data, by line card, with respect to status matters such as dialing or not, ready or not, and the like. Next, the flow proceeds to block 29I, in which supervisory computer 3D makes appropriate changes in emergency and help queues, these being first-in, first-out variable length lists kept in memory. Next, controlling computer 3D in block 29J makes appropriate changes to a database it maintains for statistical purposes. This database comprises records in which are kept various statistics such as number of calls, number of dropped calls and the like. The following PASCAL-language type declaration applies to each database record in supervisory computer 3D:

```
Type
    OpStat_Type = array[1 ... 105] of record
      op_calls,      {calls per ringthrough}
      op_drops,      {drops per ringthrough}
      last_stat,     {last status, recorded for later comparison
                      in computing length of call}
      oper_scnd,     {time of receipt of last status-secs}
      oper_time,     {time of receipt of last status-hrs/mins}
      oper_dofw      {time of receipt of last status-day of wk.}
      : Integer;
    end;
```

Figure 29B:
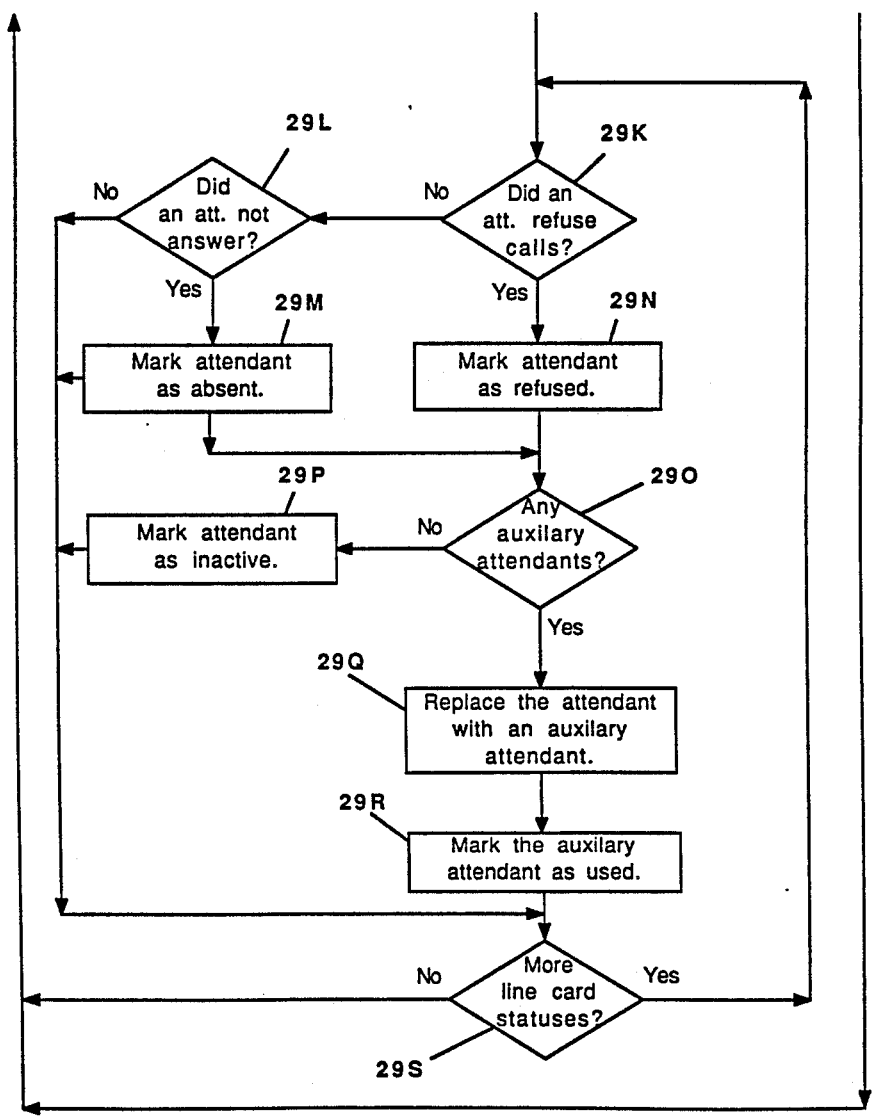

The operations depicted in FIG. 29B relate to automatic features for originating calls to auxiliary operators when the need arises to do so. As stated above, data are pre-recorded on a shift disk to provide the names, phone numbers, and other information concerning persons who have been scheduled to serve as either primary attendants or in a pool of auxiliary attendants. As a result of loading such a shift disk, there is produced in the memory of supervisory computer 3D a list of entries. Each such entry includes a name, a phone number, a designation as to primary attendant or auxiliary attendant, and a designation as to active or inactive.

If an attendant is scheduled to be a primary attendant, but either does not respond when called, or refuses calls, it is desirable to replace that attendant with an auxiliary attendant on an automatic basis without requiring intervention by the supervisor.

The operations relating to this automatic feature involve, as indicated in block 29K, determining whether an attendant has refused calls. To provide an indication to the system of the decision to refuse calls, a person can, while on line to the system, use the touch tone keypad on the multi-purpose station to initiate the generation of a predetermined in-band signal. Upon detection of this predetermined signal and communication of its receipt within a status packet, supervisory computer 3D can proceed to perform appropriate functions without manual intervention by the supervisor.

If an attendant did not refuse calls, the flow proceeds to block 29L. In block 29L, supervisory computer 3D determines whether an attendant did not answer. If an attendant did not answer, the flow proceeds to block 29M in which supervisory computer 3D updates the list to mark the attendant's entry to indicate the attendant is absent.

If an attendant refuses calls, the flow proceeds from block 29K to block 29N, in which supervisory computer updates the list to mark the attendant's entry to indicate the attendant has refused calls.

After either block 29M or block 29N, the flow proceeds to block 29O, in which supervisory computer 3D determines whether any auxiliary attendants are available to replace a candidate attendant. If not, the flow proceeds to block 29P in which supervisory computer 3D updates the list to mark the attendant's entry to indicate the attendant is inactive. Otherwise, the flow proceeds to block 29Q, in which supervisory computer 3D updates the list by replacing the attendant's entry with an available auxiliary attendant's entry. Next, the flow proceeds to block 29R, in which supervisory computer 3D marks the auxiliary attendant's entry to indicate that the attendant is no longer available in the pool. Next, the flow proceeds to block 29S, in which supervisory computer 3D determines whether further processing is needed with respect to status data for other line cards reported in the status packet being processed. If so, the flow loops back to re-enter block 29K; otherwise, it loops back to re-enter block 29A.

Figure 30:
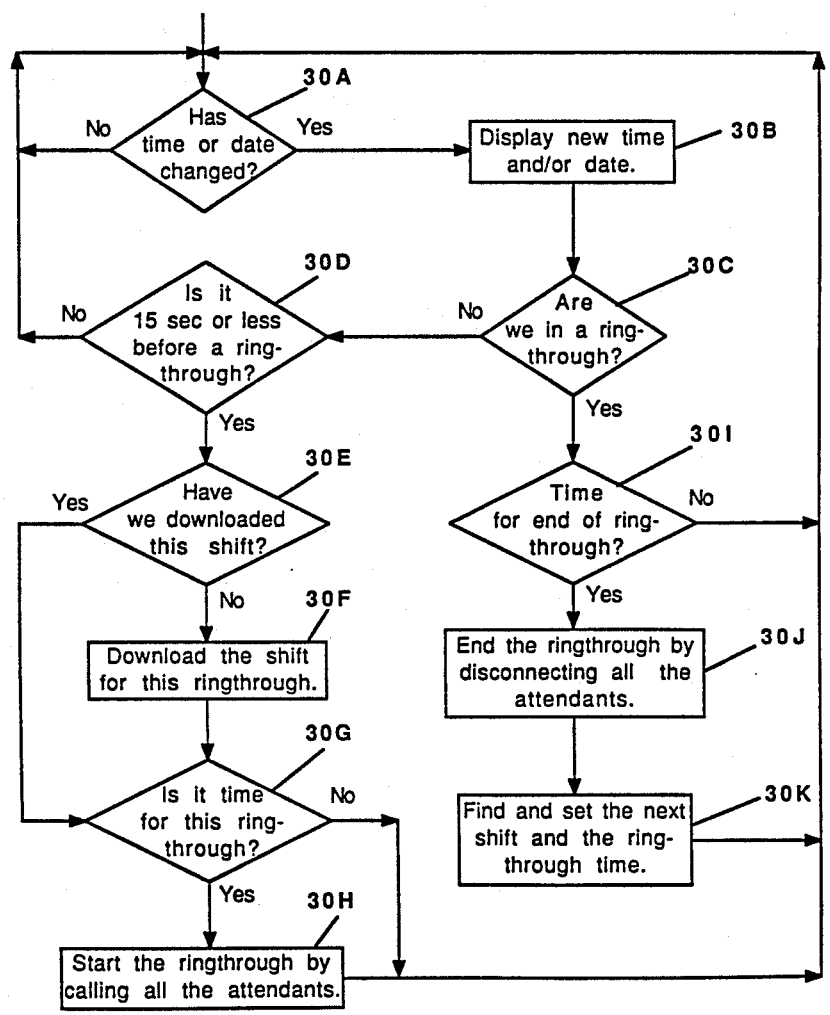
FIG. 30 is a general flow chart of overall operations involved in a second of the three processes carried out by the supervisory computer, the process of FIG. 30 being for real-time timing and for automatic functions.

With reference to the flow chart of FIG. 30, there will now be described the operations of a second of the independent processes, this process being for real-time timing and automatic functions. In block 30A, supervisory computer 3D determines whether the time or date has changed (i.e. by a sufficient increment, which for real-time clock purposes is one second). If not, the flow loops back to re-enter block 30A. This loop has the characteristics of a "repeat-until" programming control structure. Upon exiting this repeat-until loop, the flow proceeds to block 30B, in which supervisory computer 3D causes a new time and, if necessary, a new date to be displayed (see FIG. 23, e.g., for the location within the displayed status report where date and time are displayed). Next, the flow proceeds to block 30C in which supervisory computer 3D determines whether a ringthrough is in progress. If not, the flow proceeds to block 30D where supervisory computer 3D determines whether 15 seconds or less time remains before the next projected ringthrough. If not, the flow loops back to re-enter block 30A. Otherwise, the flow proceeds to block 30E, in which supervisory computer 3D determines whether shift data have been downloaded for the ringthrough. If not, the flow proceeds to block 30F, then to block 30G; otherwise, the flow proceeds to block 30G directly. In block 30F, shift data are downloaded. That is, data that have been pre-recorded on disk and read into memory of supervisory computer 3D are sent to controlling computer 3C. In block 30G, supervisory computer 3D determines whether the time has arrived to start the ringthrough. If so, the flow proceeds to block 30H then loops back to re-enter block 30A; otherwise, the flow loops back directly. In block 30H, the ring-through is started by placing calls to all attendants in a shift for the ringthrough.

If it is determined in block 30C that a ringthrough is in progress, the flow proceeds to block 30I in which supervisory computer 3D determines whether the time has arrived to end the ring through. If not, the flow loops back to re-enter block 30A. If it has, the flow proceeds to a block 30J in which supervisory computer 3D ends the ringthrough by cooperating with controlling computer 3C to disconnect all the attendants, then proceeds to block 30K in which supervisory computer 3D finds and sets the next shift and ring through time and then loops back to re-enter block 30A.

With reference to FIG. 31, there will now be described the operations of a third of the three independent processes, this process being for the user interface. In block 31A, supervisory computer 3D determines whether the supervisor has issued a request, through either the keyboard or the mouse. As stated above, conventional mouse driver programming is included within the software for supervisory computer 3D. Through reference to a combination of variables that are controlled by such mouse driver programming, supervisory computer 3D makes the determination whether a request is pending. If no request is pending, the flow loops back to re-enter block 31A. This loop has the characteristics of a "repeat-until" programming control structure. Upon exiting this repeat-until loop, the flow proceeds through a series of test blocks that correspond to a programming "case" control structure within a loop such that the flow re-enters block 31A. In the case of a request to change the line card which is being monitored, the flow proceeds from block 31B to block 31C. The display pointer described above with reference to FIG. 23 indicates to the supervisor which line card is providing monitor audio to supervisory Station 1I. A variable keeps track of which one of the line cards is being monitored. When the supervisor wants to change the line card being monitored from a first line card to a second line card, the supervisor moves the mouse to position the mouse cursor so that it is placed next to the box for the second line card, and then clicks the mouse button. This constitutes a request to which supervisory computer 3D responds by updating the above-mentioned variable to identify the second line card, and by repositioning the display pointer, and so forth, to change the line card being monitored. Supervisory computer 3D further responds to the request by sending supervisory commands to controlling computer 3C to cause it to send digitally coded commands to the first and second line cards to disable the monitor audio on the first line card and to enable it on the second line card. In the case of a request to send a supervisory command to controlling computer 3C, the flow proceeds from block 31D to block 31E. The operations of block 31E are described below with reference to FIG. 32. In the case of a request for a configuration command, the flow proceeds from block 31F to block 31G. The operations of block 31G are described below with reference to FIG. 33.

In a case of a request for a shift command, the flow proceeds from block 31H to block 31I. The operations of block 31I are described below with reference to FIG. 34.

Figure 32A:
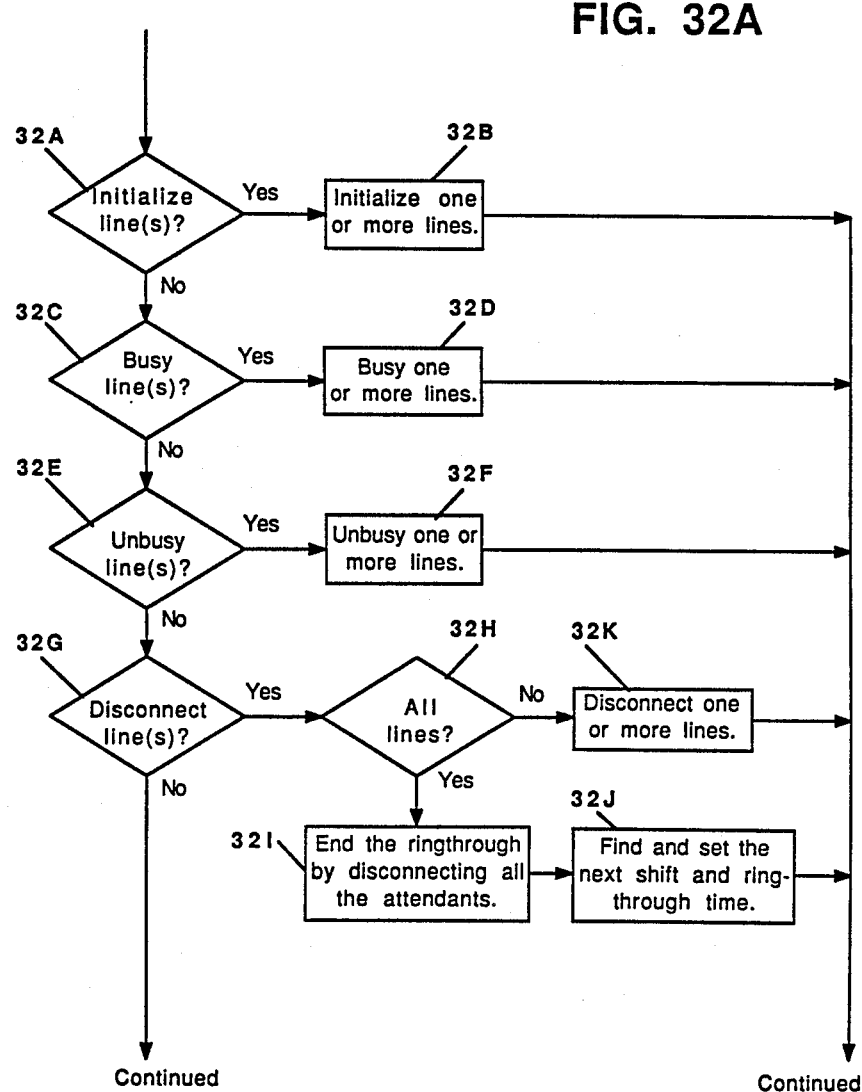
FIG. 32 comprises FIGS. 32A and 32B, and is a more detailed flow chart of certain operations involved in the process of FIG. 31 with respect to processing a user command to send to the controlling computer.
Figure 32B:
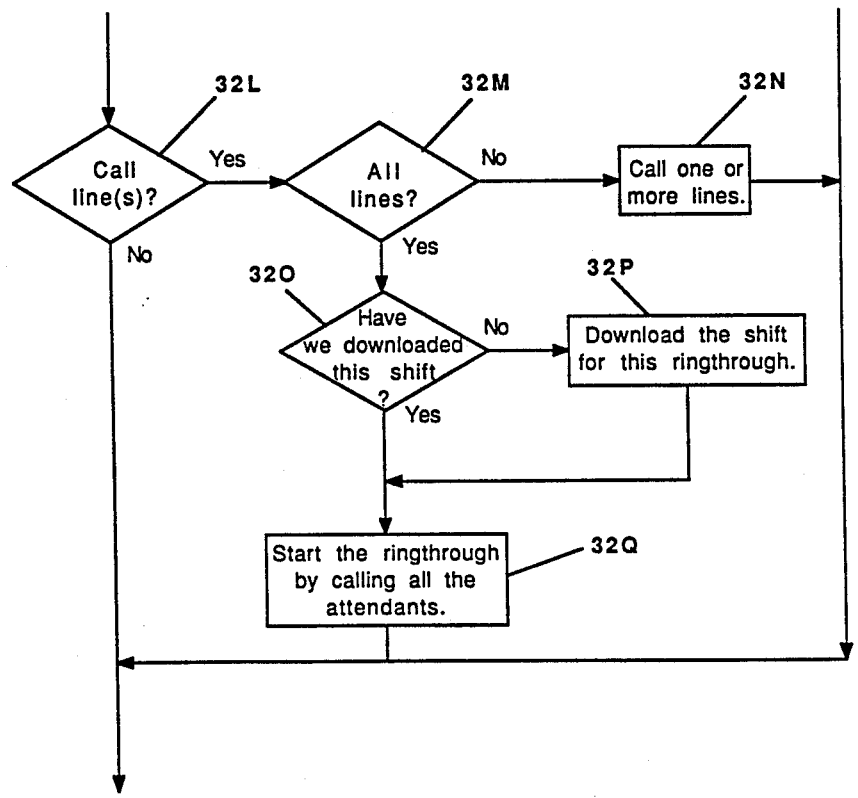

With reference to FIGS. 32A and 32B, there will now be described the operations for processing a supervisory command to be sent to controlling computer 3C. These operations begin in block 32A, are entered from block 31D (FIG. 31), and exit to block 31A (FIG. 31). The flow proceeds through a series of test blocks that correspond to a programming "case" control structure. FIG. 32A shows that, in the case of a command to initialize one or more lines, the flow proceeds from block 32A to block 32B, in which at least one line card is initialized. For each line card that is initialized during block 32B, supervisory computer 3D sends supervisory commands to controlling computer 3C, and it in turn sends digitally coded commands to the line card to be decoded by decoders 21A–21D described above. These initialization commands place the line card in a predetermined state, in which both the circuitry for the incoming line station connection controller and the circuitry for the outgoing line station connection controller are off hook and busy. Further, status records maintained in a status file in controlling computer 3C are set to correspond to this predetermined state. This status file is discussed below with reference to FIG. 35, the flow chart for the outer loop of operation of controlling computer 3C.

In the case of a supervisory command to busy one or more line cards, the flow proceeds from block 32C to block 32D. As indicated in the pull-down menu shown in FIG. 24, "Busy WATS" is one of the sub-selections available in the pull-down menu beneath the "Change" main menu item. Further, because the pull-out menu that is presented upon clicking on "Busy WATS" presents options as to all, random, etc., one or more line cards can be identified by the supervisor to be placed in a busied-out condition. For each such line card, supervisory computer 3D and controlling computer 3C cooperate to cause the ground start simulating switch on the line card to close to busy-out the incoming line.

In the case of a supervisory command to unbusy one or more line cards, the flow proceeds from block 32E to block 32F. As indicated in the pull-down menu shown in FIG. 24, "Unbusy WATS" is one of the sub-selections available. Further, because the pull-out menu that is presented upon clicking on "Unbusy WATS" presents options as to all, random, etc., one or more line cards can be identified by the supervisor to be placed in an unbusy condition. For each such line card, supervisory computer 3D and controlling computer 3C cooperate to cause the ground start simulating switch on the line card to open, to unbusy the incoming line.

In the case of a supervisory command to disconnect one or more lines, the flow proceeds from block 32G to block 32H, and, if all lines are to be disconnected, through blocks 32I and 32J. If one or more but not all the lines are to be disconnected, the flow proceeds from block 32H to block 32K. As indicated in the pull-down menu shown in FIG. 24, "Disconnect" is one of the sub-selections available beneath the "Change" main menu item. Further, because the pull-out menu that is presented upon clicking on "Disconnect" presents options as to all, random, etc., one or more line cards can be identified by the supervisor to be disconnected. For each such line card, supervisory computer 3D and controlling computer 3C cooperate to cause the circuitry for the station connection controller for the outgoing line to disconnect the attendant. If all attendants have been so disconnected, in block 32J, supervisory computer 3D finds and sets the next shift and ringthrough time.

With reference to FIG. 32B, in the case of a supervisory command to call one or more lines, the flow proceeds from block 32L to 32M, and if one or more but not all of the lines are to be called, to block 32N. As indicated in the pull-down menu shown in FIG. 24, "Call" is one of the sub-selections available in the pull-down menu beneath the "Change" main menu item. Further, because the pull-out menu that is presented upon clicking on "Call" presents options as to all, random, etc., one or more line cards can be identified to have a call placed to an attendant. For each such line card, supervisory computer 3D and controlling computer 3C cooperate to cause the circuitry for the outgoing line station connection controller to go off hook and dial an attendant and retry if necessary until a security verification signal is received. If all lines are to be called, the flow proceeds from block 32M to block 32O, in which supervisory computer 3D determines whether shift data have been downloaded. If not, the flow proceeds to block 32P, in which supervisory computer 3D downloads shift data for this ringthrough. Either after block 32P, or if it is determined in block 32O that shift data have already been downloaded, the flow proceeds to block 32Q, in which supervisory computer 3D starts the ringthrough by calling all the attendants.

Figure 33A:
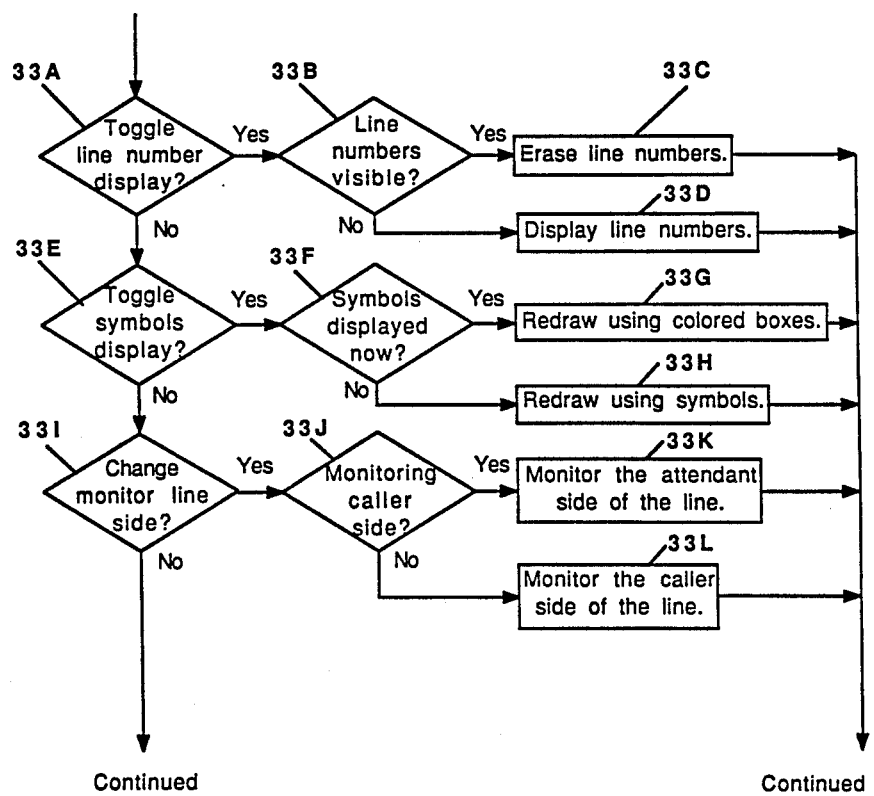
FIG. 33 comprises FIGS. 33A and 33B, and is a more detailed flow chart of certain operations involved in the process of FIG. 31 with respect to processing a system configuration command.
Figure 33B:
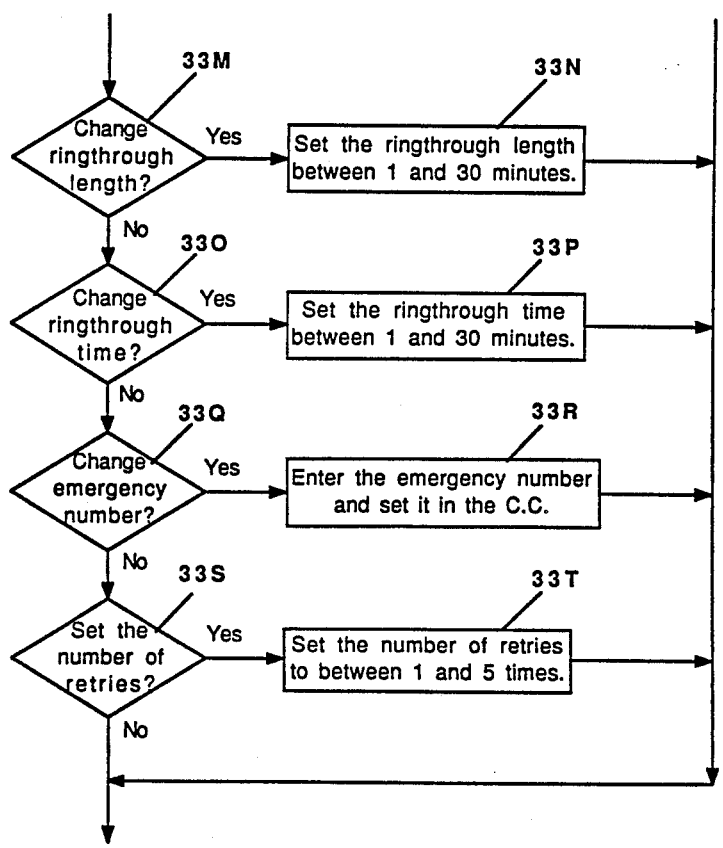

With reference to FIGS. 33A and 33B, there will now be described the operations for processing a system configuration command. These operations begin in block 33A, are entered from block 31F (FIG. 31), and exit to block 31A (FIG. 31). The flow proceeds through a series of test blocks that correspond to a programming "case" control structure. The configuration commands include commands affecting the displayed status report and commands affecting global or system level parameters. As indicated in FIG. 23, the main menu line includes items for "Symbols," and for "Numbers," and for "Monitor." These configuration commands affect the displayed status report and are involved in the operations depicted in FIG. 33A.

In the case of a configuration command to toggle the line numbers on the display, the flow proceeds from block 33A to block 33B, in which supervisory computer 3D determines whether line numbers are presently visible. If they are, supervisory computer 3D enters block 33C in which it causes the line numbers to be erased from the displayed status report. If the line numbers are not visible, supervisory computer 3D enters block 33D and causes the line numbers to be displayed as part of the displayed status report. In the case of a configuration command to toggle the symbols display, the flow proceeds from block 33E to block 33F. In block 33F, supervisory computer 3D determines whether symbols are currently being displayed, and, if they are, enters block 33G in which supervisory computer 3D writes to the screen buffer to redraw the screen using color boxes for the displayed status report. If not, supervisory computer 3D enters block 33H and redraws the displayed status report using symbols, instead of colored boxes. In the case of a configuration command to change the monitor line side, flow proceeds from block 33I to 33J. In block 33J, supervisory computer 3D determines whether the caller side or the attendant side is being monitored. If the caller side is being monitored, the flow proceeds to block 33K. In block 33K, supervisory computer 3D cooperates with controlling computer 3C to switch to monitor the attendant side of the line. Otherwise, supervisory computer 3D enters block 33L, in which supervisory computer 3D and controlling computer 3C cooperate to cause the monitor audio to be connected to the caller side of the line.

With reference to FIG. 33B, the configuration commands involved in the operations depicted in FIG. 33B are those associated with the sub-menu presented upon clicking on "Configure" (FIG. 24). In the case of a change of ring-through length, the flow proceeds from block 33M to block 33N, in which the ringthrough length may be set within limits between one and thirty minutes, as determined by the supervisor's entry of the value using the mouse. In the case of a change configuration command to change the ringthrough time, the flow proceeds from block 33O to block 33P, in which the ringthrough time is set to a time within limits between one and thirty minutes, as determined by the supervisor's entry of the time using the mouse. In the case of a change configuration command to change the emergency number, the flow proceeds from block 33Q to block 33R, in which the telephone number for an emergency operator, keyed in by the supervisor using the keyboard, is sent to controlling computer 3C.

In the case of a change configuration command in which the supervisor is setting a new number of retries, the flow proceeds from block 33S to block 33T, in which the number of retries is set to a number within limits between one and five times, as determined by the supervisor's entry of the number using the mouse.

Figure 34A:
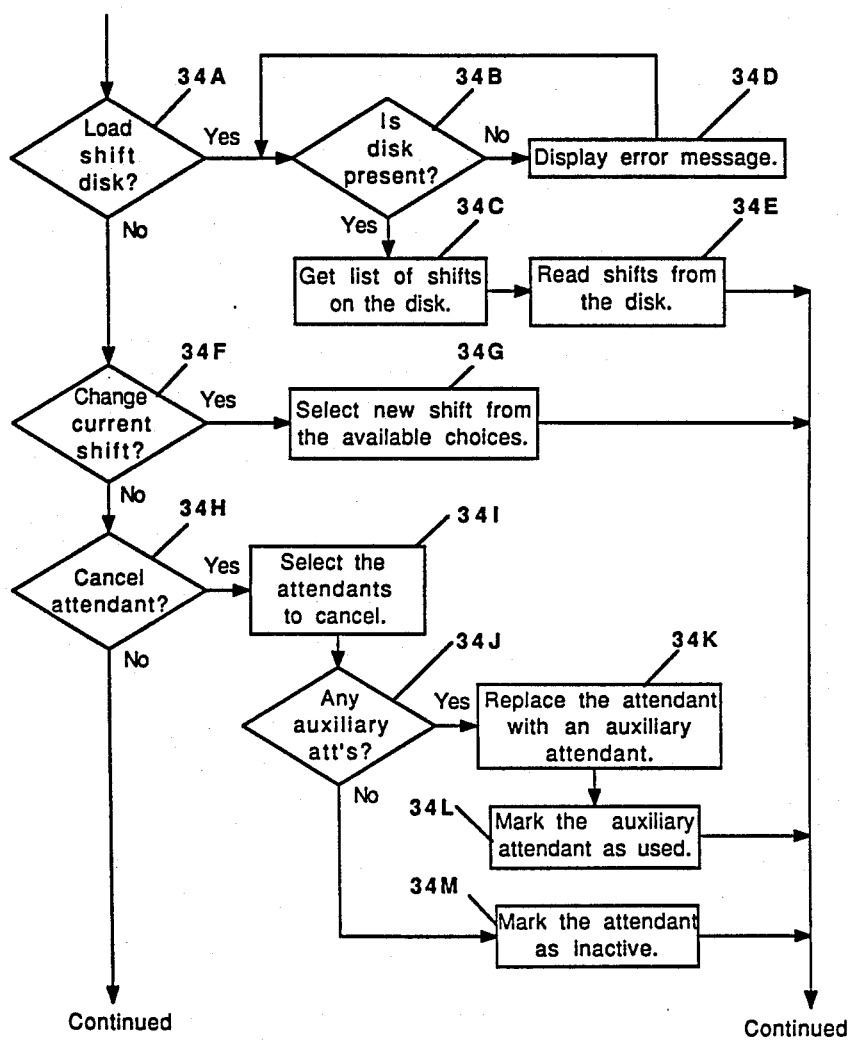
FIG. 34 comprises FIGS. 34A and 34B, and is a more detailed flow chart of certain operations involved in the process of FIG. 31 with respect to processing shift and operator commands.
Figure 34B:
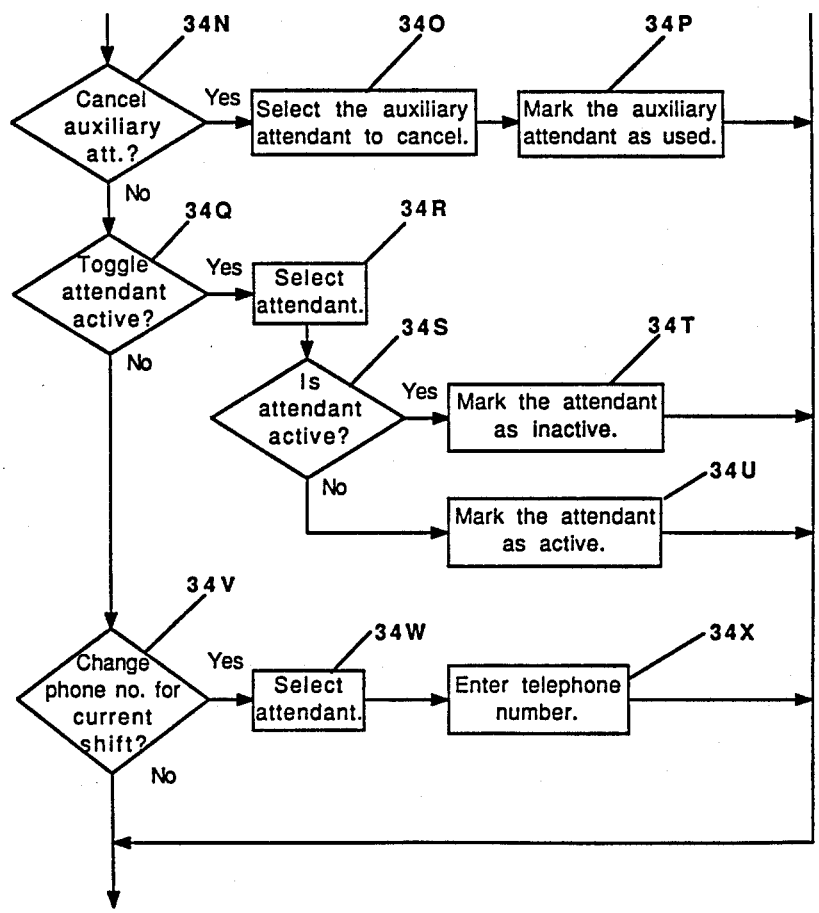

With reference to FIGS. 34A and 34B, there will now be described the operations involved in processing shift and attendant commands that the supervisor enters in response to prompting by the displayed status report shown in FIG. 28. These operations begin in block 34A, are entered from block 31H (FIG. 31), and exit to block 31A (FIG. 31). This flow of operations involves a series of tests that correspond to a "case" programming control structure. In the case of a supervisory command to load a shift disk, the flow proceeds from block 34A to block 34B, and if a disk is present in the disk drive, to block 34C. If no disk is present in the disk drive, the flow proceeds to block 34D, in which supervisory computer 3D causes an error message to be displayed and then loops back to re-enter block 34B. Accordingly, a looping action occurs until such time as the correct disk is placed in the disk drive. Eventually when a shift disk is found present in block 31C so that flow proceeds to block 34C, supervisory computer 3D gets a list of shifts on the disk, and in block 34E reads each shift so listed from the disk. In the case of a supervisory command to change the current shift (resulting from clicking on "Shift" on the left side of the display of FIG. 28), the flow proceeds from block 34F to block 34G, in which the supervisor selects a new shift from available choices. In the case of a supervisory command to cancel an attendant, flow proceeds from block 34H to block 34I, in which the supervisor selects each attendant to cancel. Following block 34I, the flow proceeds to block 34J in which supervisory computer 3D determines whether an auxiliary attendant is available to replace the attendant being cancelled. It makes this determination on the basis of reference to the list of pooled auxiliary attendants. If so, flow proceeds to block 34K in which the attendant is replaced with an auxiliary attendant. Then in block 34L, supervisory computer 3D marks its records to indicate the auxiliary attendant is no longer available to be assigned to another line card. In other words, the auxiliary attendant is deleted from the pool. On the other outcome of the test effected in block 34J, the flow proceeds to block 34M, in which supervisory computer 3D marks its records for the cancelled attendant as being inactive.

With reference to FIG. 34B, in the case of a supervisory command to cancel an auxiliary attendant, the flow proceeds from block 34N to blocks 34O and 34P, in which supervisory computer 3D prompts the supervisor to select the auxiliary attendant to cancel, and then marks the record for the auxiliary attendant as no longer available to be assigned to a line card. In the case of a supervisory command to toggle an attendant as active, the flow proceeds from block 34Q to block 34R and then to block 34S. In block 34R, an attendant is selected, and in block 34S, supervisory computer 3D determines whether this selected attendant is active. If so, supervisory computer 3D marks its record for that attendant as being inactive; if not, supervisory computer 3D marks the record for attendant as being active. These occur in blocks 34T and 34U, respectively. In the case of a supervisory command to change the phone number for the current shift, the flow proceeds from block 34V to blocks 34W and 34X, in which the supervisor selects the attendant and then enters the telephone number.

With reference to FIGS. 35 through 62, there will now be described the internal operations of controlling computer 3C in responding to supervisory commands sent to it from supervisory computer 3D and in cooperating with supervisory computer 3D to control line connection control system 1C.

Figure 35:
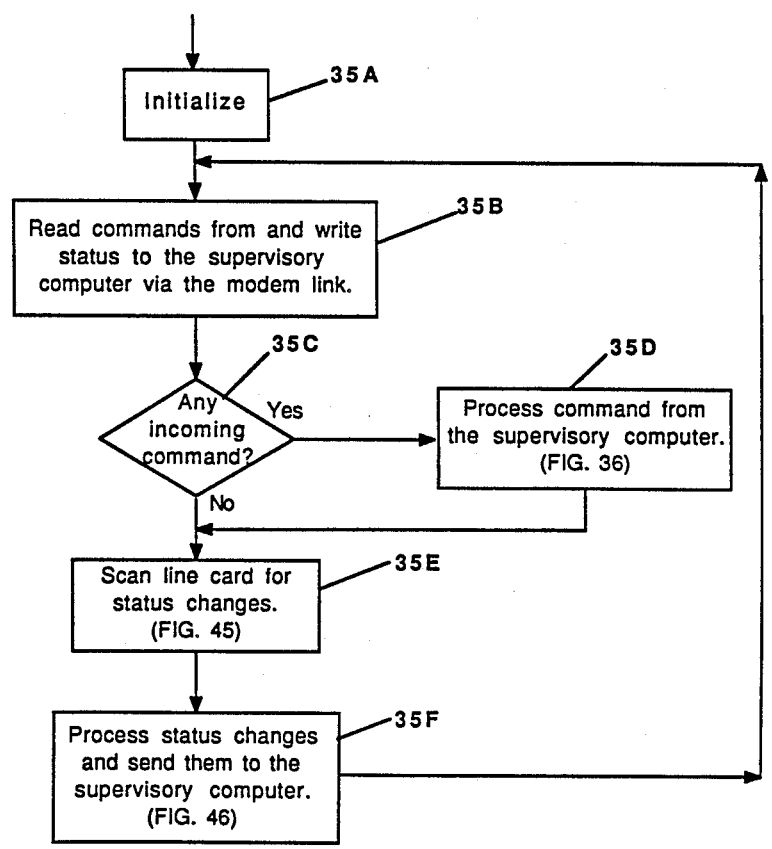
FIG. 35 is a general flow chart of overall operations involved in a main, outer loop carried out by the controlling computer.

FIG. 35 shows a flow chart for the overall outer loop of operations carried out by controlling computer 3C. In block 35A of this outer flow, controlling computer 3C initializes itself. Following initialization, controlling computer 3C enters its main outer loop which begins in block 35B, in which controlling computer 3C reads commands from, and writes status data to, supervisory computer 3D via modem. Following block 35B, controlling computer 3C enters block 35C to determine whether an incoming command has arrived. If so, the flow proceeds to block 35D, in which the command from supervisory computer 3D is processed. The operations involved in block 35D are described below with reference to FIG. 36. If no incoming command has arrived, the flow proceeds from block 35C to block 35E, in which controlling computer 3C scans the line cards for status changes. The operations involved in block 35E are described below with reference to FIG. 45. Following block 35E the flow proceeds to block 35F, in which controlling computer 3C processes status changes and sends them to supervisory computer 3D. The operations involved in block 35F are described below with reference to FIG. 46. The flow proceeds to loop back from block 35F to re-enter block 35B.

As to the status of the line cards, controlling computer 3C maintains an array of database records, with each database record in the array containing numerous fields of data relating to a respective line card.

The following PASCAL-language type declarations apply to such fields and to variables referenced in the application program for controlling computer 3C:

```
State_Type =      (NO_CARD,           {There is no card present.}
                   CALL,               {Card in normal call state.}
                   TFER_CALL);         {Card in transfer call state.}
Status_Type =     (HUNG_UP,            {Waiting for 2-sec delay off.}
                   IDLE,               {Waiting for connect signal.}
                   DIALING,            {Waiting for operator response.}
                   READY,              {Waiting for incoming call.}
                   C_I_P,              {Call in progress.}
                   NOT_READY,          {Waiting for att. activation.}
                   CIP_HU,             {Attendant hung up on call in progress.}
                   CIP_I,              {Attendant disconnected on call in progress.}
                   WAIT_NOOP,          {Waiting for operator to drop.}
                   TFERRED)            {Call is transferred.}
Req_Type =        (NONE,               {No emergency or help request pending.}
                   EMER,               {Emergency request is pending.}
                   HELP);              {Help request is pending.}
                             TNum_Type = string [14];
Line_RecType = record
   state:            State_Type;       {The state of the card.}
   status:           Status_Type;      {The sub-state of the card.}
   waiting,                            {For one more scan for status.}
   busy,                               {Line is hardware or software busied.}
   calling,                            {Are we calling with this card.}
   sw_busy:          Boolean;          {Are we software-busied on this card.}
   req:              Req_Type;         {Any help/emer requests pending.}
   tnum:             TNum_Type;        {The telephone number.}
   retries,                            {Number retry attempts on this card.}
   present,                            {Card present counting flag.}
   a1,a2,                              {The status A for the line.}
   b1,b2,:           Integer;          {The status B for the line.}
   end;
              Lines_Type = array[1 ... MAX_LINES] of Line_RecType;
Changer_RecType = record
   line_no,                            {Line number of change, 0-no change.}
   new_a,                              {The new status byte A.}
   new_b:            Integer;          {The new status byte B.}
   end;
Var
Scan_Line_Number,                      {The line number we are scanning.}
Cur_Mon_Side,                          {Which side of the line we are
                                        currently monitoring.}
Cur_Mon_Line: Integer;                 {The line we are currently monitoring.}
Dumping: Boolean;                      {Are we dumping the internal
                                        database.}
Local_Access,                          {Number(s) to exit local PBX.}
Local_Area_Code,                       {The local area code.}
Emer_Tele_Num:TNum_Type;               {The emergency transfer number.}
Noof_Retries: Integer;                 {Retry attendant how many times.}
Lines: Lines_Type;                     {The line database.}
Changer_InBuf:                         {The buffer from Scanner to Changer.}
         Changer_RecType;
Changer_Buf: Buf128;                   {The internal buffer for Changer.}
```

With respect to the database records, the foregoing declarations define the fields and the possible values for each field. The possible values for the state field are those listed in parentheses in the declaration of "State_Type"; that is, the possible values are NO_CARD or CALL or TFER_CALL. The possible values for the status field are those listed within parentheses in the declaration of "Status_Type"; that is, HUNG_UP through TFERRED. The possible values for each of the waiting field, the busy field, the calling field, and the sw busy field are Boolean; that is, either true or false. The possible values for the req field (referred to below as the request field) are those listed within parentheses in the declaration of "Req_Type"; that is, NONE or EMER or HELP. The possible values for the tnum field include any string up to fourteen characters long. The possible values for the remaining fields, viz, the retries, present, a1, a2, b1, and b2 fields, include any integer.

Figure 36:
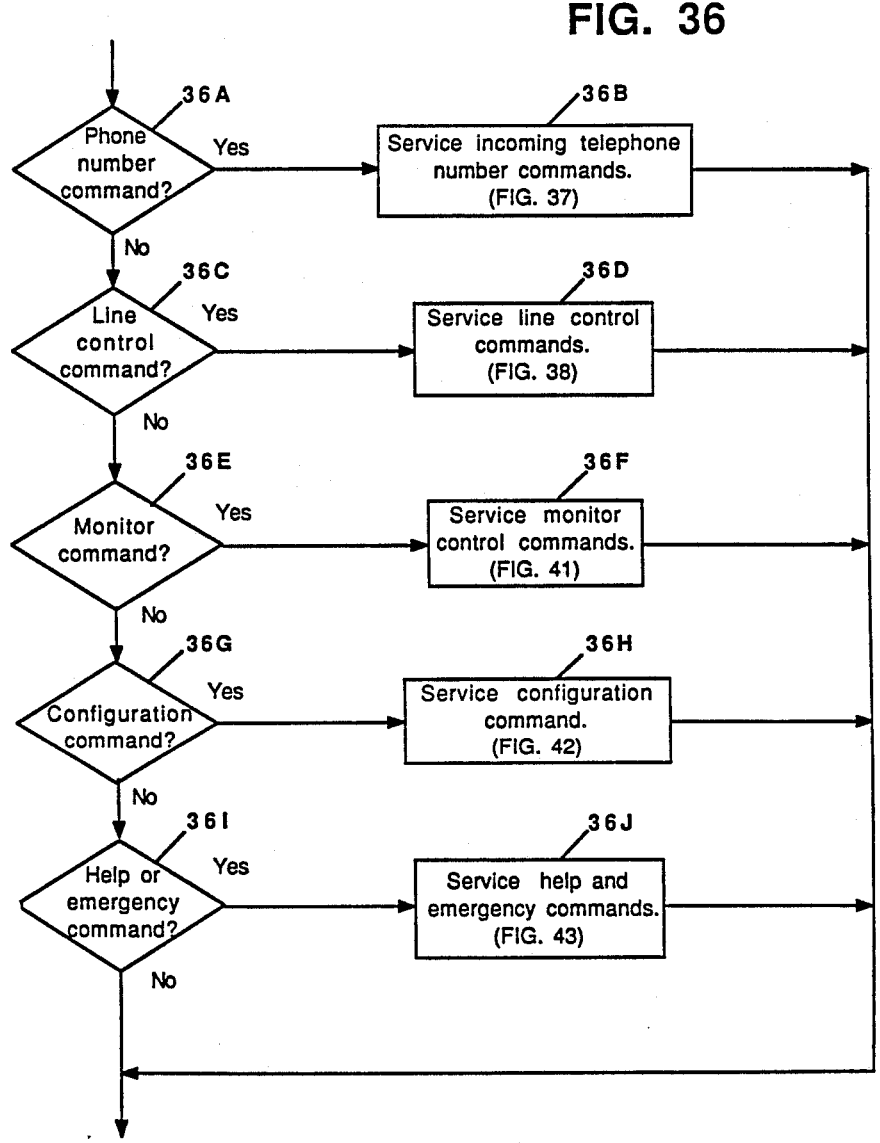
FIG. 36 is a more detailed flow chart of certain operations generally referred to in FIG. 35, in particular operations for processing commands from the supervisory computer.

With reference to FIG. 36, there will now be described the operations for processing supervisory commands received from supervisory computer 3D. These operations begin in block 36A, are entered from block 35C (FIG. 35), and exit to block 35E (FIG. 35). These operations involve a series of tests that correspond to a "case" programming control structure. In the case of a supervisory command to set or retrieve a phone number, the flow proceeds from block 36A to block 36B, in which controlling computer 3C services incoming telephone number commands. The operations involved in doing this are described below with reference to FIG. 37. In the case of a line control command, the flow proceeds from block 36C to block 36D, in which controlling computer 3C services line control commands. The operations involved in doing this are described below with reference to FIG. 38. In the case of a monitor command, the flow proceeds from block 36E to block 36F, in which controlling computer 3C services monitor control commands. The operations involved in doing this are described below with reference to FIG. 41. In the case of a configuration command, the flow proceeds from block 36G to block 36H, in which controlling computer 3C services the configuration command. The operations involved in doing this are described below with reference to FIG. 42. In the case of a help or emergency command, the flow proceeds from block 36I to block 36J, in which controlling computer 3C services the help and emergency commands. The operations involved in doing this are described below with reference to FIG. 43.

Figure 37:
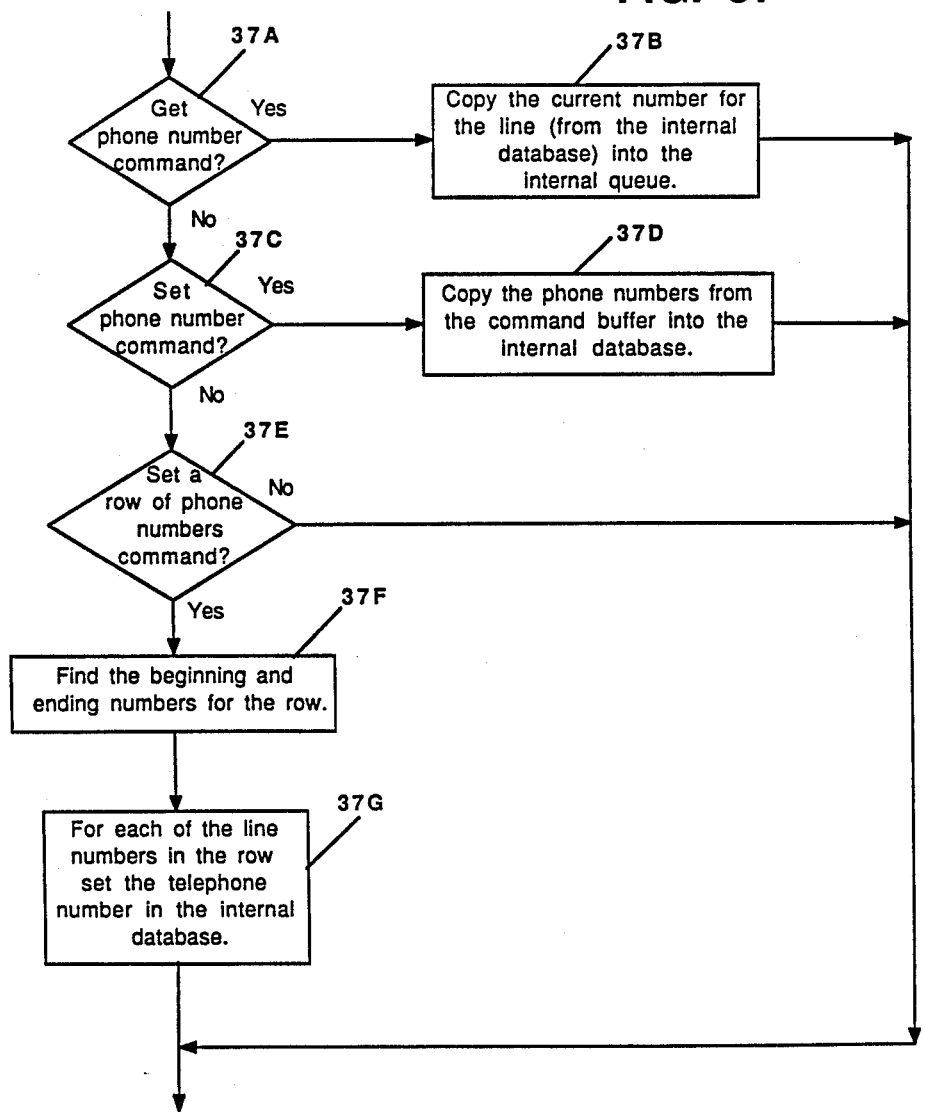
FIG. 37 is a more detailed flow chart of certain operations generally referred to in FIG. 36, in particular operations for servicing incoming telephone number commands.

With reference to FIG. 37, there will now be described the operations involved in servicing incoming commands that affect telephone numbers. These operations begin in block 37A, are entered from block 36A (FIG. 36), and exit to block 35E (FIG. 35). These operations involve a series of tests that correspond to a "case" programming control structure. In the case of a Get phone number command, the flow proceeds from block 37A to block 37B, in which controlling computer 3C copies the current number for the line card (from the database record for the line card) into the internal queue to transmit to supervisory computer 3D. In the case of a Set phone number command, the flow proceeds from block 37C to block 37D, in which controlling computer 3C copies the phone number from the command buffer into the database record for the line card. In the case of a Set a row of phone numbers command, the flow proceeds from block 37E to blocks 37F and 37G. In these blocks, controlling computer 3C finds the beginning and ending numbers for a row of line cards and, for each such line card, sets the telephone number in the database record for the line card.

Figure 38:
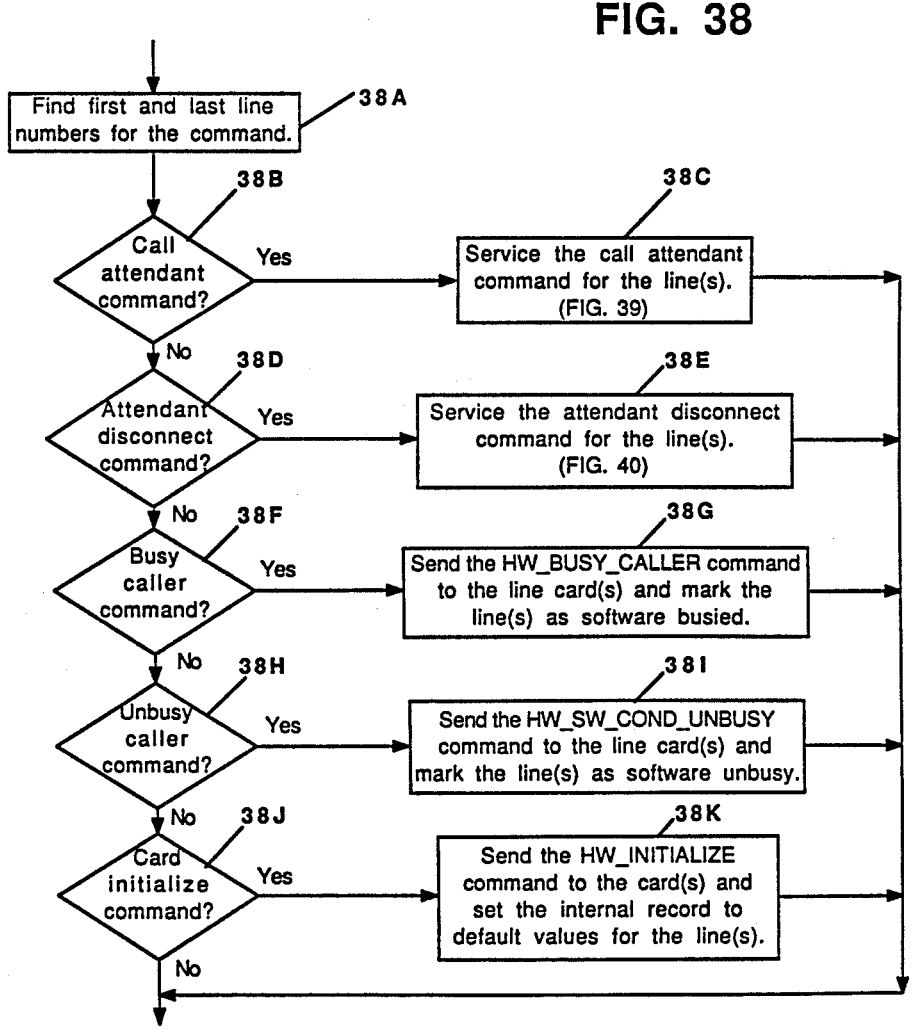
FIG. 38 is a more detailed flow chart of certain operations generally referred to in FIG. 36, in particular operations for servicing line control commands.

With reference to FIG. 38, there will now be described the operations for servicing line control commands. These operations begin in block 38A. The flow enters block 38A from block 36C (FIG. 36) and exits to block 35E (FIG. 35). In block 38A, controlling computer 3C finds the first and last line card numbers for the command. In the case of a Call attendant command, the flow proceeds from block 38B to block 38C, in which controlling computer 3C carries out operations described below with reference to FIG. 39. In the case of an attendant Disconnect command, the flow proceeds from block 38D to block 38E, in which controlling computer 3C carries out operations described below with reference to FIG. 40. In the case of a Busy caller supervisory command, the flow proceeds from block 38F to block 38G, in which controlling computer 3C issues a HW_BUSY_CALLER command (which corresponds to CTL 12 in FIG. 21) to each line card affected by the supervisory command and marks the database record for each such line card as software busy. In the case of an Unbusy caller supervisory command, the flow proceeds from block 38H to block 38I, in which controlling computer 3C issues the HW_SW_COND_BUSY command (which corresponds to CTL 11 in FIG. 21) to each line card affected by the supervisory command and marks the database record for each such affected line card as software unbusy. In the case of a card initialize supervisory command, the flow proceeds from block 38J to block 38K, in which controlling computer 3C issues the HW_INITIALIZE command (which corresponds to CTL 8 in FIG. 21) to each line card affected by the supervisory command, and, for each affected line card, sets the fields of the database record for the line card to default values.

Figure 39:
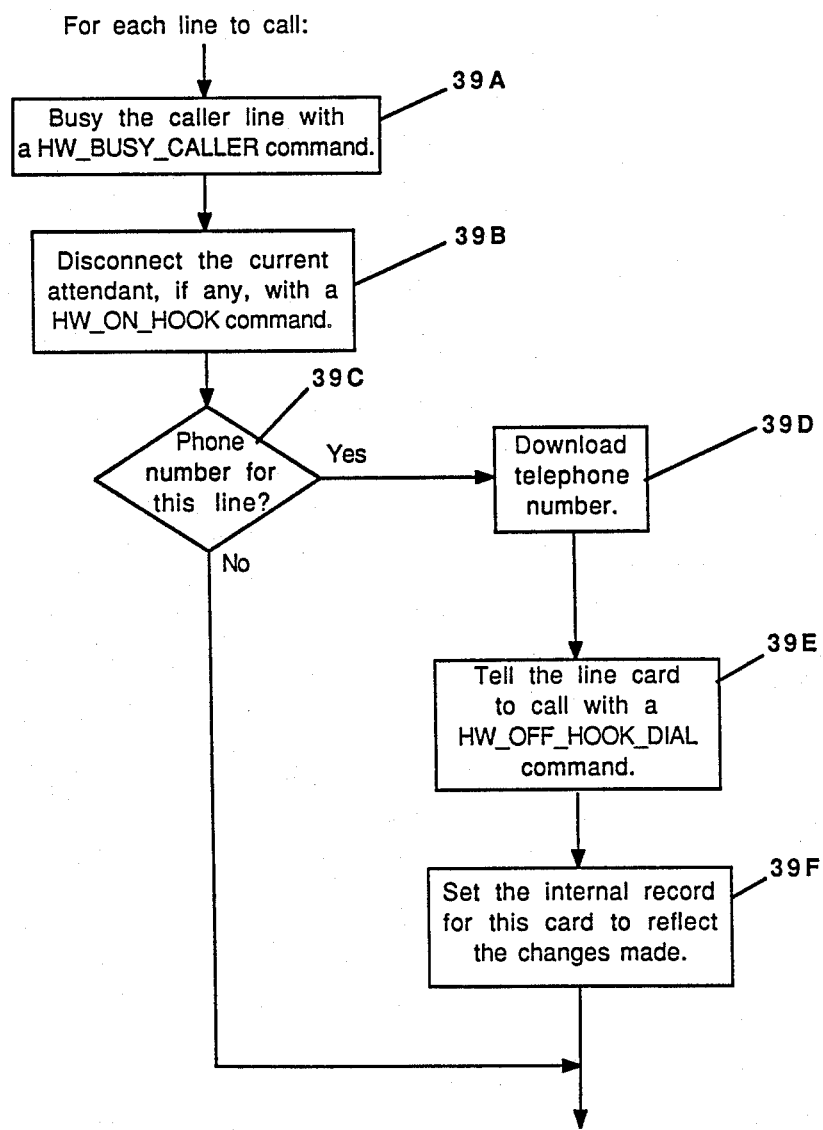
FIG. 39 is a more detailed flow chart of certain operations generally referred to in FIG. 38, in particular operations for servicing a call-attendant command.

With reference to FIG. 39, there will now be described the operations for servicing a supervisory command to use at least one line card to call an attendant. These operations begin in block 39A, are entered from block 38B (FIG. 38), and exit to block 35E (FIG. 35). In block 39A, controlling computer 3C issues a HW_BUSY_CALLER command to busy the caller side of the line. Thereafter, the flow proceeds to block 39B in which controlling computer 3C disconnects the current attendant, if any, with an HW_ON_HOOK command, (which corresponds to CTL 10 in FIG. 21). Next, the flow proceeds to block 39C, in which controlling computer 3C determines whether there is a phone number for this line. If so, controlling computer 3C downloads the telephone number in block 39D, then in block 39E issues an HW_OFF_HOOK_DIAL command (which corresponds to CTL 9 in FIG. 21) to cause the line card to place a call. Next, the flow proceeds to block 39F, in which controlling computer 3C sets the calling field of the database record for the line card to true.

Figure 40:
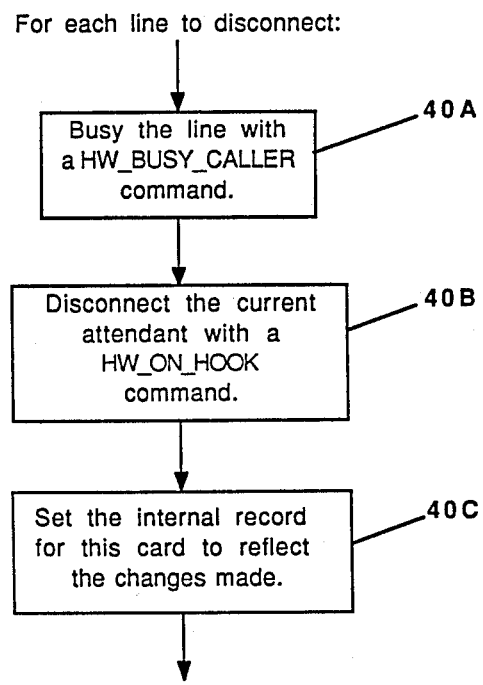
FIG. 40 is a more detailed flow chart of certain operations generally referred to in FIG. 38, in particular operations for servicing a disconnect-attendant command.

With reference to FIG. 40, there will now be described the operations for servicing a supervisory command to use at least one line card to disconnect an attendant. These operations begin in block 40A, are entered from block 38D (FIG. 38) and exit to block 35E (FIG. 35). In block 40A, controlling computer 3C issues a HW_BUSY_CALLER command to busy the incoming line. Next, in block 40B controlling computer 3C issues a HW_ON_HOOK command to disconnect the current attendant from the outgoing line for the card. Next, in block 40C controlling computer 3C sets the calling field of the database record for the line card to false.

Figure 41:
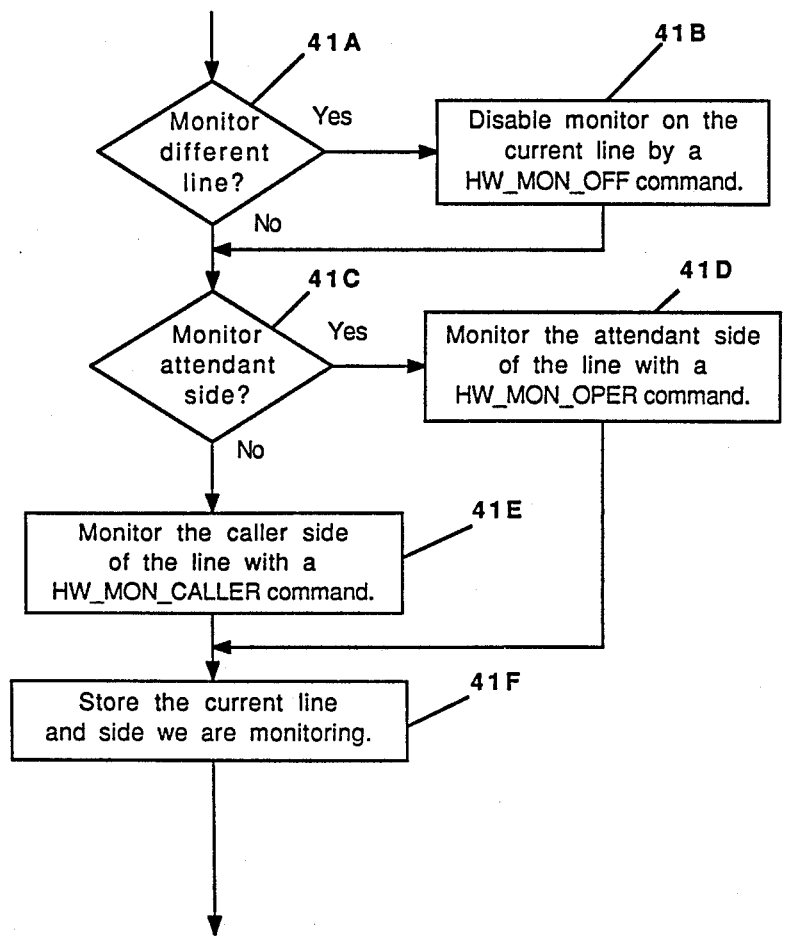
FIG. 41 is a more detailed flow chart of certain operations generally referred to in FIG. 36, in particular operations for servicing monitor control commands.

With reference to FIG. 41, there will now be described the operations for servicing supervisory commands to control monitor audio. These operations begin in block 1A, are entered from block 36E (FIG. 36) and exit to block 35E (FIG. 35). In block 41A, controlling computer 3C determines whether the supervisory command requires monitoring a different line card. If so, the flow proceeds to block 41B, in which controlling computer 3C issues a HW_MON_OFF command (which corresponds to CTL 29 in FIG. 21) to disable the monitor on the current line card, and then proceeds to block 41C. In block 41C, controlling computer 3C determines whether to monitor the attendant side of the line card. If the attendant side of the line card is to be monitored, the flow proceeds to block 41D, in which controlling computer 3C issues a HW_MON_OPER command (which corresponds to CTL 20 and CTL 28 in FIG. 21) to cause the line card to connect the monitor audio to the attendant side of the line card. Otherwise, the flow proceeds to block 41E, in which controlling computer 3C issues a HW_MON_CALLER command (which corresponds to CTL 21 and CTL 28 in FIG. 21) to monitor the caller side of the line card. Next, the flow proceeds to block 41F, in which controlling computer 3C updates variables to reflect which line card is the current line card for monitoring and which side of the line card is being monitored.

Figure 42A:
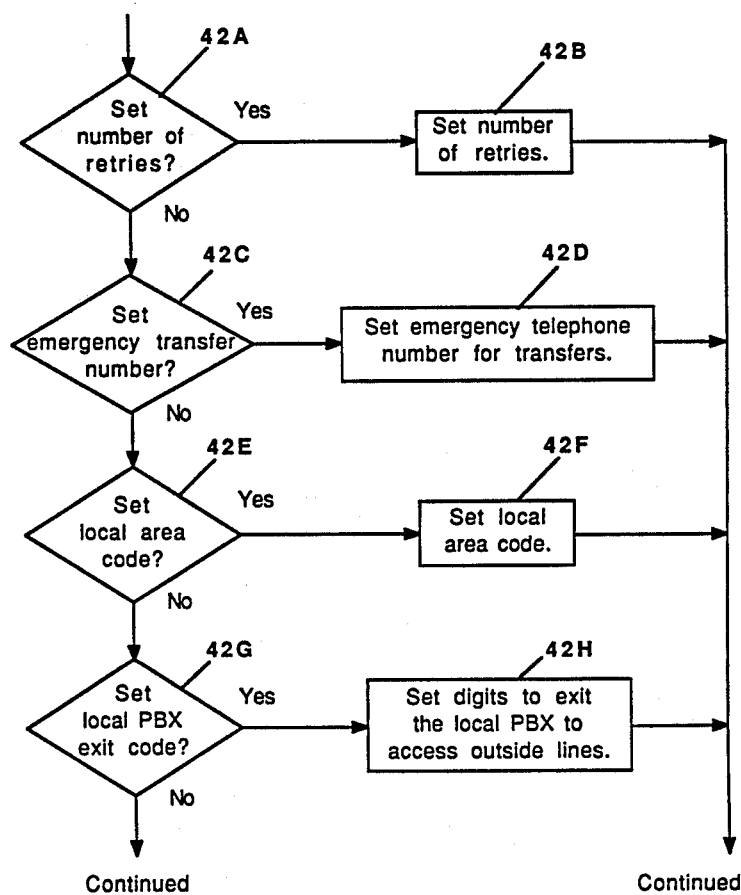
FIG. 42 comprises FIGS. 42A and 42B, and is a more detailed flow chart of certain operations generally referred to in FIG. 36, in particular operations for servicing a configuration command.
Figure 42B:
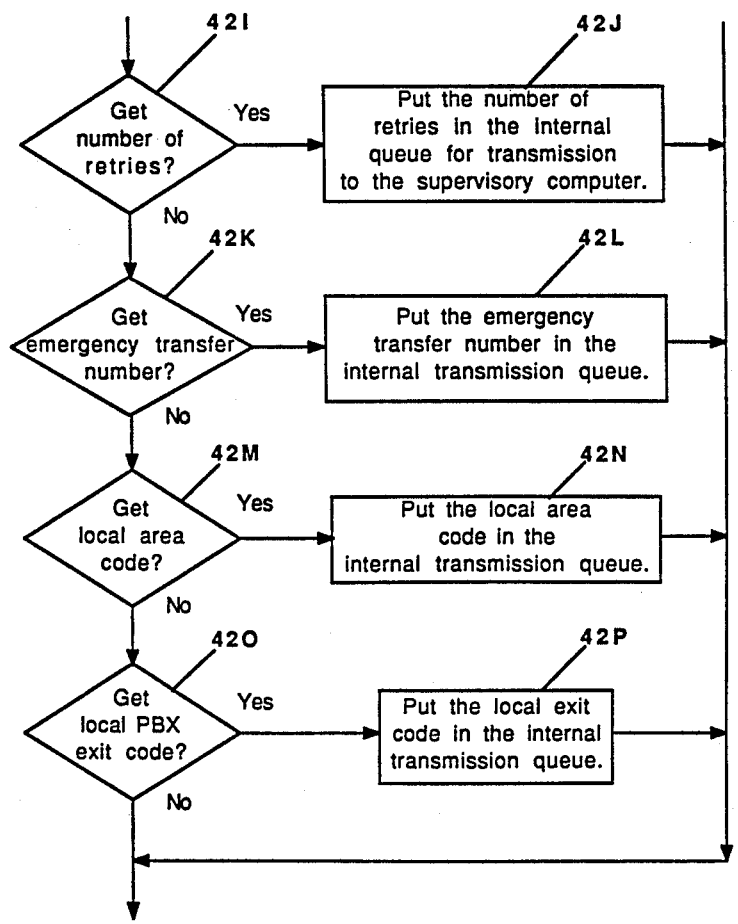

With reference to FIGS. 42A and 42B, there will now be described the operations for servicing configuration commands. These operations begin in block 42A, are entered from block 36G (FIG. 36), and exit to block 35E (FIG. 35). In the case of a supervisory command to set the number of retries, the flow proceeds from block 42A to block 42B, in which controlling computer 3C sets the number of retries. In the case of a Set emergency transfer number, the flow proceeds from block 42C to block 42D, in which controlling computer 3C sets the emergency number for the transfers. In the case of a command to Set local area code, the flow proceeds from block 42E to block 42F, in which controlling computer 3C sets the local area code. In the case of a Set local PBX exit code, the flow proceeds from block 42G to block 42H, in which controlling computer 3C sets digits to exit the local PBX to access outside lines.

With reference to FIG. 42B, in the case of a command to Get number of retries, the flow proceeds from block 42I to block 42J, in which controlling computer 3C puts the number of retries in the internal queue for transmission to supervisory computer 3D. In the case of a Get emergency telephone number supervisory command, the flow proceeds from block 42K to block 42L, in which controlling computer 3C puts the emergency transfer number in the internal transmission queue. In the case of a Get local area code command, the flow proceeds from block 42M to block 42N, in which controlling computer 3C puts the local area code in the internal transmission queue. In the case of a Get local PBX exit code, the flow proceeds from block 42O to block 42P, in which controlling computer 3C puts the local exit code in the internal transmission queue.

Figure 43:
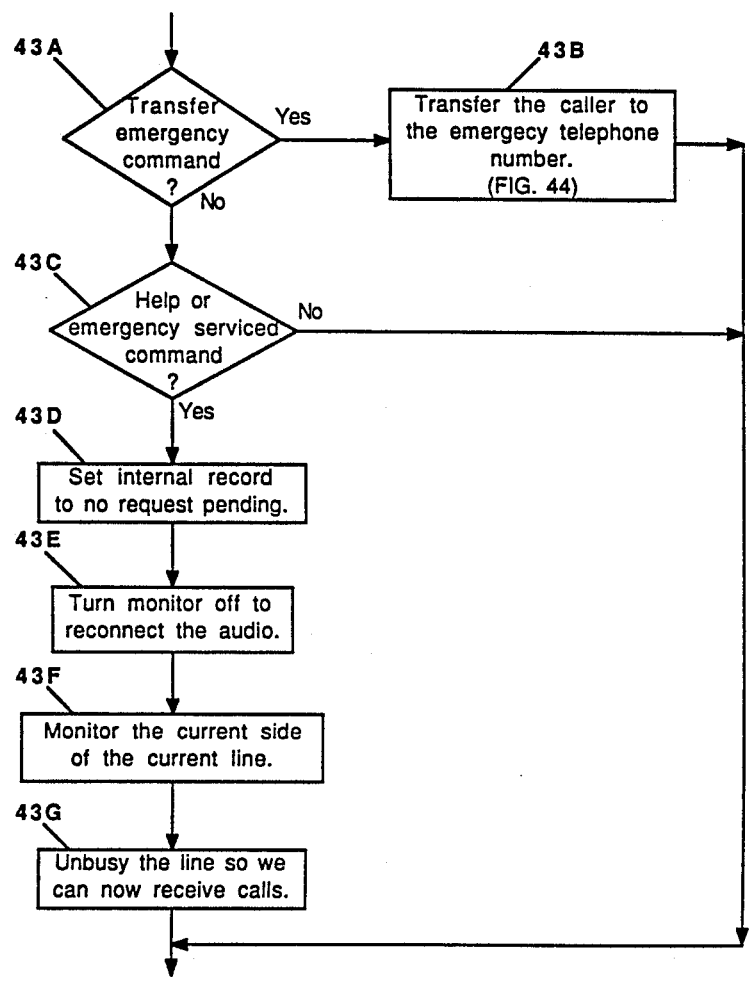
FIG. 43 is a more detailed flow chart of certain operations generally referred to in FIG. 36, in particular operations for servicing help and emergency commands.

With reference to FIG. 43, there will now be described operations involved in servicing help and emergency commands. These operations begin in block 43A, are entered from block 36I (FIG. 36) and exit to block 35E (FIG. 35). In the case of a Transfer emergency supervisory command, the flow proceeds from block 43A to block 43B, in which controlling computer 3C transfers a caller to the emergency to FIG. 44. In the case of a Help or emergency serviced supervisory command, the flow proceeds from block 43C to blocks 43D through 43G. In these blocks, controlling computer 3C sets the request field of the database record for the line card to no request pending; turns monitor off to reconnect the audio; monitors the current side of the current line card; and unbusies the line card so that calls can now be received.

Figure 44:
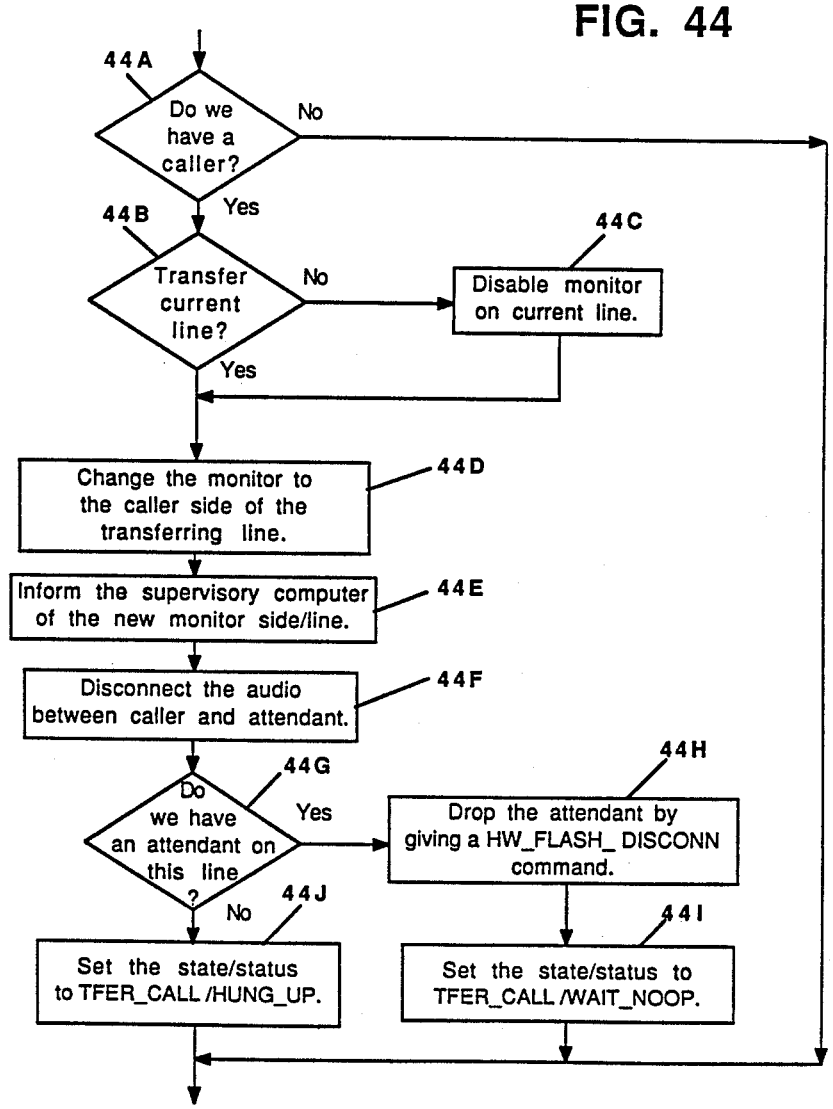
FIG. 44 is a more detailed flow chart of certain operations generally referred to in FIG. 43, in particular operations for transferring an incoming caller.

With reference to FIG. 44, there will now be described the operations involved in transferring the caller to the emergency telephone number. These operations begin in block 44A, are entered from block 43A (FIG. 43), and exit to block 35E (FIG. 35). In block 44A, controlling computer 3C determines whether there is a caller. (The caller may have hung up after a request was made to transfer the caller.) Controlling computer 3C makes this determination on the basis of status data returned from the line card. If the caller is still on line, the flow proceeds to block 44B, in which controlling computer 3C determines whether the current line card is being transferred. If it is not, the flow proceeds to block 44C and then to block 44D. Otherwise, the flow proceeds directly to block 44D. In block 44C, controlling computer 3C disables the monitor on the current line card. In block 44D, controlling computer 3C changes the monitor to the caller side of the transferring line card. Next, the flow proceeds to block 44E, in which controlling computer 3C sends information to supervisory computer 3D to report on the new side and line for the selected monitor audio. Next, the flow proceeds to block 44F, in which controlling computer 3C disconnects the audio between a caller and the attendant. Next, the flow proceeds to block 44G, in which controlling computer 3C determines whether an attendant is present on this line. (The attendant may have hung up.) Controlling computer 3C makes this determination on the basis of status data returned from the line card. If the attendant is still on line, the flow proceeds to block 44H, in which controlling computer 3C issues a HW_FLASH_DISCONN command (which corresponds to CTL 13 in FIG. 21) to disconnect the attendant. Next, the flow proceeds to block 44I, in which controlling computer 3C updates the state/status fields for the database record for the line card, to TFER_CALL/WAIT_NOOP. If the attendant has hung up, the flow proceeds from block 44G to block 44J, in which controlling computer 3C updates the state/status fields for the database record for the line card, to TFER_CALL/HUNG_UP.

Figure 45:
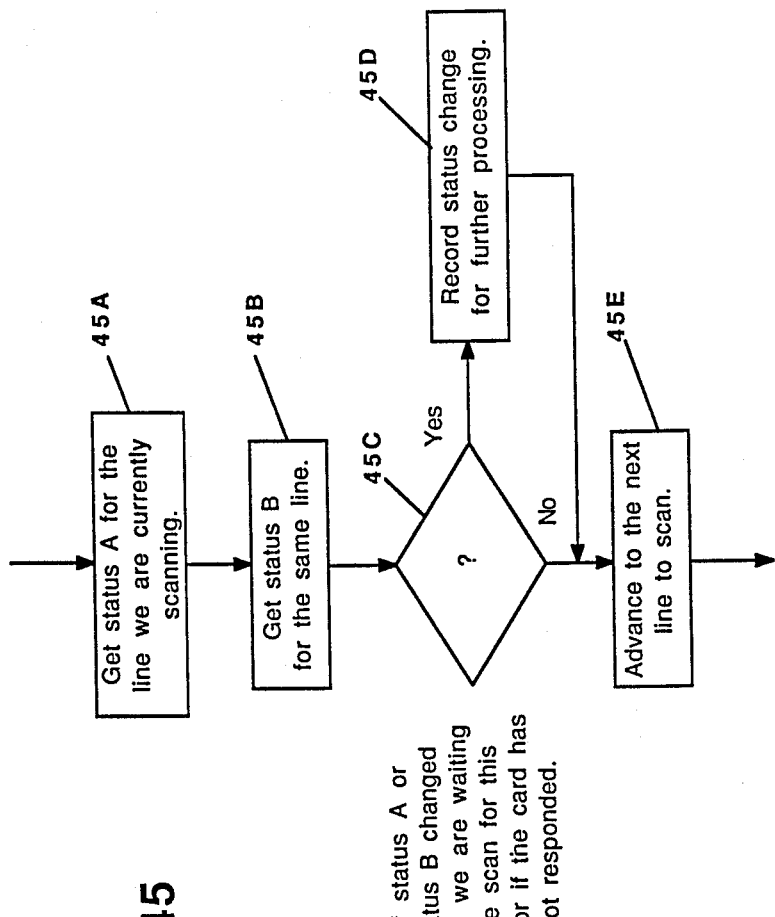
FIG. 45 is a more detailed flow chart of certain operations generally referred to in FIG. 35, in particular operations for scanning for line card status changes.

With reference to FIG. 45, there will now be described the operations for scanning line cards for status changes. These operations begin in block 45A, and, as shown in FIG. 35, are entered from either block 35C or block 35D, and exit to block 35F. In block 45A, controlling computer 3C issues a command to force the CTL 22 signal true to get status A data for the line card currently being scanned. Next, in block 45B, controlling computer 3C issues a command to force the CTL 4 signal true to get status B data for the same line card. Next, in block 45C, controlling computer 3C determines whether status A or status B data have changed or if it is waiting to get status data from the line card. As soon as the status A and status B data have been retrieved from the line card and it is found that a change has occurred, controlling computer 3C in block 45D records the status change for further processing. Following block 45D or if no change occurred to status A or status B data, the flow proceeds to block 45E, in which controlling computer advances to the next line card to scan.

Figure 46:
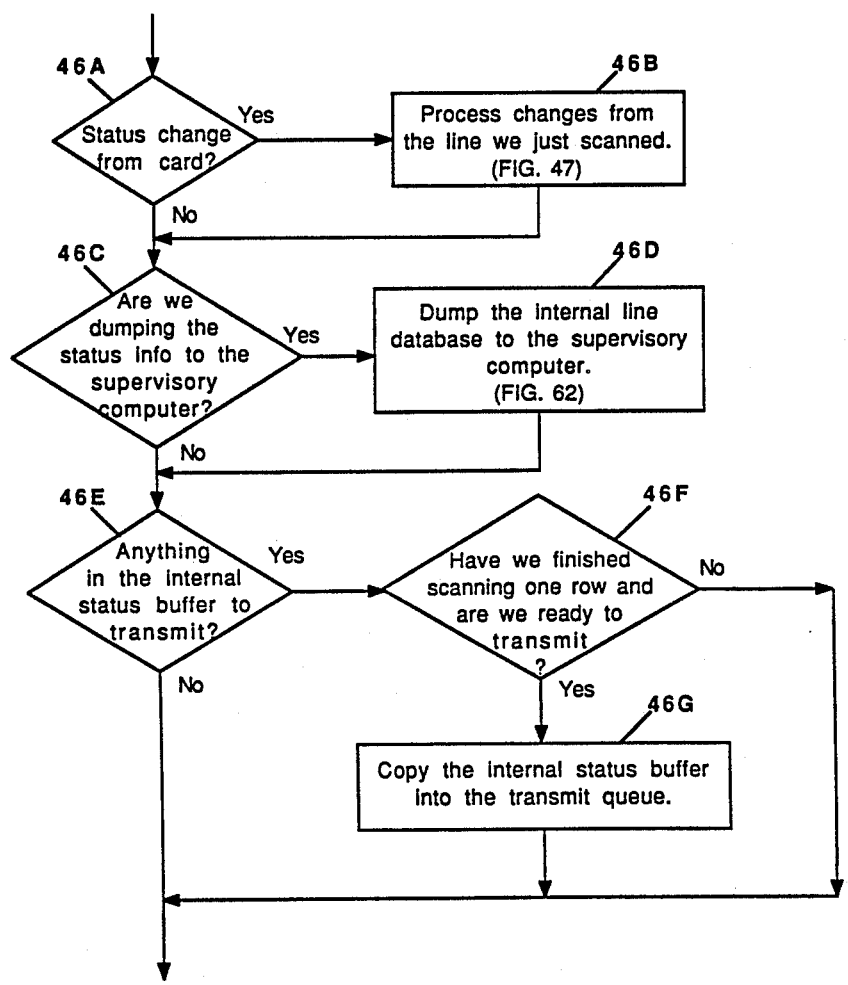
FIG. 46 is a more detailed flow chart of certain operations generally referred to in FIG. 35, in particular operations for the processing of status changes.

With reference to FIG. 46, there will now be described the operations for processing status changes in sending them to the supervisory computer. These operations begin in block 46A, and, as shown in FIG. 35, are entered from block 35E, and exit normally to block 35B. In the case a status change has occurred in data received from the line card, the flow proceeds from block 46A to block 46B, in which controlling computer 3C carries out operations described below with reference to FIG. 47. In the case that dumping of status information to the supervisory computer is occurring, the flow proceeds from block 46C to block 46D, in which operations are carried out to dump the internal line database to supervisory computer 3D in accord with operations described below with reference to FIG. 62. In the case that anything in the internal status buffer is ready to be transmitted, the flow proceeds from block 46E to block 46F, in which controlling computer 3C determines whether one row of line cards has been completely scanned and if the time has come to transmit information to supervisory computer 3D. If so, the flow proceeds to block 46G, in which controlling computer 3C copies the internal status buffer into the transmit queue.

Figure 47A:
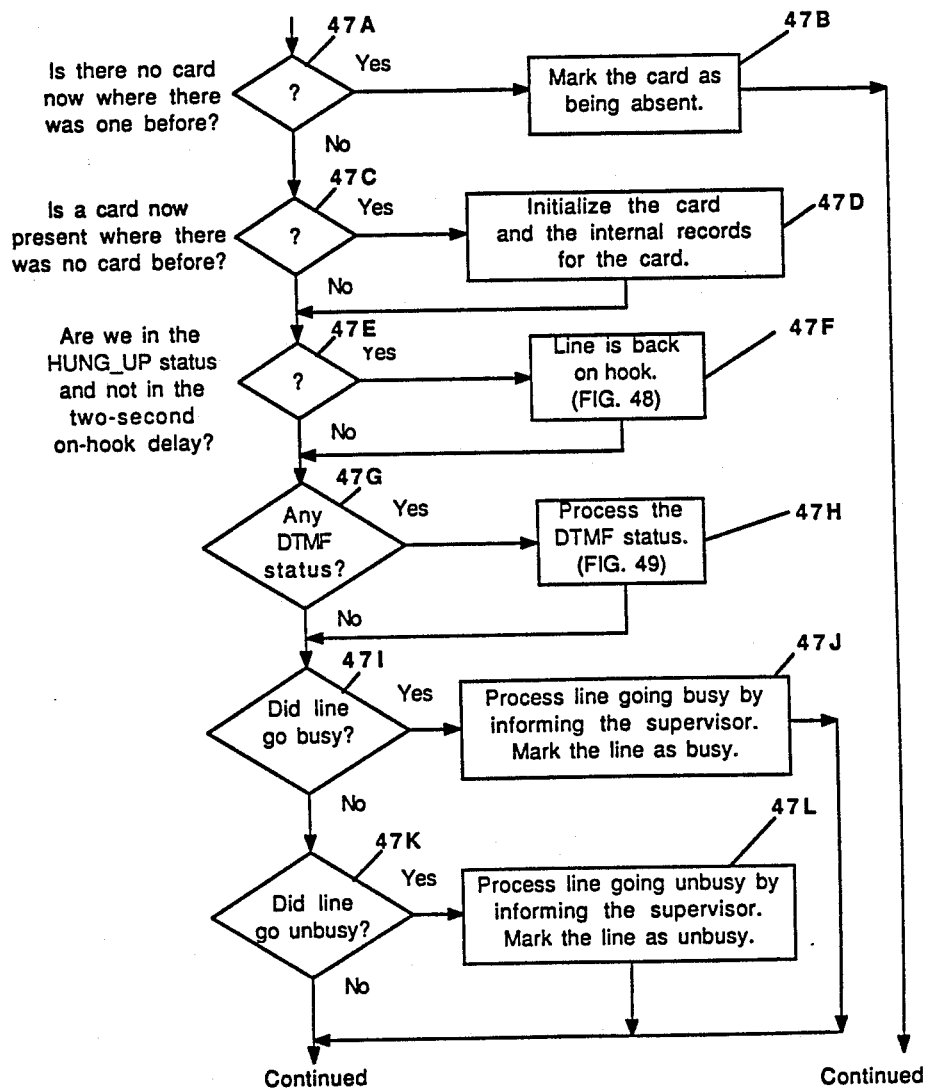
FIG. 47 comprises FIGS. 47A and 47B, and is a more detailed flow chart of certain operations generally referred to in FIG. 46, in particular operations for processing of status changes.
Figure 47B:
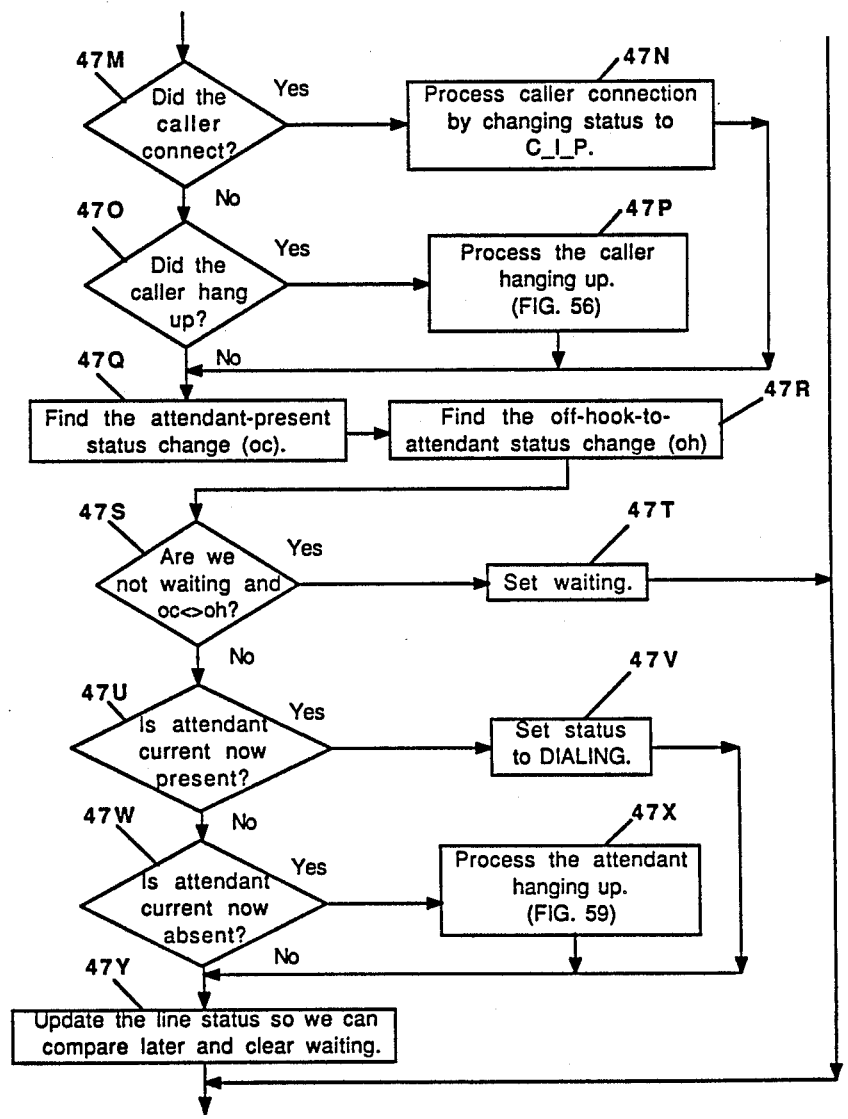

With reference to FIGS. 47A and 47B, there will now be described the operations for processing changes from a scanned line card. These operations begin in block 47A, and, as shown in FIG. 46, are entered from block 46A and exit to block 46C. In the case that no line card is present in a slot, but the internal database kept by controlling computer 3C reflects there having been a card present in such slot before, the flow proceeds from block 47A to block 47B, in which controlling computer 3C updates the database record for the line card by marking the state field as NO_CARD, because the card is now absent. In the case that a line card now is present in the slot where one was not present before, the flow proceeds from block 47C to block 47D, in which controlling computer 3C initializes the card and updates the database record for the line card. In the case that the line card is in a HUNG_UP status and not in a two second on-hook delay, the flow proceeds from block 47E to block 47F, in which controlling computer 3C performs operations necessitated by the outgoing line being back on hook, which are described below with reference to FIG. 48. In the case that any DTMF status information has been returned, the flow proceeds from block 47G to block 47H, in which controlling computer 3C processes the DTMF status in accord with operations described below with reference to FIG. 49. In the case that the status indicates that the line has gone busy, the flow proceeds from block 47I to block 47J, in which controlling computer 3C processes the line going busy by reporting this information to the supervisory computer and assigns a true value to the busy field of the database record for the line card. In the case that the status data received indicate that the line has gone unbusy, the flow proceeds from block 47K to block 47L, in which controlling computer 3C processes the line card going unbusy by sending the appropriate information to supervisory computer 3D and assigns a false value to the busy field for the database record for this line card.

With reference to FIG. 47B, in the case that the status data indicate that the caller has connected, the flow proceeds from block 47M to block 47N, in which controlling computer 3C processes the caller connection by changing the status field of the database record for the line card to C_I_P (i.e., call in progress). In the case that the status data returned indicate that the caller has hung up, the flow proceeds from block 47O to block 47P, in which controlling computer 3C processes this by carrying out operations described below with reference to FIG. 56. Next, in block 47Q, controlling computer 3C finds the attendant-present status change by monitoring to detect a change in the status return of operator current (oc) which is indicated by a change in binary value of the STA 1 signal (FIG. 22). Next, in block 47R, controlling computer 3C finds a change in status in the Off-Hook-to-attendant status (oh) by monitoring for a change in the binary value of the CTL 55 signal (FIG. 22). Next, in block 47S, controlling computer 3C determines whether the waiting field of the database record for the line card is true and if the operator current is not equal to the On-Hook status; and, if so, controlling computer 3C in block 47C assigns the true value to the waiting field. If not, the flow proceeds to block 47U, in which controlling computer 3C determines whether attendant current is now present. It makes this determination on the basis of the STA 1 signal (FIG. 22) that is returned as part of a status word from the line card. If attendant current is now present, the flow proceeds to block 47V; otherwise, it proceeds to block 47W. In block 47V, controlling computer 3C sets the status field of the database record for the line card to DIALING. In block 47W, controlling computer 3C determines whether attendant current is now absent. If it is, the flow proceeds to block 47X; otherwise, it proceeds to block 47Y. In block 47X, controlling computer 3C performs operations occasioned by the attendant's having hung up, as described below with reference to FIG. 59. In block 47Y, controlling computer 3C updates the status field of the database record for the line card for use in later comparison operations, and assigns a false value to the waiting field.

Figure 48:
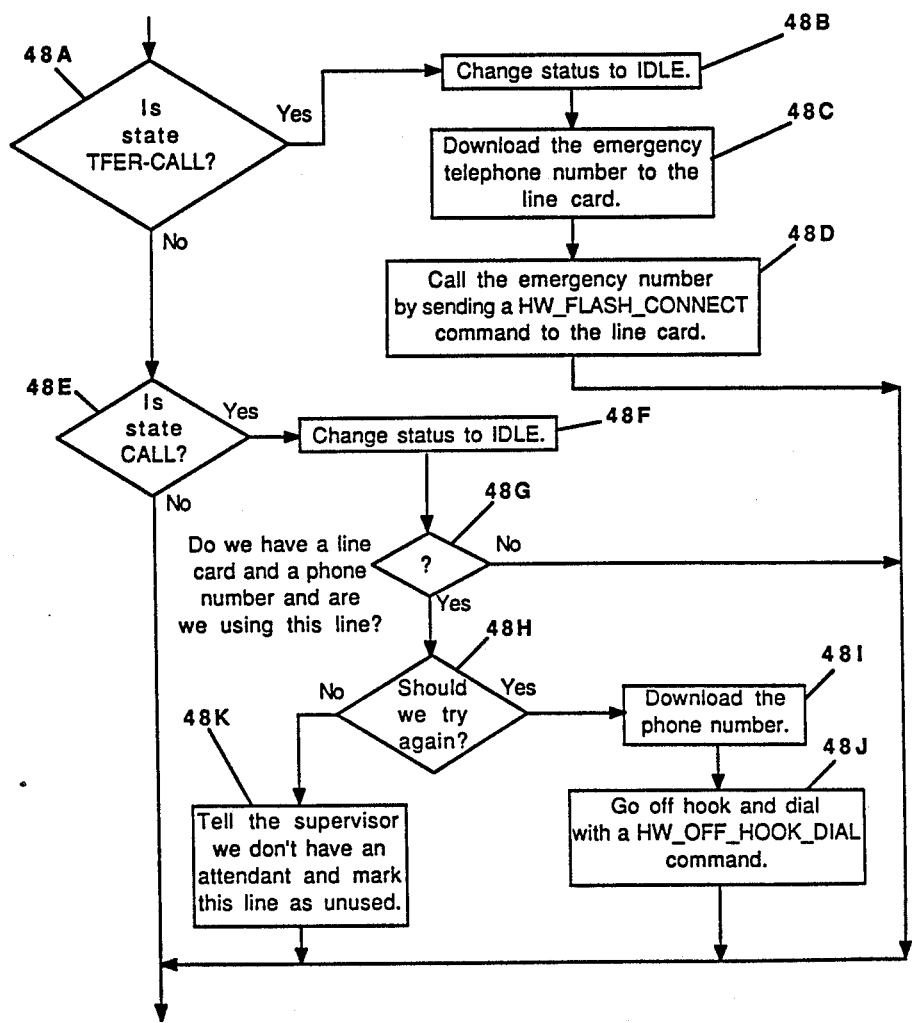
FIG. 48 is a more detailed flow chart of certain operations generally referred to in FIG. 47A, in particular operations carried out upon determining that the outgoing line is back on hook.

With reference to FIG. 48, there will now be described the operations carried out in block 47F (FIG. 47) upon the outgoing line having gone on hook. In the case that the state field of the database record for the line card is TFER_CALL, the flow proceeds from block 48A to blocks 48B, 48C, and 48D. In block 48B, controlling computer 3C changes the status field for the database record for the line card to IDLE. In block 48C, controlling computer 3C downloads the emergency telephone number to the line card. In block 48D, controlling computer 3C issues a HW_FLASH_CONNECT command (which corresponds to CTL 14 in FIG. 21) to cause the line card to place a call to the emergency telephone number. In the case that the state field of the database record for the line card is CALL, the flow proceeds from block 48E to block 48F, in which controlling computer 3C changes the status field of the database record of the line card to IDLE. Next, in block 48G, controlling computer 3C determines whether the line card is present, whether there is a phone number for this line card to dial, and whether this line card is in use (as indicated by the Boolean value of the calling field of the database record for the line card). If so, the flow proceeds to block 48H, in which controlling computer 3C compares the number of retries that have been made against the global parameter applicable to the number of retries to make. Upon determining to make another retry, controlling computer 3C in block 48I downloads the telephone number, and in block 48J issues a HW_OFF_HOOK_DIAL command to cause the line card to place the call. If controlling computer 3C finds in block 48H that the maximum number of retries have already been made, the flow proceeds to block 48K, in which controlling computer 3C sends information to supervisory computer 3D as to the lack of an attendant, and assigns a false value to the calling field of the database record for the line card, so as to indicate it is unused.

Figure 49:
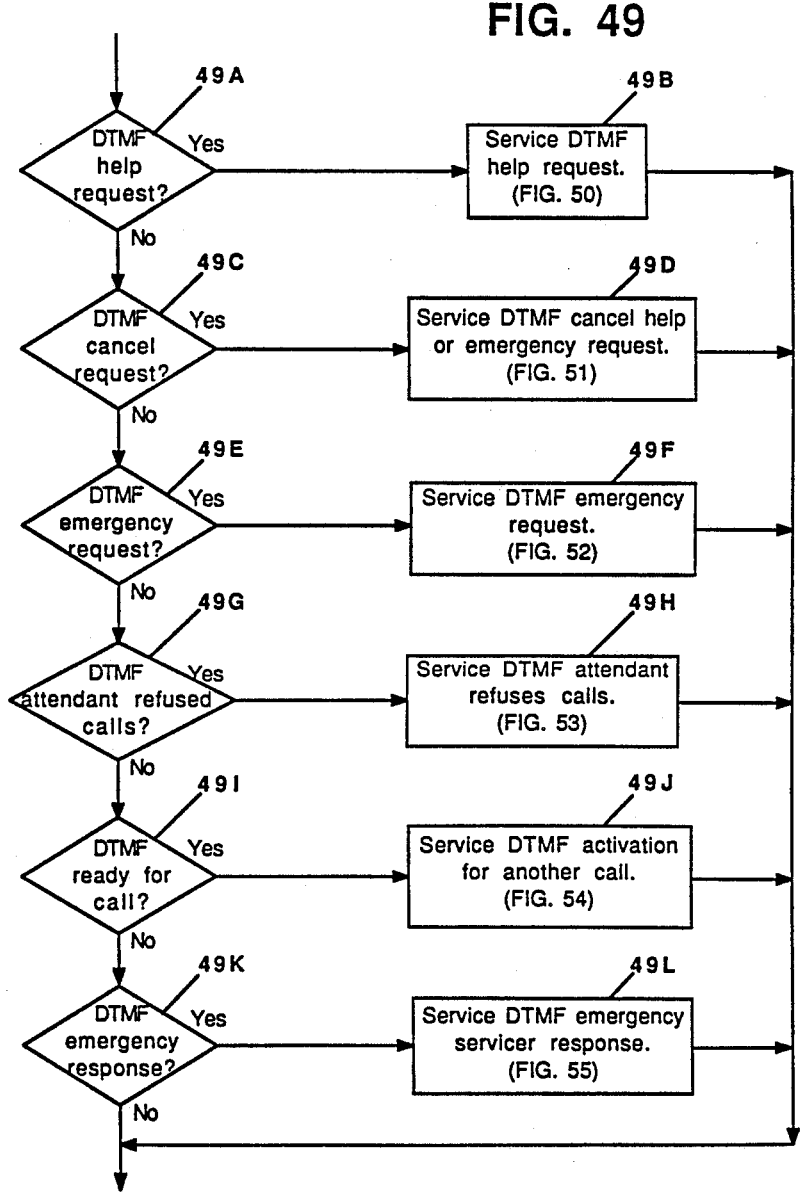
FIG. 49 is a more detailed flow chart of certain operations generally referred to in FIG. 47A, in particular operations for processing of DTMF status changes.

With reference to FIG. 49, there will now be described the operations carried out in block 47H (FIG. 47), to process DTMF status. In the case of a DTMF HELP request, the flow proceeds from block 49A to block 49B, in which controlling computer 3C services the DTMF HELP request in accord with operations described below with reference to FIG. 50. In the case of a DTMF CANCEL request, the flow proceeds from block 49C to block 49D, in which controlling computer 3C services the DTMF CANCEL request to cancel either help or emergency in accord with operations described below with reference to FIG. 51. In the case of a DTMF EMERGENCY request, the flow proceeds from block 49E to block 49F, in which controlling computer 3C services the DTMF EMERGENCY request in accord with operations described below with reference to FIG. 52. In the case of a DTMF STATUS indicating that an attendant has refused calls, the flow proceeds from block 49G to block 49H, in which controlling computer 3C performs operations described below with reference to FIG. 53. In the case of a DTMF status indicating that an attendant is ready for a call, the flow proceeds from block 49I to block 49J, in which controlling computer 3C services the DTMF activation for another call in accord with operations described below with reference to FIG. 54. In the case of a DTMF status indicating an emergency response, the flow proceeds from block 49K to block 49L, in which controlling computer 3C services the DTMF emergency servicer response in accord with operations described below with reference to FIG. 55.

Figure 50:
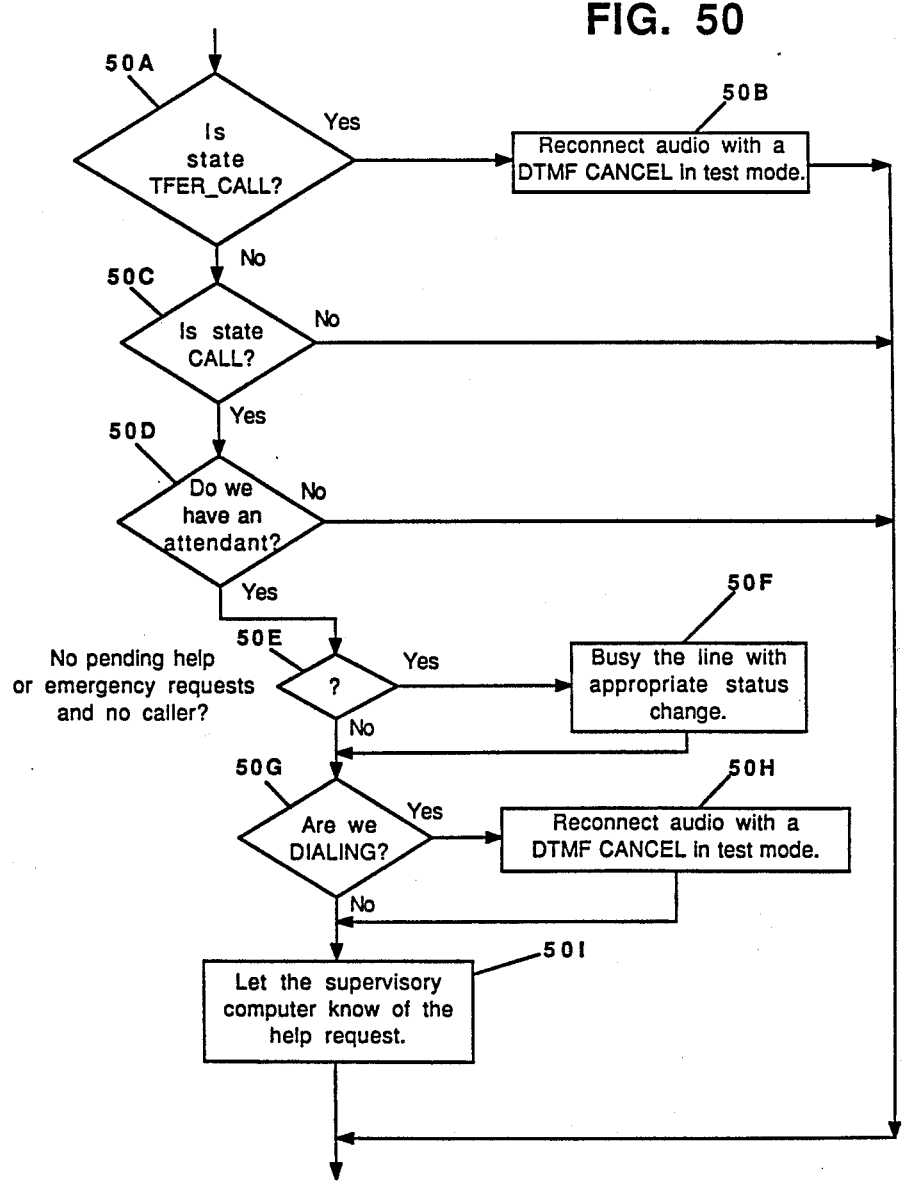
FIG. 50 is a more detailed flow chart of certain operations generally referred to in FIG. 49, in particular operations to service a DTMF help request.

With reference to FIG. 50, there will now be described the operations carried out in block 49B (FIG. 49). In the case that the state field of the database record for the line card is TFER_CALL, the flow proceeds from block 50A to block 50B, in which controlling computer 3C issues a DTMF CANCEL in test mode, to reconnect the audio. In the case that the state field for the database record for the line card is CALL, the flow proceeds from block 50C to block 50D, in which controlling computer 3C determines whether an attendant is on-line. If so, the flow proceeds from block 50E, in which controlling computer 3C determines whether any help or emergency request is pending, and whether there is no caller. If so, the flow proceeds from block 50E to block 50F, and then to block 50G; otherwise, the flow proceeds directly to block 50G. In block 50F, controlling computer 3C issues the command to software busy the incoming line to the line card and assigns a true value to the sw_busy field of the database record for the line card. In block 50G, controlling computer 3C determines whether the status field for the database record for the line card is DIALING. If it is, the flow proceeds from block 50G to block 50H, and then to block 50I; otherwise, the flow proceeds directly to block 50I. In block 50H, controlling computer 3C issues a DTMF CANCEL command in test mode so as to reconnect the audio. In block 50I, controlling computer 3C reports data to supervisory computer 3D to alert it of the pending help request.

Figure 51:
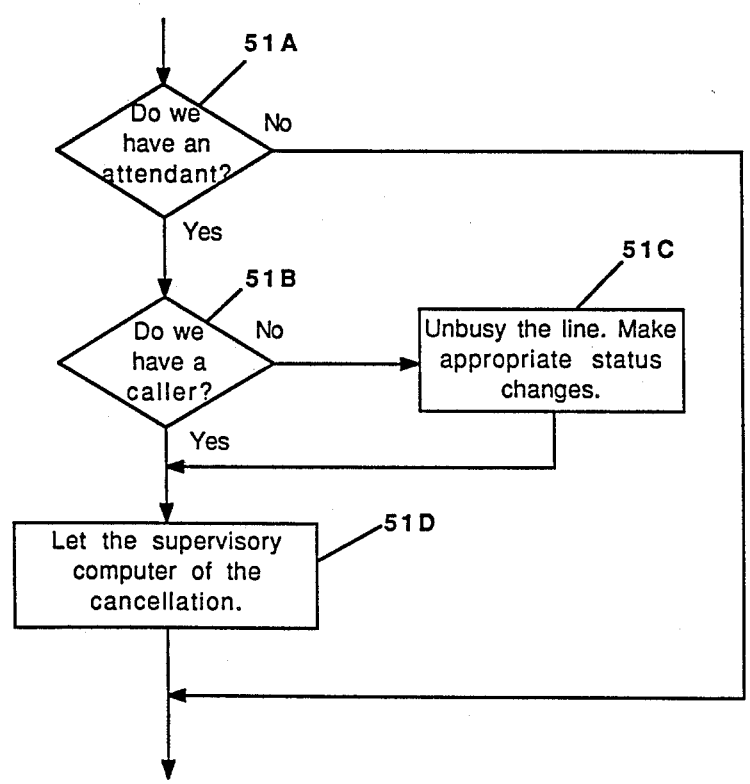
FIG. 51, is a more detailed flow chart of certain operations generally referred to in FIG. 49, in particular operations to service a DTMF cancel request.

With reference to FIG. 51, there will now be described the operations carried out in block 49D (FIG. 49). In block 51A, controlling computer 3C determines whether an attendant is on-line. If so, the flow proceeds to lock 51B, in which controlling computer 3C determines whether a caller is on-line. If not, the flow proceeds from block 51B to block 51C, and then to block 51D; otherwise, the flow proceeds directly to block 51D. In block 51C, controlling computer 3 issues the command to software unbusy the incoming line for the line card and assigns a false value to the sw_busy field of the database record for the line card. In block 51D, controlling computer 3C sends data to supervisory computer 3D as to the cancellation.

Figure 52:
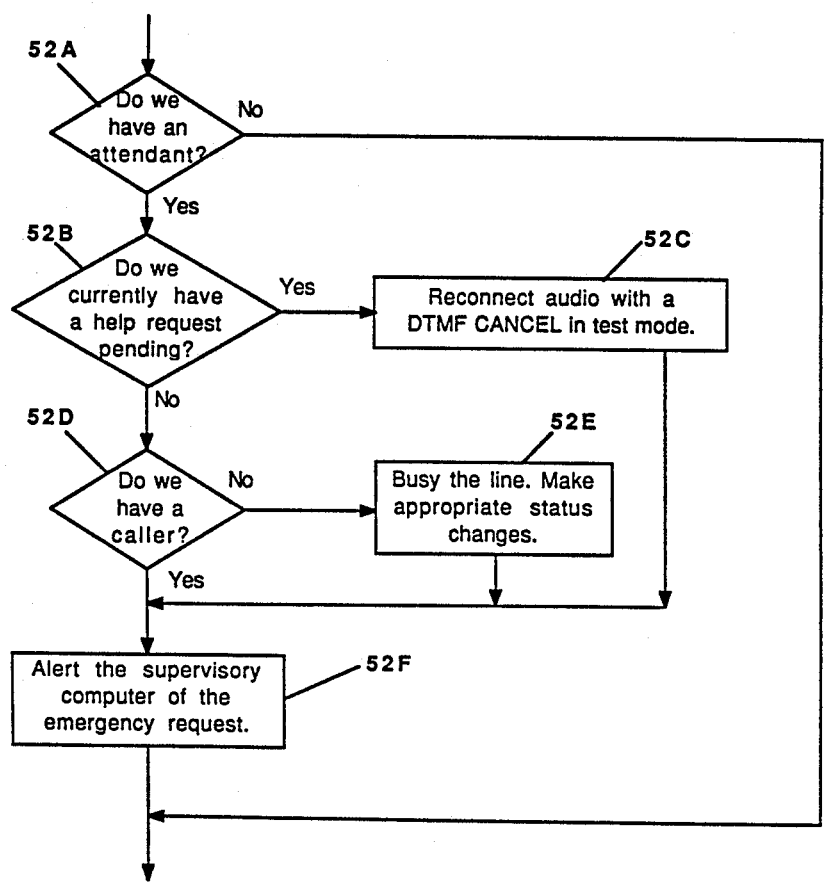
FIG. 52 is a more detailed flow chart of certain operations generally referred to in FIG. 49, in particular operations to service a DTMF emergency request.

With reference to FIG. 52, there will now be described the operations carried out in block 49F (FIG. 49). In block 52A, controlling computer 3C determines whether an attendant is on-line. If so, the flow proceeds to block 52B, in which controlling computer 3C determines whether there is a help request currently pending. If so, the flow proceeds to block 52C, in which controlling computer 3C issues a DTMF CANCEL command in test mode so as to reconnect the audio. Otherwise, the flow proceeds to block 52D, in which controlling computer 3C determines whether a caller is on-line. If not, the flow proceeds to block 52E, in which controlling computer 3C issues the command to software busy the incoming line for the line card and assigns a true value to the sw_busy field of the database record for the line card. After block 52C, 52E, and 52D (if a caller is on-line), the flow proceeds to block 52F, in which controlling computer 3C sends information to supervisory computer 3D as to the emergency request.

Figure 53:
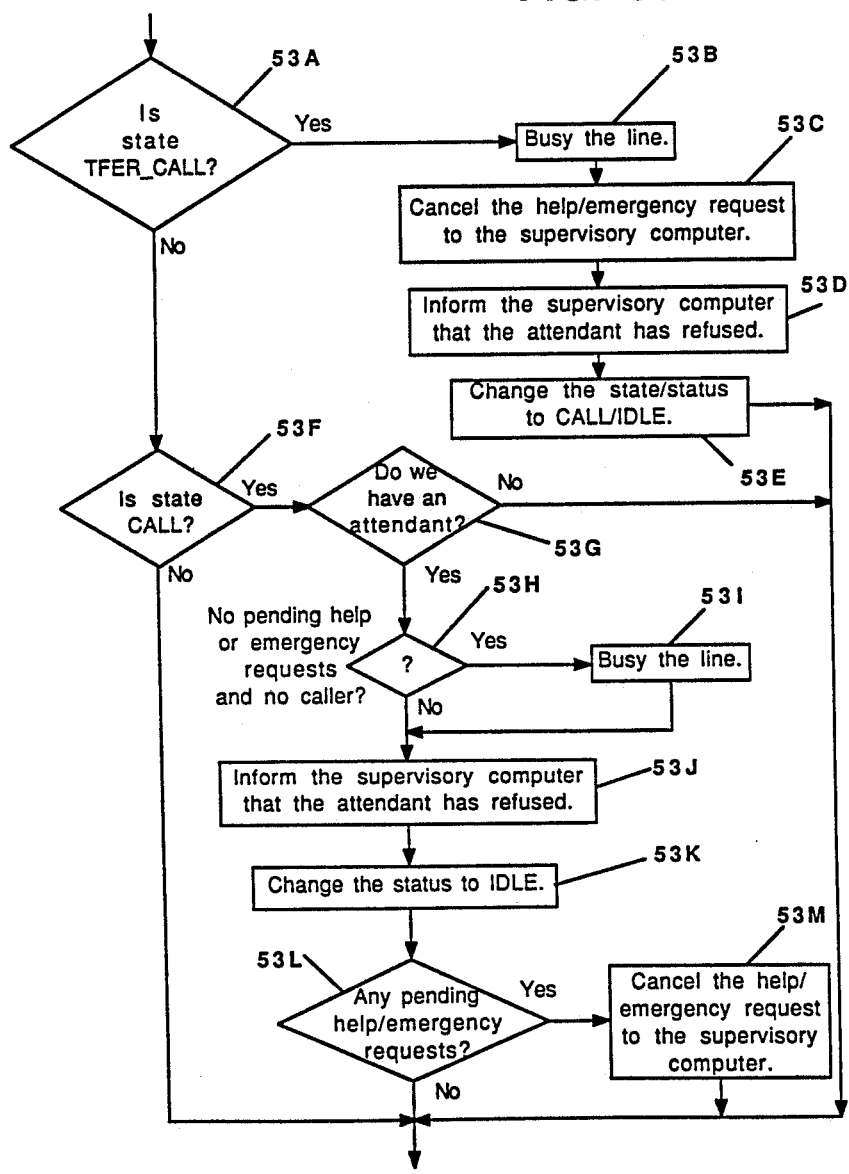
FIG. 53 is a more detailed flow chart of certain operations generally referred to in FIG. 49, in particular operations carried out if an attendant refuses calls.

With reference to FIG. 53, there will now be described the operations carried out in block 49H (FIG. 49). In the case that the state field of the database record for the line card is TFER_CALL, the flow proceeds from block 53A to block 53B, and then to blocks 53C, 53D, and 53E; otherwise, the flow proceeds to block 53F. In block 53B, controlling computer 3C issues the command to busy the incoming line for the line card. In block 53C, controlling computer 3C cancels the help/emergency request to supervisory computer 3D. In block 53D, controlling computer 3C sends information to supervisory computer 3D as to the attendant having refused calls. In block 53E, controlling computer 3C updates the states/status fields of the database record for the line card to CALL/IDLE. In block 53F, controlling computer 3C determines whether the state field of the database record for the line card is CALL. If it is, the flow proceeds to block 53G, in which controlling computer 3C determines whether an attendant is on-line. If so, the flow proceeds to block 53H, in which controlling computer 3C determines whether there is a pending help or emergency request, and whether no caller is on-line. If so, the flow proceeds to block 53I, and then to block 53J; otherwise, the flow proceeds directly to block 53J. In block 53I, controlling computer 3C issues the command to busy the incoming line for the line card. In block 53J, controlling computer 3C sends information to supervisory computer 3D as to the attendant having refused calls. Next, in block 53K, controlling computer 3C changes the status field in the database record for the line card to IDLE. Next, in block 53L, controlling computer 3C determines whether there is a pending help or emergency request. If so, the flow proceeds to block 53M, in which controlling computer 3C sends information to supervisory computer 3D to cancel the help/emergency requests.

Figure 54:
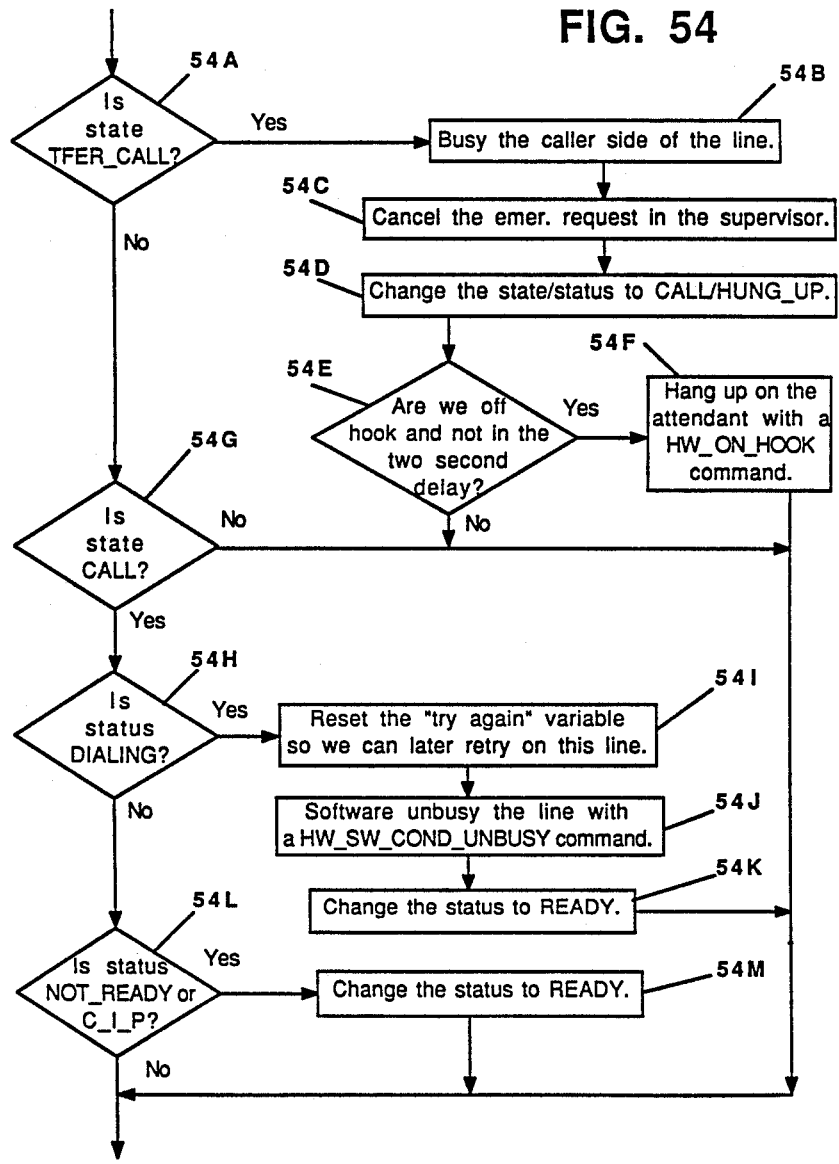
FIG. 54 is a more detailed flow chart of certain operations generally referred to in FIG. 49, in particular operations to service a DTMF activation for another call.

With reference to FIG. 54, there will now be described the operations carried out in block 49J, for recognizing a DTMF activation for another call. In block 54A, controlling computer 3C determines whether the state is TFER_CALL. If it is, the flow proceeds to block 54B, in which controlling computer issues the digitally coded command to cause the line card to busy out the caller side of the line. Next, in block 54C, controlling computer 3C cancels the emergency request to the supervisory computer. Next, in block 54D, controlling computer 3C changes the state/status in its internal records to CALL/HUNG_UP. Next, in block 54E, controlling computer 3C determines whether the line card outgoing station connection controller is off-hook and not in a two second delay. If it is, the flow proceeds to block 54F, in which controlling computer 3C issues the command to hang up the attendant with a HW_ON_HOOK command. Following block 54A if the state is not TFER_CALL, the flow proceeds to block 54G, in which controlling computer 3C determines whether the state is CALL. If it is, the flow proceeds to block 54H, in which controlling computer 3C determines whether the status is DIALING. If it is, the flow proceeds to block 54I, in which controlling computer 3C resets the "try again" variable to initialize it for retry counts in the future. Next, in block 54J, controlling computer 3C issues the digitally coded command to unbusy the incoming line by sending the HW_SW_COND_UNBUSY command. Next, in block 54K, controlling computer 3C updates the status record for the respective line card by setting the status to READY. If in block 54H controlling computer 3C determines that the status is not DIALING, the flow proceeds to block 54L, in which controlling computer 3C determines whether the status is either NOT_READY or C_I_P. If it is in either status, the flow proceeds to block 54M, in which controlling computer 3C updates the status record to indicate that this line card is READY.

Figure 55:
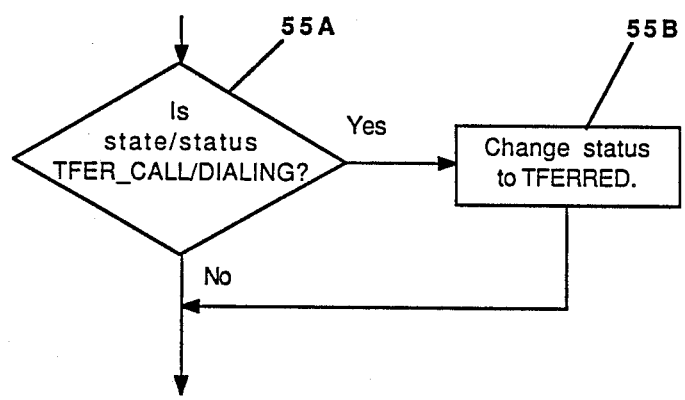
FIG. 55 is a more detailed flow chart of certain operations generally referred to in FIG. 49, in particular operations to service a DTMF response from an emergency attendant.

With reference to FIG. 55, there now be described the operations carried out in block 49L, for servicing DTMF emergency servicer response. In block 55A, controlling computer 3C determines whether the states/status is TFER_CALL/DIALING. If it is, the flow proceeds to block 55B, in which controlling computer 3C changes the status field of the database record for the line card to TFERRED.

Figure 56:
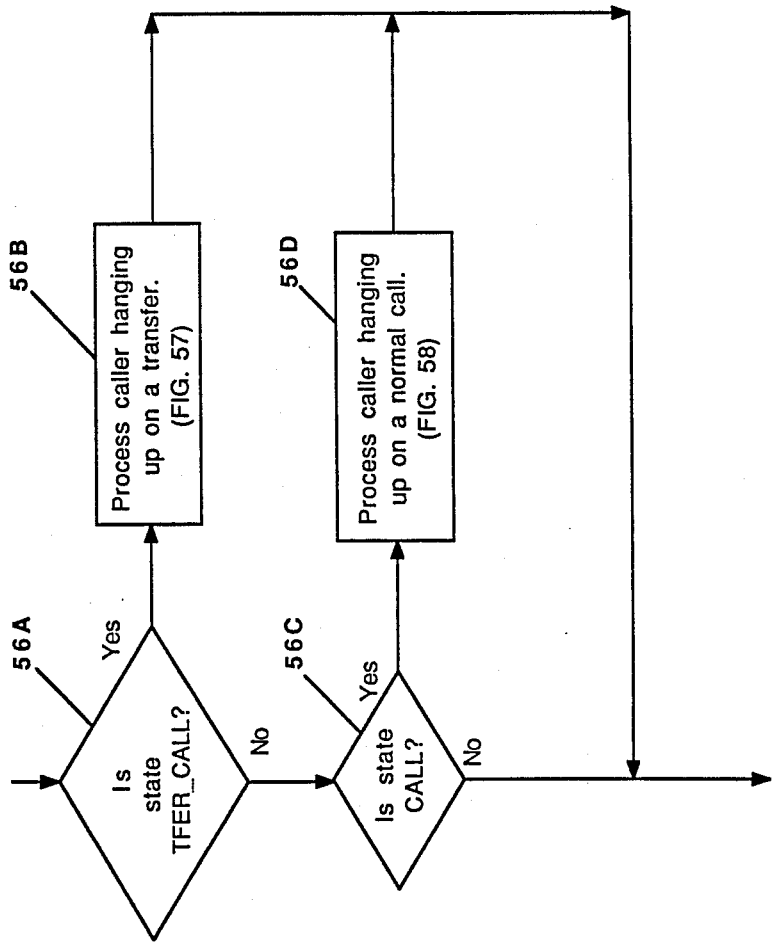
FIG. 56 is a more detailed flow chart of certain operations generally referred to in FIG. 47B, in particular operations carried out if an incoming caller has hung up.

With reference to FIG. 56, there will now be described the operations carried out in block 47P, after controlling computer 3C determines that a caller has hung up. In block 56A, controlling computer 3C determines whether the state is TFER_CALL. If it is, the flow proceeds to block 56B, in which controlling computer 3C performs operations described below with reference to FIG. 57. In the case that controlling computer 3C determines that the state is not TFER_CALL, the flow proceeds to block 56C, in which controlling computer 3C determines whether the state is CALL. If so, the flow proceeds to block 56D, in which controlling computer 3C performs operations described below with reference to FIG. 58.

Figure 57:
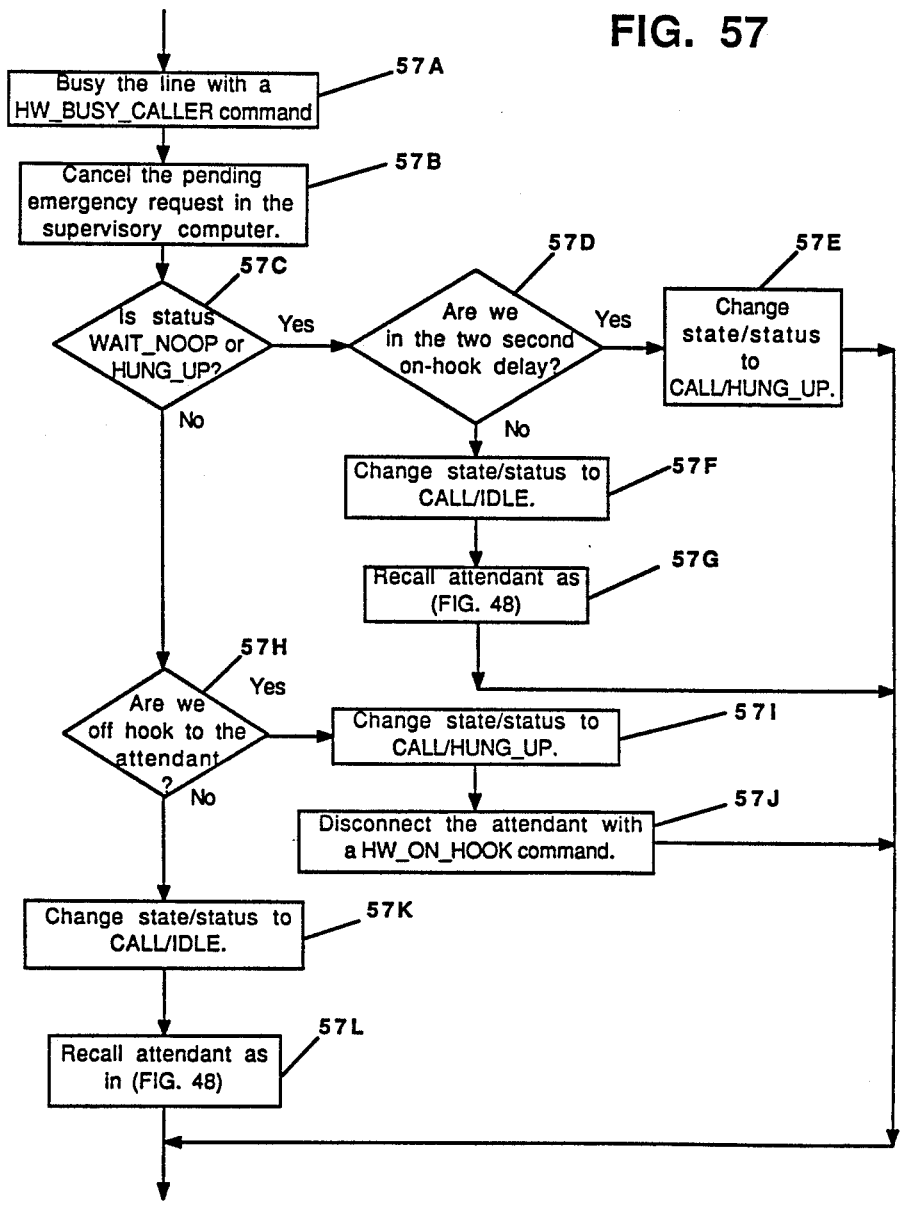
FIG. 57 is a more detailed flow chart of certain operations generally referred to in FIG. 56, in particular operations involved when a transfer has been attempted.

With reference to FIG. 57, there will now be described the operations carried out in block 56B, after controlling computer 3C determines that the caller has hung up during computer 3C issues a HW_BUSY caller command to the line card to busy out the incoming line. Next, in block 57B, controlling computer 3C cancels the pending emergency request in the supervisory computer 3D. Next, in block 57C, controlling computer 3C determines whether the status is WAIT_NOOP or HUNG_UP. If it is, the flow proceeds to block 57D, in which controlling computer 3C determines whether the two-second on-hook delay is in progress. If it is, the flow proceeds to block 57E, in which controlling computer 3C updates its internal records for state/status to CALL/HUNG_UP. If the two-second on-hook delay is not in progress, following block 57D, the flow proceeds to block 57F, in which controlling computer 3C changes the state/status fields of the database record for the line card to CALL/IDLE. Next, in block 57G, controlling computer recalls the attendant in accord with the operations described above with reference to FIG. 48. If during block 57C controlling computer 3C determines that the status is neither WAIT_NOOP nor HUNG_UP, the flow proceeds to block 57H, in which controlling computer 3C determines whether the line card is off-hook to the attendant. If it is, the flow proceeds to block 57I, in which controlling computer 3C changes the state/status fields of the database record for the line card to CALL/HUNG_UP. Next, in block 57J, controlling computer 3C issues a HW_ON_HOOK command to cause disconnection of the attendant. If in block 57H controlling computer 3C determines that the line card is not off-hook to the attendant, the flow proceeds to block 57K, in which controlling computer 3C changes the state/status fields of the database record for the line card to CALL/IDLE. Next, in block 57L, controlling computer 3C proceeds to recall the attendant in accord with the operations described above with reference to FIG. 48.

Figure 58:
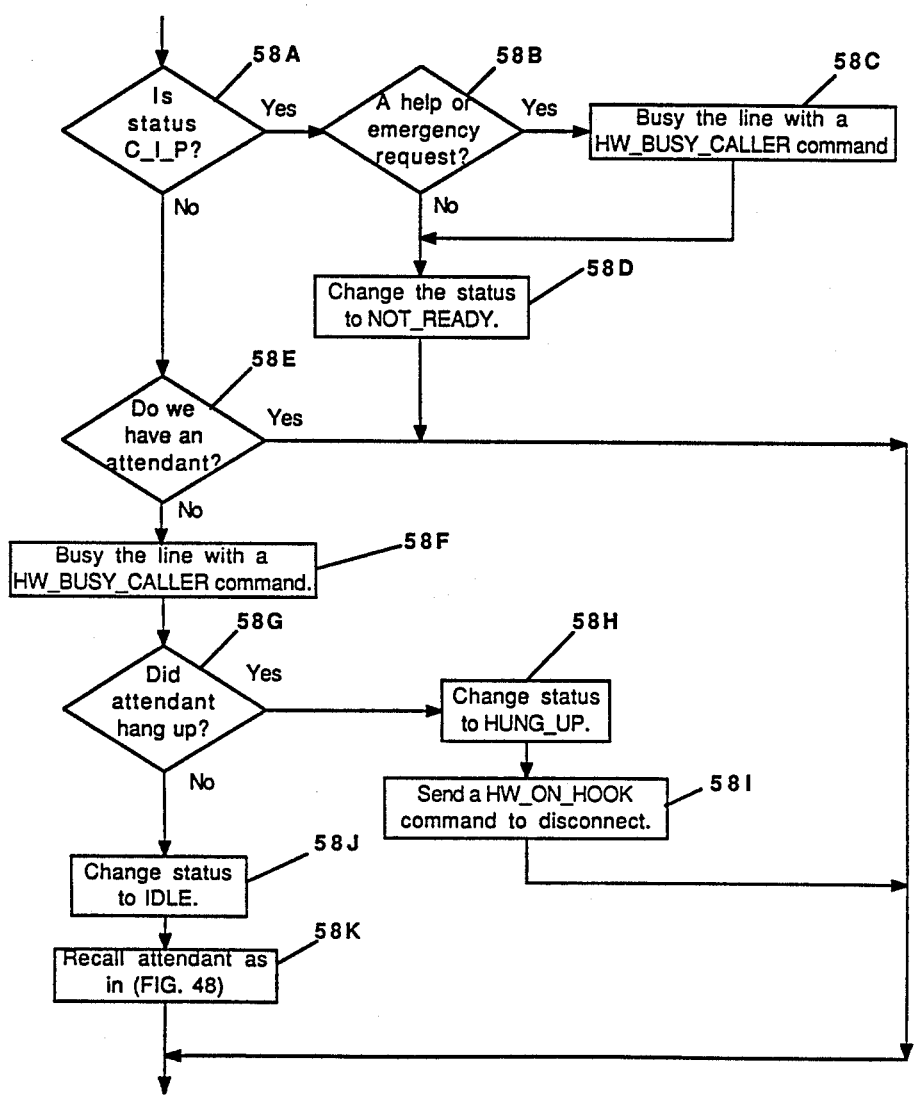
FIG. 58 is a more detailed flow chart of certain operations generally referred to in FIG. 56, in particular operations involved other than when a transfer has been attempted.

With reference to FIG. 58, there will now be described the operations carried out in block 56D, after controlling computer 3C determines that a caller has hung up during a normal call. In block 58A, controlling computer 3C determines whether the status is C_I_P. If so, the flow proceeds to block 58B, in which controlling computer 3C determines whether a help or emergency request has been made. If so, the flow proceeds to block 58C, in which controlling computer 3C issues an HW_BUSY_CALLER command to busy out the incoming line on the line card and then proceeds to block 58D, in which controlling computer 3C changes the status field of the database record for this line card to NOT_READY. If in block 58A controlling computer 3C determines that the status is not C_I_P, the flow proceeds to block 58E, in which controlling computer 3C determines whether an attendant has his station connected to the outgoing line for the line card. If not, the flow proceeds to block 58F, in which controlling computer 3C issues an HW_BUSY_CALLER command so as to busy out the incoming line for the line card. Next, in block 58G, controlling computer 3C determines whether the attendant has hung up. If so, the flow proceeds to block 58H, in which controlling computer 3C changes the status field of the database record for this line card to HUNG_UP. Next, in block 58I, controlling computer 3C issues an HW_ON_HOOK command so as to disconnect the outgoing line. If in block 58G controlling computer 3C determines that the attendant has not hung up, the flow proceeds to block 58J, in which controlling computer 3C changes the status field of the database record for the line card to IDLE. Next, in block 58K, controlling computer 3C proceeds to recall an attendant in accord with the operations described above with reference to FIG. 48.

With reference to FIG. 59, there will now be described the operations carried out after controlling computer 3C determines that an attendant has hung up.

In the case that the state is TFER_CALL, the flow proceeds from block 59A, to block 59B, in which controlling computer 3C performs operations described below with reference to FIG. 60. In the case that the state is CALL, the flow proceeds from block 59C, to block 59D, in which controlling computer 3C performs the operations described below with reference to FIG. 61.

Figure 60A:
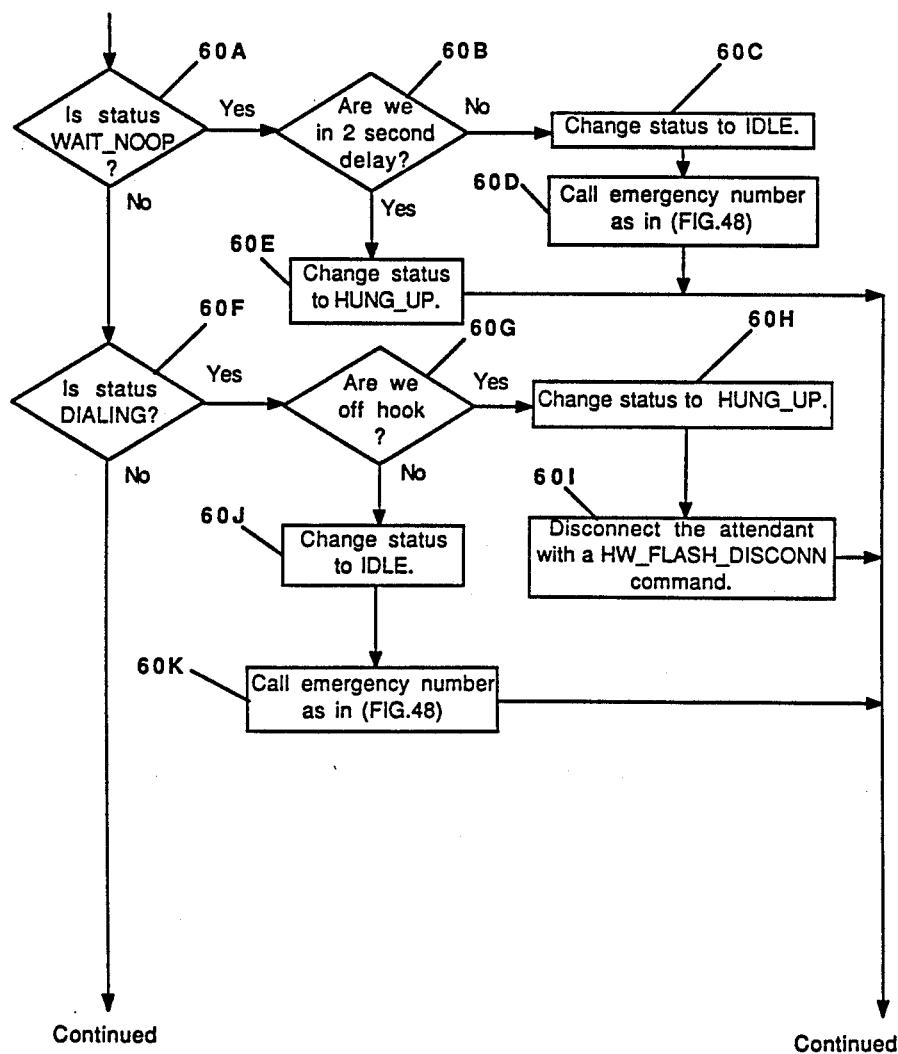
FIG. 60 comprises FIGS. 60A and 60B, and is a more detailed flow chart of certain operations generally referred to in FIG. 59, in particular operations involved when a transfer has been attempted.
Figure 60B:
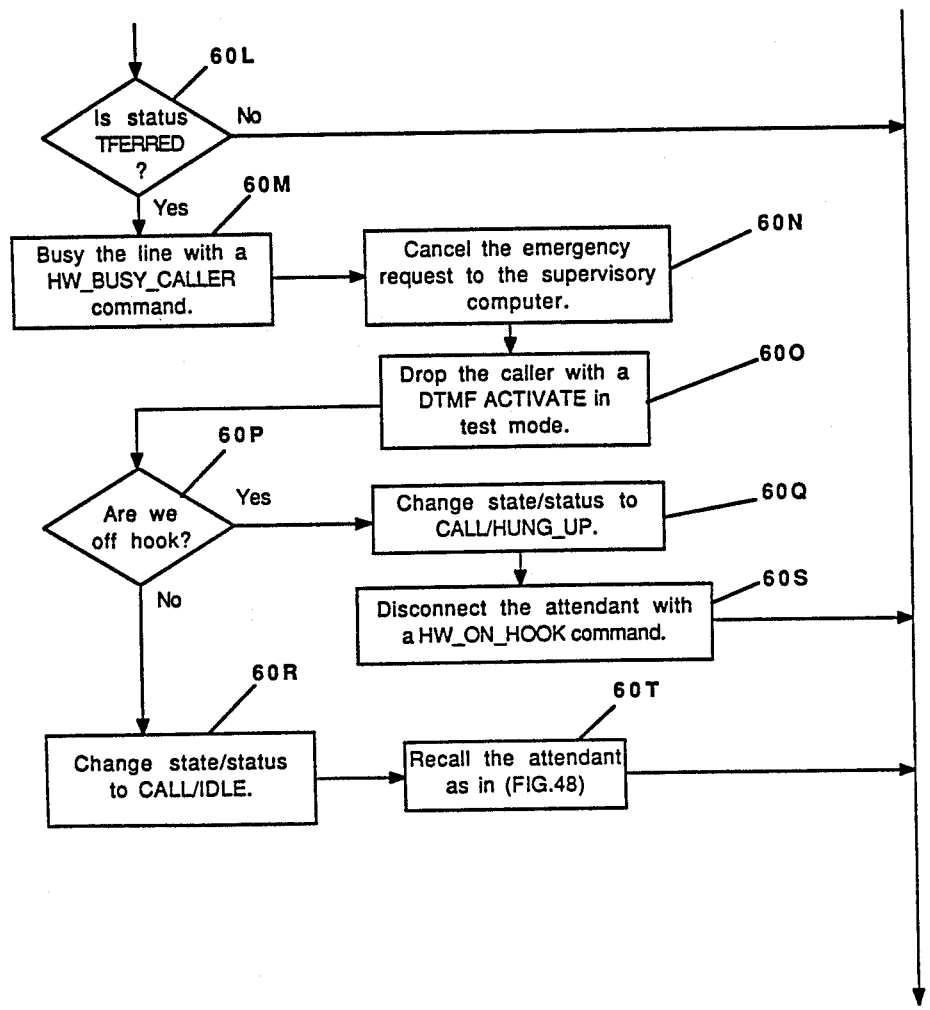

With reference to FIGS. 60A and 60B, there will now be described the operations carried out in block 59B, after controlling computer 3C determines that an attendant has hung up during a transfer (the state being TFER_CALL) In the case that the status is WAIT_NOOP, the flow proceeds from block 60A to block 60B, in which controlling computer 3C determines whether the two-second delay is in progress. If not, the flow proceeds to block 60C, in which controlling computer 3C changes the status field for the database record for the line card to IDLE. Next, in block 60D, controlling computer 3C performs the operations required to call the emergency number in accord with the flow described above with reference to FIG. 48. If controlling computer 3C determines in block 60B that the two-second delay has not elapsed, the flow proceeds to block 60E, in which controlling computer 3C changes the status field of the database record for the line card to HUNG_UP. In the case that the status is not WAIT_NOOP, but the status is DIALING, the flow proceeds from block 60F, to block 60G, in which controlling computer 3C determines whether the outgoing line for this line card is off-hook. If it is, the flow proceeds to block 60H, in which controlling computer 3C changes the status field of the database record for the line card to HUNG_UP. Next, in block 60I, controlling computer 3C issues a HW_FLASH_DISCONN command to disconnect the attendant. If in block 60G controlling computer 3C determines that the hook switch simulating switch for the outgoing line for the line card is not off-hook, the flow proceeds to block 60J, in which controlling computer 3C changes the status field of the database record for the line card to IDLE. Next, the flow proceeds to block 60K, in which controlling computer 3C cooperates with the line card to place a call to the emergency number in accord with operations described above with reference to FIG. 48.

With reference to FIG. 60B, in the case of the status field being TFERRED, the flow proceeds from block 60L to block 60M, in which controlling computer 3C issues a HW_BUSY_CALLER command to busy the incoming line for the line card. Next, in block 60N, controlling computer 3C communicates with supervisory computer 3D to cancel the emergency request. Next, in block 60O, controlling computer 3C issues a DTMF ACTIVATE command in test mode to drop the caller. Next, the flow proceeds to block 60P, in which controlling computer 3C determines whether the hook switch simulating switch for the outgoing line is off-hook. If so, the flow proceeds to block 60Q; otherwise, it proceeds to block 60R. In block 60Q, controlling computer 3C updates the database record for the line card so that the state/status fields are marked CALL/HUNG_UP. Next, in block 60S, controlling computer 3C issues a HW_ON_HOOK command to disconnect the attendant. In block 60R, controlling computer 3C updates the database record for the line card so that the state/status fields are marked CALL/IDLE. Next, in block 60T, controlling computer 3C performs the operations required to recall the attendant in accordance with the flow described above with reference to FIG. 48.

Figure 61A:
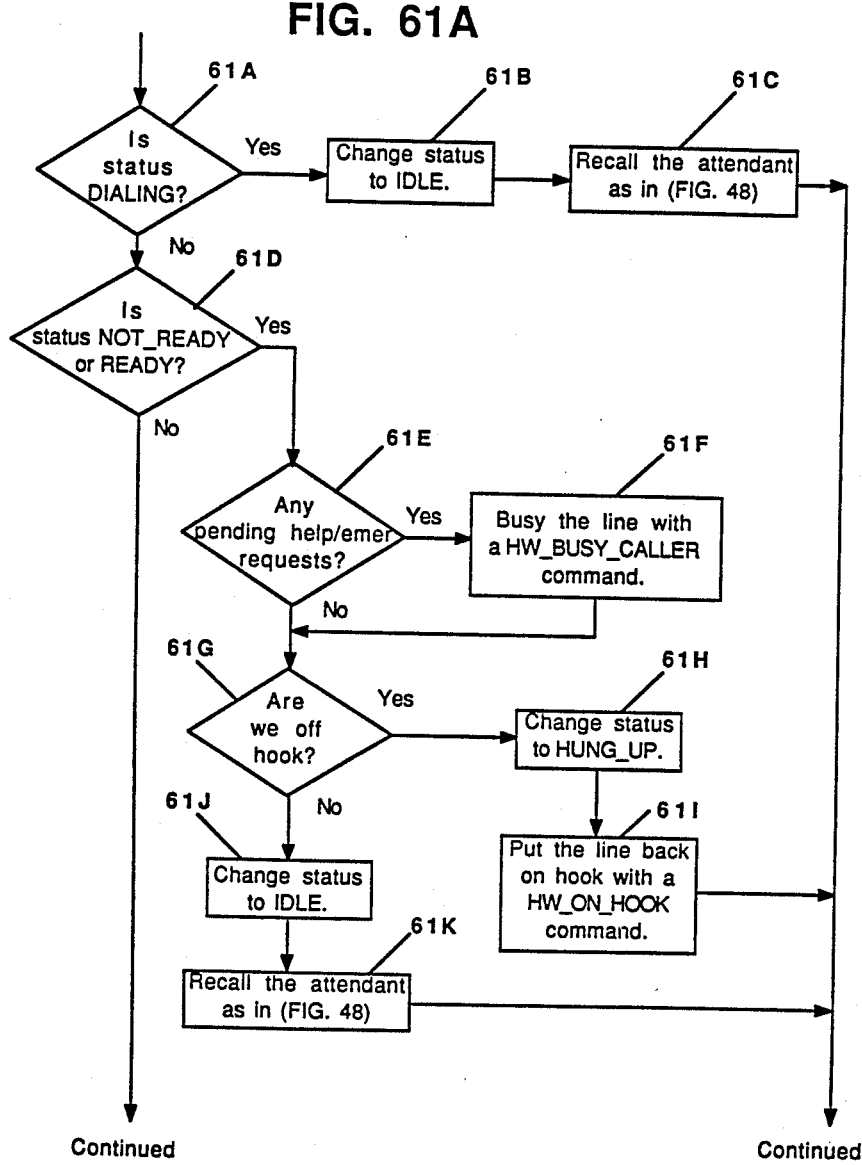
FIG. 61 comprises FIGS. 61A and 61B, and is a more detailed flow chart of certain operations generally referred to in FIG. 59, in particular operations involved other than when a transfer has been attempted.

With reference to FIGS. 61A and 61B, there will now be described the operations carried out when an attendant has hung up on a normal call. These operations begin in block 61A, are entered from block 59C (FIG. 59), and exit to block 47(Y). In the case of the status for the line card being DIALING, the flow proceeds from block 61A to block 61B, in which controlling computer 3C updates the database record for the line card so that the status is marked IDLE. Next, in block 61C, controlling computer 3C performs the operations required to recall the attendant in accordance with the flow described above with reference to FIG. 48. In the case of the status for the line card being either NOT_READY or READY, the flow proceeds from block 61D to block 61E, in which controlling computer 3C determines whether a help or emergency request is pending. If so, the flow proceeds from block 61F to block 61G; otherwise, it proceeds directly to block 61G. In block 61F, controlling computer 3C issues a HW_BUSY_CALLER command to busy out the incoming line to the line card. In block 61G, controlling computer 3C determines whether the hook switch simulating switch for the outgoing line is off-hook. If so, the flow proceeds to blocks 61H and 61I; otherwise, it proceeds to block 61J and 61K. In block 61H, controlling computer 3C updates the database record for the line card so that the status field is marked HUNG_UP. In block 61I, controlling computer 3C issues a HW_ON_HOOK command to put the outgoing line back on-hook. In block 61J, controlling computer 3C updates the database record for the line card so that the status field is marked IDLE. In block 61K, controlling computer 3C performs the operations required to recall the attendant, in accord with the flow described above with reference to FIG. 48.

With reference to FIG. 61B, in the case of the status for the line card being C_I_P, the flow proceeds from block 61L to block 61M, in which controlling computer 3C determines whether a help or emergency request is pending. If either is pending, the flow proceeds to block 61N, in which controlling computer 3C determines whether the hook switch simulating switch for the outgoing line is off-hook. If it is, the flow proceeds to block 61O; otherwise, it proceeds to block 61P. In block 61O, controlling computer 3C updates the database record for the line card so that the status field is marked CIP_HU. In block 61P, controlling computer 3C updates the database record for the line card so that the status field is marked CIP_I. If in block 61M controlling computer 3C determines that there is neither a help nor emergency request pending, the flow proceeds to block 61Q, in which controlling computer 3C issues a HW_BUSY_CALLER command to busy out the incoming line. Next, in block 61R, controlling computer 3C issues a DTMF ACTIVATE command in test mode to drop the caller. Next, in block 61S, controlling computer 3C determines whether the hook switch simulating switch for the outgoing line is off-hook. If it is, the flow proceeds to blocks 61T and 61U; otherwise, it proceeds to blocks 61V and 61W. In block 61T, controlling computer 3C updates the database record for the line card so that the status field is marked HUNG_UP. Next, in block 61V, controlling computer 3C issues a HW_ON_HOOK command to put the outgoing line back on-hook. In block 61V, controlling computer 3C updates the database record for the line card so that the status field is marked IDLE. Next, in block 61W, controlling computer 3C performs the operations required to recall the attendant in accord with the flow described above with reference to FIG. 48.

Figure 62:
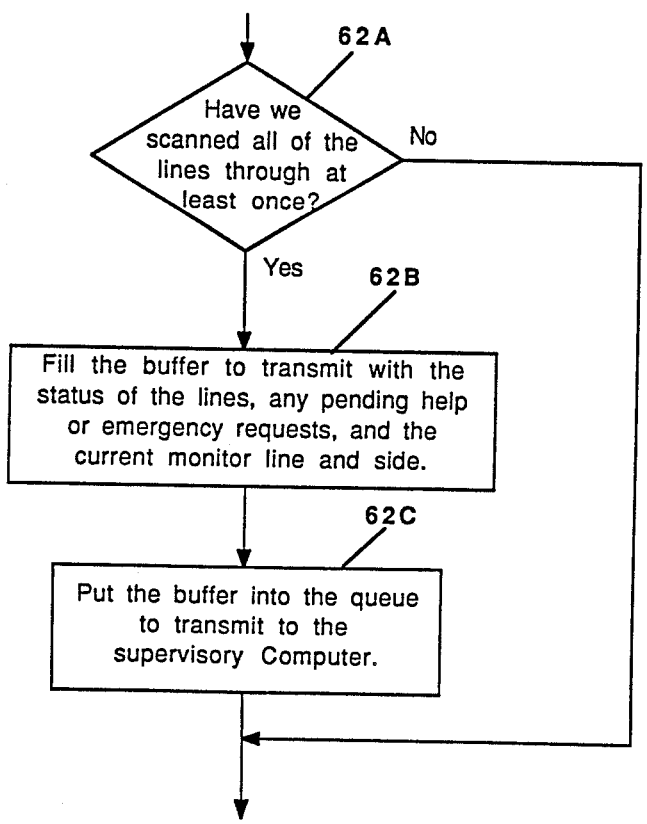
FIG. 62 is a more detailed flow chart of certain operations generally referred to in FIG. 46, in particular operations for dumping an internal line database to the supervisory computer.

With reference to FIG. 62, there will now be described the operations carried out to dump the internal database for the line cards from controlling computer 3C to supervisory computer 3D. These operations begin in block 62A, are entered from block 46C (FIG. 46), and exit to block 46E (FIG. 46). In block 62A, controlling computer 3C determines whether all line cards have been scanned at least once. If so, the flow proceeds to block 62B, in which controlling computer 3C fills the buffer to transmit quests, and the current line card and the current side of the current line card. Next, in block 62C, controlling computer 3C puts the buffer into the queue to transmit to supervisory computer 3D.

The foregoing detailed description discloses the construction and operation of the presently preferred embodiment from a perspective that brings into focus each of a large number of specific features, including those provided to take into account many possible events and circumstances that can arise at various stages of operation. Because of these features, the overall system provides means for sensing many possible events and circumstances, for recognizing the occurrence or existence of combinations of such events and circumstances, and for determining how to proceed, either on a fully autonomous basis or under control of supervisory commands entered by the supervisor, so that ensuing operations flow in a branch appropriate for the prevailing circumstances.

To provide an additional perspective of the presently preferred embodiment, there will now be set forth a summary of operations carried out by the system in its highly advantageous mode of successively extending incoming calls for answer and service by an attendant who remains on line, as during a ringthrough.

A. The telephone number for the attendant's multi-purpose station is provided in one of two ways:
   1. The supervisor enters the telephone number manually, or
   2. The telephone number is loaded into the system from a shift disk.
B. The supervisor enters the supervisory command to activate the line card, such that it can be used to respond to incoming calls.
C. The supervisory computer sends the telephone number for the line card to the controlling computer.
D. The controlling computer stores the number in the tnum field of the database record for the line card.
E. The supervisory computer sends to the controlling computer the supervisory command to call the attendant.
F. The controlling computer sends the commands to the line card to software busy the incoming line and to disconnect the attendant, if any (see FIG. 39).
G. The line card hardware records the receipt of the commands and, if there is a call in progress, defers executing the commands, and then performs the commands when there is no longer a call in progress (see FIGS. 18 and 19).
H. The controlling computer downloads the telephone number to the line card and commands the line card to go off hook and dial the number (see FIG. 39).
I. The line card hardware records the receipt of the off hook and dial command, and if there is a call in progress, defers executing the command until there is no longer a call in progress (see FIG. 18).
J. Hardware off hook sequence (see FIG. 18):
   1. ½ sec—draw dial tone.
   2. 1 sec—dwell.
   3. 2 sec—DTMF number dial.
   4. 30 sec—activation timer.
K. Software senses the outgoing line going off hook and dialing and changes the displayed status to "DIALING," (see FIG. 47B).
L. Activation by the attendant or no activation.
   1. Activation.
      a. Hardware ends the activation timer and hardware unbusies the incoming line (see FIGS. 18 and 19).
      b. Music is played to the attendant.
      c. Software senses the activation from the DTMF status returned and software unbusies the incoming line (see FIG. 54).
      d. Software displays the status as "READY" for an incoming call.
   2. Timer ends with no activation.
      a. Line card resets and the call is ended.
      b. Software senses the outgoing line is back on hook and possibly will retry (F, G, H, I, J, K, and L) the activation in multiple mode (see FIGS. 47A and 48)
      c. Software displays the status as incoming line is "BUSY".
M. Hardware senses incoming ring.
   1. Two second prompt tone.
   2. Incoming and outgoing lines connect through switch 14C.
   3. Software senses the incoming call and changes the displayed status to "C_I_P" (see FIG. 47B).
N. End of call—two ways:
   1. Caller hangs up.
      a. The incoming line is hardware busied.
      b. Software senses the loss of caller and changes the displayed status to "NOT READY" (see FIGS. 47B, 56 and 58).
      c. The attendant reactivates with a DTMF tone.
      d. The line card hardware unbusies the incoming line upon reactivation (see FIGS. 19 and 20).
      e. Music is played to the attendant.
      f. Software senses the DTMF status and, based on the DTMF reactivation, changes the displayed status to "READY" (see FIG. 54).
   2. Attendant activation.
      a. The caller is dropped.
      b. Unbusy is maintained on the incoming line.
      c. Music is played to the attendant.
      d. Software senses the loss of the caller and the activation by the attendant and changes the displayed status to "READY" (see FIGS. 47A, 49, and 54).
—M and N repeated upon each incoming call.
O. On hook on the outgoing line—two ways:
   1. On hook command issued by software.
      a. The incoming line is hardware and software busied at the end of the present call.
      b. Message 2 played (synchronized).
      c. Hang up occurs at the end of the message.
      d. Software senses the loss of the attendant and changes the displayed status to "IDLE" (see FIGS. 47B, 59, and 61).
   2. Attendant hangs up.
      a. The incoming line is busied by the hardware.

b. The line card is reset and the outgoing line is hung up.

c. The software senses the loss of the attendant and changes the display status to "IDLE" (see FIGS. 47B, 59, and 61).

d. The incoming line is software busied.

e. The software may try to reconnect the attendant (see FIG. 48).

We claim:

1. A telecommunications control system for accepting a plurality of multi-purpose stations for use as attendant stations in an attendant service complex to service calls directed to the system from originating stations, the system comprising:

a first plurality of station connection controllers, each station connection controller in the first plurality for cooperating with a respective one of a plurality of multi-purpose stations in defining opposite ends of a call connection path, and each such station connection controller having controllable switching means for opening the call connection path and releasing the respective multi-purpose station;

means for providing security against use of any of the multi-purpose stations within the attendant service complex by an unauthorized person, the means for providing security including means for controlling the switching means to open the call connection path and release the multi-purpose station;

a second plurality of station connection controllers, each station connection controller in the second plurality for cooperating with a respective one of a plurality of originating stations in defining opposite ends of a call connection path;

controllable inter-connection means arranged between the first and second plurality of station connection controllers; and means for controlling the inter-connection means such that incoming calls from originating stations are extended to multi-purpose stations that have been accepted as attendant stations.

2. A system according to claim 1, wherein the means for providing security includes means for receiving a security-clearance signal via the call connection path to a multi-purpose station.

3. A system according to claim 2, wherein the means for providing security includes timer means for defining a timing interval to allow for receiving the security-clearance signal.

4. A system according to claim 3, wherein the means for receiving the security-clearance signal includes means for converting an in-band signal to a logic signal; wherein the timer means produces a logic signal to define the timing interval end; wherein the means for controlling the switching means to release a multi-purpose station comprises logic circuit means.

5. A system according to claim 1, wherein the second plurality of station connection controllers are connected to incoming lines.

6. A system according to claim 5, wherein each incoming line is a ground start line.

7. A system according to claim 5, wherein the incoming lines are connected to the public switched network.

8. A system according to claim 7, wherein each incoming line is a ground start line.

9. A system according to claim 7, wherein each incoming line has a toll-free telephone number.

10. A system according to claim 9, wherein each incoming line is a ground start line.

11. A system according to claim 1, and further comprising means for originating calls from the system to the multi-purpose stations.

12. A system according to claim 11, wherein the means for originating calls from the system comprises means for generating a sequence of signals to identify a multi-purpose station.

13. A system according to claim 12, wherein the first plurality of station connection controllers are connected to outgoing lines connected to the public switched network, whereby the multi-purpose stations can be located in homes.

14. A system according to claim 12, wherein the means for originating calls from the system includes means for automatically redialing, whereby an interrupted call to a multi-purpose station can be re-established.

15. A system according to claim 12, wherein the means for originating calls from the system includes means operating automatically in an operation to replace an inactivated multi-purpose station, whereby an auxiliary attendant can be substituted to provide service.

16. A system according to claim 1, wherein the controllable inter-connection means comprises a plurality of interconnecting switch means, and wherein the means for controlling the inter-connection means comprises means for controlling the interconnecting switch means such that a plurality of incoming calls are extended to the same multi-purpose station during an interval throughout which the multi-purpose station remains connected as an attendant station.

17. A system according to claim 16, and further comprising means for originating calls from the system to the multi-purpose stations.

18. A system according to claim 17, wherein the means for originating calls from the system comprises means for generating number-representing signals in a sequence to identify a multi-purpose station.

19. A system according to claim 18, wherein the first plurality of station connection controllers are connected to outgoing lines connected to the public switched network, whereby the multi-purpose stations can be located in homes.

20. A system according to claim 18, wherein the means for originating calls from the system includes means for automatically redialing, whereby an interrupted call to a multi-purpose station can be re-established.

21. A system according to claim 18, wherein the means for originating calls from the system includes means operating automatically in an operation to replace an inactivated multi-purpose station, whereby an auxiliary attendant can be substituted to provide service.

22. A system according to claim 16, and further comprising in-band signal responsive means for controlling the second plurality of station connection controllers such that an attendant at a multi-purpose station can disconnect an incoming call yet remain on line to be ready to have another incoming call extended to the on-line multi-purpose station.

23. A system according to claim 1, wherein the system is operable in traffic-volume dependent modes, and includes means operative during one such mode to release a multi-purpose station, then respond to a request to establish a call connection path for an incoming call by originating a call to, and re-establishing the previously released multi-purpose station as an attendant station, and then substantially simultaneously complying with the request and extending the incoming call to the re-established attendant station.

24. A system according to claim 23, wherein each of the second plurality of station connection controllers includes a ringing signal detection circuit for detecting such a request to establish a call connection path for an incoming call.

25. A system according to claim 24, wherein the ringing signal detection circuit produces a signal used to initiate a sequence of operations that are carried out while the ringing signal is present, and that thereby are transparent to the person placing the incoming call, by which an outgoing call is completed to a multi-purpose station and thereafter the incoming call is answered.

26. A system according to claim 1, wherein the first plurality of station connection controllers are connected to outgoing lines connected to the public switched network, whereby the multi-purpose stations can be located in homes.

27. A system according to claim 1, and further comprising means for playing a pre-recorded message to prompt an authorized person to enter a security-clearance signal.

28. A system according to claim 1, wherein the controllable inter-connection means comprises a plurality of interconnecting switch means, and wherein the means for controlling the inter-connection means comprises means for controlling the interconnecting switch means such that a plurality of incoming calls are extended to the same multi-purpose station during an interval throughout which the multi-purpose station remains connected as an attendant station, and further comprising means for playing a pre-recorded message after the last of the plurality of incoming calls and substantially immediately thereafter releasing the multi-purpose station.

29. A telecommunications control system for networking a plurality of multi-purpose telephone stations for use as attendant stations in an attendant service complex to service calls directed to the system from originating stations, the system comprising:
 a first plurality of station connection controllers, each station connection controller in the first plurality for cooperating with a respective one of a plurality of multi-purpose stations in defining opposite ends of a call connection path;
 a second plurality of station connection controllers, each station connection controller in the second plurality for cooperating with a respective one of a plurality of originating stations in defining opposite ends of a call connection path;
 controllable inter-connection means arranged between the first and second plurality of station connection controllers; and
 means for controlling the inter-connection means such that incoming calls from originating stations are extended to multi-purpose stations that have been networked for use as attendant stations, and wherein the means for controlling the inter-connection means includes means for causing a plurality of incoming calls to be extended to the same multi-purpose station during an interval throughout which the multi-purpose station remains networked as an attendant station.

30. A system according to claim 29, wherein the second plurality of station connection controllers are connected to incoming lines.

31. A system according to claim 30, wherein each incoming line is a ground start line.

32. A system according to claim 30, wherein the incoming lines are connected to the public switched network.

33. A system according to claim 32, wherein each incoming line is a ground start line.

34. A system according to claim 32, wherein each incoming line has a toll-free telephone number.

35. A system according to claim 34, wherein each incoming line is a ground start line.

36. A system according to claim 29, and further comprising means for originating calls from the system to the multi-purpose stations.

37. A system according to claim 36, wherein the means for originating calls from the system comprises means for generating number-representing signals in a sequence to identify a multi-purpose station.

38. A system according to claim 37, wherein the first plurality of station connection controllers are connected to outgoing lines connected to the public switched network, whereby the multi-purpose stations can be located in homes.

39. A system according to claim 37, wherein the means for originating calls from the system includes means for automatically redialing, whereby an interrupted call to a multi-purpose station can be re-established.

40. A system according to claim 37, wherein the means for originating calls from the system includes means operating automatically in an operation to replace an inactivated multi-purpose station, whereby an auxiliary attendant can be substituted to provide service.

41. A system according to claim 29, and further comprising in-band signal responsive means for controlling the second plurality of station connection controllers such that an attendant at a multi-purpose station can disconnect an incoming call yet remain off hook to be ready to have another incoming call extended to the off hook multi-purpose station.

42. A system according to claim 29, wherein the system is operable in traffic-volume dependent modes, and includes means operative during one such mode to release a multi-purpose station, then respond to a request to establish a call connection path for an incoming call by originating a call to, and re-establishing the previously released multi-purpose station as an attendant station, and then substantially simultaneously complying with the request and extending the incoming call to the re-established attendant station.

43. A system according to claim 42, wherein each of the second plurality of station connection controllers includes a ringing signal detection circuit for detecting such a request to establish a call connection path for an incoming call.

44. A system according to claim 43, wherein the ringing signal detection circuit produces a signal used to initiate a sequence of operations that are carried out while the ringing signal is present, and that thereby are transparent to the person placing the incoming call, by which an outgoing call is completed to a multi-purpose station and thereafter the incoming call is answered.

45. A system according to claim 29, wherein the first plurality of station connection controllers are connected to outgoing lines connected to the public switched network, whereby the multi-purpose stations can be located in homes.

46. A telecommunications control system for selectively networking a plurality of multi-purpose telephone stations for use as attendant stations in an attendant service complex to service calls directed to the system from originating stations, the system comprising:

first controllable means comprising a plurality of outgoing line connection controllers, each outgoing line connection controller for cooperating with a respective one of a plurality of multi-purpose stations in defining opposite ends of a call connection path;

second controllable means comprising a plurality of incoming line connection controllers, each incoming line station connection controller for cooperating with a respective one of a plurality of originating stations in defining opposite ends of a call connection path, and each including means for detecting a ringing signal indicating a request to establish a call connection path for an incoming call;

third controllable means comprising a plurality of controllable inter-connection means, each arranged between an incoming line station connection controller and an outgoing line station connection controller;

fourth controllable means for originating calls from the system to the multi-purpose stations via the outgoing line station connection controllers; and means for controlling the first, second, third, and fourth controllable means in a predetermined sequence of operations initiated by the detection of a ringing signal, in which sequence of operations a call is originated to a multi-purpose station while the ringing signal is present so as to be unnoticeable to a person using the originating station, and after completion of the call to the multi-purpose station, the incoming call is answered and extended to the multi-purpose station by completing the incoming call at the incoming line station connection controller and extending the call to the outgoing line station connection controller via the inter-connection means.

47. A system according to claim 46, wherein the means for originating calls from the system comprises means for generating number-representing signals in a sequence to identify a multi-purpose station.

48. A system according to claim 46, wherein the outgoing line station connection controllers are connected to the public switched network, whereby the multi-purpose stations can be located in homes.

49. A system according to claim 46, wherein the means for originating calls from the system includes means for automatically redialing, whereby an interrupted call to a multi-purpose station can be re-established.

50. A system according to claim 46, wherein the means for originating calls from the system includes means operating automatically in an operation to replace an inactivated multi-purpose station, whereby an auxiliary attendant can be substituted to provide service.

51. A computer-controlled system connectable between a set of incoming lines and a set of outgoing lines for using the outgoing lines to establish a network of multi-purpose stations for use by service attendants in servicing incoming calls directed to the system from originating stations via the incoming lines, the system comprising:

controllable call extending means for connection between the incoming lines and the outgoing lines;

computer processing means for controlling the controllable call extending means;

the computer processing means including means providing digitally coded commands to control the call extending means and the call extending means including means providing status data to the computer processing means so the call extending means provides for extending incoming calls for answer and service by the service attendants;

the call extending means comprising in-band signal detection means operative while a service attendant is servicing such a call for detecting the presence and source direction of an in-band signal; and the in-band signal detection means communicating with the means for providing status data to enable the computer processing means to initiate performance of control functions in response to the in-band signal.

52. A system according to claim 51, wherein the computer processing means responds to predetermined status data to control the call extending means to disconnect an incoming call as a result of an in-band signal received via an outgoing line without disconnecting a call connection path to the multi-purpose station via the outgoing line.

53. A system according to claim 51, and further comprising means controlled by the in-band signal detection means for providing security against use of a multi-purpose station by an unauthorized person.

54. A system according to claim 53, and further comprising means for playing a pre-recorded message to prompt an authorized person to initiate generation of a predetermined in-band signal.

55. A system according to claim 51, wherein the incoming lines are connected to the public switched network.

56. A system according to claim 55, wherein each incoming line is a ground start line.

57. A system according to claim 55, wherein each incoming line has a toll-free telephone number.

58. A system according to claim 57, wherein each incoming line is a ground start line.

59. A system according to claim 51, wherein the outgoing lines are connected to the public switched network, whereby the multi-purpose stations can be located in homes.

60. An interactively-supervised, computer-controlled system for allocating tasks in a network for servicing incoming calls, the system comprising:

computer processing means;

call extending means;

the computer processing means including means providing digitally coded commands to the call extending means and the call extending means including means providing status data to the computer processing means so the call extending means provides for extending incoming calls for answer and service by a group of service attendants in accord with an allocation of tasks determined by the digitally coded commands;

display means and manual input means for use by a supervisor in interactively controlling the computer processing means;

the computer processing means being continually responsive to status data provided by the call extending means to generate on the display means a human-readable, continually-updated status report by which the supervisor may be prompted to use the manual input means to enter supervisory commands; and the computer processing means being responsive to such manually entered supervisory commands to provide digitally-coded commands to cause a reallocation of tasks.

61. A system according to claim 60, wherein the computer processing means is responsive to a supervisory command to transfer an incoming call in progress, such that the task of servicing the incoming call is reallocated.

62. A system according to claim 60, wherein the computer processing means is responsive to a supervisory command to discontinue extending calls to a designated service attendant, such that the tasks of answering and servicing incoming calls that would otherwise have been allocated to the designated agent are reallocated.

63. A system according to claim 60, wherein the computer processing means includes means responsive to status data for accumulating a statistical data base.

64. A system according to claim 63, wherein the computer processing means is responsive to a supervisory command to display a selected report of data in the statistical data base.

65. A system according to claim 60, and further comprising means for use by the supervisor in selectively participating in a call.

66. A system according to claim 60, and further comprising means for use by the supervisor in selecting a call to monitor.

67. A system according to claim 60, and further comprising means for enabling a service attendant to initiate an operation that automatically communicates a prompt to the display means.

68. A system according to claim 60, and further comprising means for enabling a service attendant to initiate an operation that automatically communicates an audible prompt.

69. A system according to claim 60, wherein the call extending means includes means for causing a plurality of incoming calls to be extended to the same service attendant during an interval throughout which the service attendant is continuously on line to the system.

70. A system according to claim 60, wherein the call extending means is connected to incoming lines connected to the public switched network.

71. A system according to claim 70, wherein each incoming line is a ground start line.

72. A system according to claim 70, wherein each incoming line has a toll-free number.

73. A system according to claim 72, wherein each incoming line is a ground start line.

74. A system according to claim 60, wherein the call extending means is connected to outgoing lines.

75. A system according to claim 74, wherein the outgoing lines are connected to the public switched network, whereby a service attendant can service calls at home.

76. A system according to claim 60, and further comprising means for originating calls from the system to the service attendant.

77. A system according to claim 76, wherein the means for originating calls from the system comprises means for generating number-representing signals in a sequence to identify a multi-purpose station.

78. A system according to claim 77, wherein the call extending means is connected to outgoing lines connected to the public switched network, whereby the multi-purpose stations can be located in homes.

79. A system according to claim 77, wherein the means for originating calls from the system includes means for automatically redialing, whereby an interrupted call to a multi-purpose station can be re-established.

80. A system according to claim 77, wherein the means for originating calls from the system includes means operating automatically in an operation to replace an inactivated multi-purpose station, whereby an auxiliary attendant can be substituted to provide service.

81. A modular line card for use in a telecommunications control system for networking a plurality of multi-purpose stations for use as attendant stations in an attendant service complex to service calls directed to the system from originating stations, the system being connected to a plurality of lines for incoming calls and to a plurality of lines for outgoing calls and having a system bus, the modular line card comprising:

means for connecting to the bus;

a first station connection controller for connection to one of the incoming lines for cooperating with a respective one of a plurality of multi-purpose stations in defining opposite ends of a call connection path;

a second station connection controller for connection to one of the outgoing lines for cooperating with a respective one of a plurality of originating stations in defining opposite ends of a call connection path;

controllable inter-connection means arranged between the first and second station connection controllers; and means for controlling the inter-connection means such that incoming calls from originating stations are extended to multi-purpose stations that have been networked for use as attendant stations, and wherein the means for controlling the inter-connection means includes means for causing a plurality of incoming calls to be extended to the same multi-purpose station during an interval throughout which the multi-purpose station remains networked as an attendant station.

* * * * *